US006975689B1

(12) United States Patent
McDonald et al.

(10) Patent No.: US 6,975,689 B1
(45) Date of Patent: Dec. 13, 2005

(54) DIGITAL MODULATION SIGNAL RECEIVER WITH ADAPTIVE CHANNEL EQUALIZATION EMPLOYING DISCRETE FOURIER TRANSFORMS

(76) Inventors: James Douglas McDonald, Apartment Number 304, 2307 S. First St., Champaign, IL (US) 61820; Allen Le Roy Limberg, 1053 Kensington St., Port Charlotte, FL (US) 33952

( * ) Notice: Subject to any disclaimer, the term of this patent is extended or adjusted under 35 U.S.C. 154(b) by 928 days.

(21) Appl. No.: 09/823,500

(22) Filed: Mar. 30, 2001

Related U.S. Application Data

(60) Provisional application No. 60/193,301, filed on Mar. 30, 2000.

(51) Int. Cl.[7] .......................... H04L 27/06; H04N 5/44
(52) U.S. Cl. ...................... 375/316; 375/346; 348/726; 348/729
(58) Field of Search ............................... 375/270, 316, 375/321, 324, 326, 344–346, 350; 348/725, 348/726, 729

(56) References Cited

U.S. PATENT DOCUMENTS

| | | | |
|---|---|---|---|
| 3,614,673 A | 10/1971 | Kang et al. | |
| 4,027,257 A | 5/1977 | Perreault | |
| 4,027,258 A | 5/1977 | Perreault | |
| 4,100,604 A | 7/1978 | Perreault | |
| 5,065,242 A | 11/1991 | Dietrich et al. | |
| 5,251,033 A | 10/1993 | Anderson et al. | |
| 5,276,516 A | 1/1994 | Bramley | |
| 5,425,050 A * | 6/1995 | Schreiber et al. | 375/141 |
| 5,528,311 A | 6/1996 | Lee et al. | |
| 5,799,037 A | 8/1998 | Strolle et al. | |
| 6,031,882 A | 2/2000 | Enge et al. | |
| 6,295,317 B1 * | 9/2001 | Hartup et al. | 375/235 |
| 6,337,878 B1 | 1/2002 | Endres et al. | |
| 6,377,312 B1 * | 4/2002 | Limberg et al. | 348/614 |
| 6,426,972 B1 | 7/2002 | Endres et al. | |
| 6,496,230 B1 * | 12/2002 | Limberg et al. | 348/725 |
| 6,512,789 B1 | 1/2003 | Mirfakhraei | |
| 6,768,517 B2 * | 7/2004 | Limberg et al. | 348/614 |
| 6,816,204 B2 * | 11/2004 | Limberg | 348/614 |
| 2003/0215029 A1 * | 11/2003 | Limberg | |

* cited by examiner

Primary Examiner—Young T. Tse

(57) ABSTRACT

Techniques for calculating the system characteristic of the adaptive filtering used for equalization and echo-suppression in a digital communications receiver, such as one used for receiving over-the-air broadcast digital television signal, are described. In these techniques, the system characteristic of the adaptive filtering is calculated from the discrete Fourier transform of successive portions of the input signal supplied to the adaptive filtering and from the discrete Fourier transform of corresponding portions of the transmitted signal, as estimated in the receiver. Receivers for implementing these techniques in various ways are also disclosed.

31 Claims, 20 Drawing Sheets

DIGITAL MODULATION SIGNAL RECEIVER WITH ADAPTIVE CHANNEL EQUALIZATION EMPLOYING DISCRETE FOURIER TRANSFORMS

This application is filed under 35 U.S.C. 111(a) claiming pursuant to 35 U.S.C. 119(e)(1) benefit of the filing date of provisional U.S. patent application Ser. No. 60/193,301 filed Mar. 30, 2000, pursuant to 35 U.S.C. 111(b).

The invention relates to equalization methods and apparatus used for determining the weighting coefficients of adaptive filtering used for equalization and echo cancellation in digital communications receivers for receiving digitally modulated single-carrier signals, as exemplified by receivers for digital television (DTV) signals as broadcast in the United States of America.

BACKGROUND OF INVENTION

Such broadcasting has been done in accordance with a Digital Television Standard published in 1995 by the Advanced Television Systems Committee (ATSC) as Document A/53.

The component of the broadcast DTV signal to which the receiver synchronizes its operations is called the principal signal, and the principal signal is usually the signal received directly over the shortest transmission path. Therefore the multipath signal components of the broadcast TV signal received over other paths are usually delayed with respect to the principal signal and appear as lagging ghost signals. It is possible however, that the direct or shortest path signal is not the signal to which the receiver synchronizes. When the receiver synchronizes its operations to a (longer path) signal that is delayed respective to the direct signal, there will be a leading ghost signal caused by the direct signal, or there will a plurality of leading signals caused by the direct signal and other reflected signals of lesser delay than the signal to which the receiver synchronizes. In the DTV are ghost signals are customarily referred to as "echoes", because of their similarity to echoes in transmission lines that are terminated other than with their characteristic impedance. The leading ghost signals are referred to as "pre-echoes", and the lagging ghost signals are referred to as "post-echoes". The ghost signals or echoes vary in number, amplitude and delay time from location to location and from channel to channel at a given location. Post-echoes with significant energy have been reported as being delayed from the reference signal by as many as sixty microseconds. Pre-echoes with significant energy have been reported leading the reference signal by as many as thirty microseconds. This 90-microsecond or so possible range of echoes is appreciably wider than television receiver designers generally supposed until midyear 2000.

The adaptive filtering used for channel equalization and echo cancellation in receivers for DTV signals broadcast in accordance with the ATSC standard has generally been a transversal filter the kernel of which is tapped at symbol intervals for implementing what is termed "synchronous equalization". Synchronous equalization of real-only received signal is attempted, by adjusting the phase of received signal to minimize any imaginary component of the received signal. The attempt at adjustment is often made using decision-feedback methods based on the response of the adaptive filtering. If synchronous equalization is employed, the received signal is under-sampled when phase modulation of the received signal occurs during multipath reception, so rapidly changing phase modulation cannot be tracked by the adaptive filtering. Until midyear 2000, the range of echoes with appreciable energy was believed to extend from pre-echoes advanced by no more than three or four microseconds to post-echoes delayed as much as forty microseconds or so. Accordingly, the kernel of the adaptive filtering used for synchronous equalization of real-only received signal in most designs had only about 500 taps at symbol-epoch intervals.

It is known generally in digital communications receiver design that "fractional equalization", in which the adaptive filtering kernel has taps at less-than-symbol-epoch intervals outperforms synchronous equalization when multipath reception conditions obtain. Page 535 of *Data Communications Principles* by Gitlin, Hayes & Weinstein, published in 1992 by Plenum Press of New York, indicates that a ($¾$)-symbol-epoch fractional equalizer performs substantially as well as the ($½$)-symbol-epoch fractional equalizer known without doubt to employ adequate sampling. Fractional equalization costs more in die area, of course, supposing the adaptive filtering to be constructed in a monolithic integrated circuit. A ($¾$)-symbol-epoch fractional equalizer has one-third more taps than a synchronous equalizer, or more than 640 taps. This appears to have deterred fractional equalization being used in DTV signal receivers designed for use in homes and made available for purchase before April 2001.

Training signals can be used for determining the weighting coefficients of adaptive filtering used for channel equalization and echo suppression in receivers for television signals. For example, a subcommittee of the ATSC approved ghost-cancellation reference (GCR) signals that incorporated Bessel chirp signals on pedestals in the $28^{th}$ horizontal scan lines of image fields of analog television signals broadcast in accordance with a National Television System Committee (NTSC) standard used in the United States of America. The Bessel chirps in the later of the two image fields of each television frame are of opposite sense of polarity from the Bessel chirps in the earlier of the two image fields. This supports the receiver combining Bessel chirps from an even-numbered plurality of consecutive image fields to suppress pedestal, horizontal synchronizing pulse, color burst and porch information accompanying the Bessel chirps to generate a separated GCR signal together with the echoes, or ghosts, thereof. The separated GCR signal is employed as a training signal from which the weighting coefficients of adaptive filtering used for equalization and echo-suppression are determined. This determination is conveniently made by digitizing the GCR signal as separated from received NTSC analog television signal, determining the discrete Fourier transform (DFT) of successive samples of the digitized separated GCR signal and its ghosts as received off-the-air, and dividing that DFT term-by-corresponding term by the DFT of successive samples of a digitized ghost-free GCR signal as known a priori and stored in read-only memory at the receiver. The result of this term-by-term division is a DFT characterizing the actual reception channel as to its frequency response. This DFT is divided term-by-corresponding-term into a DFT characterizing the ideal reception channel as to its frequency response, to determine the DFT of the system function in the frequency domain of the adaptive filtering to be used for equalization and echo-suppression. This last DFT in the frequency domain is subjected to an inverse discrete Fourier transform (IDFT) procedure to generate the weighting coefficients of the adaptive filtering kernel in the time domain. These are closed-form computations of the weighting coefficients of adaptive filtering used for equalization and echo-suppression. A definite solution as to the value of each weighting coefficient in the filter kernel is directly obtained, without open-form computations for successively approximating that value with reduced error over time.

Fourier transforms in general and DFTs in particular are known to have an interesting property, which is not exploited in the adaptive filtering procedure described in the previous paragraph. A shift of the original data within the transform window is reflected solely in a change in the phasings of the transform coefficients and not in their amplitudes. This "Fourier transform shift theorem" was propounded by E. O. Brigham in "The Fast Fourier Transform" published in 1974 by Prentice-Hall of Englewood Cliffs, N.J. This property underlies fast computation of DFTs of continuous data streams by methods such as those described by K. B. Welles II and R. I. Hartley in their U.S. Pat. No. 4,972,358 issued 20 Nov. 1990 and titled "Computation of Discrete Fourier Transform Using Recursive Techniques".

Blind-equalization methods have been resorted to for determining the weighting coefficients of adaptive filtering used for equalization and echo-suppression in receivers for ATSC digital television (DTV) signals, because the ATSC DTV signal does not provide a good training signal for procedures similar to those described in the preceding paragraph. The data field synchronizing (DFS) signals specified by ATSC Document A/53 each include a PN511 pseudo-random noise signal and a triple PN63 pseudo-random noise signal. At the time Document A/53 was published, these pseudo-random noise (PN) signals were envisioned as being used as training signals for adaptive channel-equalization and echo-suppression filtering. The design of the DFS signal does not avoid the PN signals being overlapped by the echoes of previous data in the DTV signal that have significant energy, however, nor does the design avoid some echoes of these PN signals that have significant energy overlapping subsequent data in the DTV signal. Consequently, even though the PN signals have auto-correlation functions that might suit them for match filtering, the DFS signals have not proven in actual practice to be satisfactory training signals for adaptive equalization and echo-suppression filtering, because echoes of the PN signals are not readily distinguishable from other data and their echoes.

Therefore, data-directed methods have been resorted to for computing on a continuing basis the weighting coefficients of the adaptive filtering used for equalization and echo-suppression in receivers for ATSC DTV signals. The approaches usually are auto-regressive spectral analyses, which are generally described as follows. The actual response of the adaptive filtering to received signal is data-sliced, or quantized, to generate an estimate of the symbols actually transmitted. The actual response of the adaptive filtering to received signal is compared symbol-epoch-by-symbol-epoch with the estimates of the symbols actually transmitted to generate an error signal to be used in a decision-feedback procedure for calculating the weighting coefficients of the adaptive filter. The decision-feedback procedure uses one of a variety of known algorithms that operate on a successive approximation basis.

LMS-gradient algorithms used in data-directed equalization methods are quite slow and are prone to stalling at local minima in the decision-feedback error signal, rather than continuing to the minimal decision-feedback error signal condition overall. Initialization of the adaptive filtering used for equalization and ghost cancellation normally takes a second or so after the reception channel is changed, which makes channel surfing difficult. Some receivers store weighting coefficients from the last time a channel was tuned to, to furnish a starting point for initializing the adaptive filtering.

LMS-gradient algorithms adapt slowly, so rapidly occurring changes in multipath conditions cannot be followed. This will at times lead to the weighting coefficients being completely erroneous for changed multipath condition, causing data slicing errors frequently enough that the error-correction capabilities of the system are overwhelmed. In some instances the multipath conditions do not return to a previous state which the weighting conditions are reasonably correct for, to cause data slicing errors to be infrequent enough that they can be corrected. Then, there is a second or so interval after rapid changes in multipath conditions pass before the LMS-gradient algorithm can re-initialize the weighting coefficients of the adaptive filtering. Continuously changing multipath conditions can cause a loss of tracking in which data slicing errors too frequent to be corrected persist over protracted intervals many seconds long.

Alternatively, recursive least squares (RLS) filter adaptation methods are the data-directed equalization methods used for computing the weighting coefficients the adaptive filtering a DTV receiver uses for equalization and ghost-cancellation. If signal-to-noise conditions are high, the RLS algorithm converges in about 2M+2 iterations for small error signals, where M+1 is the number of taps in the kernel of the adaptive filter, which is typically about an order of (binary) magnitude faster than LMS-gradient algorithms converge. Such faster convergence would appear to reduce the chances for loss of adaptive filter tracking owing to dynamic multipath conditions and for such loss being of protracted duration. However, the tracking performance is influenced not only by the rate of convergence (which is a transient characteristic) but also by fluctuation of the steady-state performance of the algorithm as influenced by measurement and algorithm noise. With both algorithms tuned to minimize the misadjustment of the filter response by a proper optimization of their forgetting rates, the LMS algorithm exhibits tracking performance superior to that of the RLS algorithm. Moreover, dynamic multipath conditions tend to be more troublesome during weak-signal reception where the convergence of the RLS algorithm is not so much greater than that of the LMS-gradient algorithm is not so much greater than that of the LMS-gradient algorithms.

RLS methods generally involve a computational cost that increases about as the square of the number of taps contained in the adaptive filter. This is a prohibitively high cost for a DTV receiver designed for use in homes. The fast transversal filters (FTF) algorithms realize the RLS solution with a computational cost that increases only linearly with the number of taps contained in the adaptive filter, as in the LMS-gradient algorithms. The computational cost of the FTF algorithms is at least four times larger than that for the LMS-gradient algorithms, however, with division calculations being required. For an adaptive filter having an (M+1)-tap kernel, the LMS-gradient algorithms require about 2M+1 multiplications and 2M additions/subtractions, with no divisions being required. The FTF algorithms require at least 7M+12 multiplications, 4 divisions, and 6M+3 additions/subtractions, with additional computation being required to avoid long-term instabilities.

Like the LMS-gradient algorithms, the FTF algorithms can suffer from stalling at local minima in the error signal, but methods are known for preventing such stalling. The more intractable problem with FTF algorithms is a potential explosive instability arising from word-length limitations in the weighting-coefficient computer causing accumulated rounding errors. One method that has been used for avoiding this explosive instability is to evaluate error signals developed by comparing the results of alternative ways of calculating the FTF algorithm, the differences in results being attributed to errors introduced by rounding off to accommodate word-length limitations in the weighting-coefficient computer. Such methods increase computational complexity by another 15% or so. Another method that has been used for avoiding this explosive instability is periodically starting the FTF algorithm, with an LMS-gradient algorithm taking over in the interim proceeding from the weighting coefficients the FTF algorithm has computed. The LMS-gradient algorithm eliminates accumulated errors in the coefficients, so the FTF algorithm can resume its calculations without accumulated round-off errors. The hand-off to the LMS-gradient algorithm also increases computational complexity.

The adaptive filters that have previously been used for equalization and echo-suppression in receivers for ATSC DTV signals are tracking filters that perform auto-regressive spectral analyses. When deep fading occurs suddenly during dynamic multipath reception conditions, there is a tendency for tracking to be lost. Tracking of the adaptive filtering may be impossible to recover unless a complete re-initialization of its weighting coefficients can be accomplished before there is another sudden change in dynamic multipath reception conditions. DTV receiver designers have attempted to solve the loss of tracking problem by improving the tracking rate of the adaptive filtering. This attempts to prevent loss of tracking, rather than dealing with the problem of re-initializing filter coefficients "instantly" when tracking is lost. The problem is that objects moving at fairly low velocity can at times interrupt reception from one of two reception paths of similar strength to cause tremendous changes in signal phase that are nearly "instantaneous". Accordingly there will always be times, hopefully rare, when adaptive tracking of the adaptive filter will be lost. The question then circles back to how rapidly the adaptive filter coefficients can be re-initialized after tracking is lost, particularly when reception conditions do not change back to a previous state. A few seconds is simply too long, particularly since audio as well as video is lost.

Auto-regressive spectral analyses are handicapped in regard to how rapidly the weighting coefficients of the adaptive filtering can be re-initialized after tracking is lost. The ultimate limit on how rapidly re-initialization is possible after loss of tracking is determined by the desideratum that re-initialization of the weighting coefficients should be deferred until the data on which their computation is based no longer appreciably affect the adaptive filtering response. Such deferral is necessary in order to assure stability of the feedback loops in which error signal is derived from the adaptive filtering response to support computation of the weighting coefficients.

The speed of re-initialization is limited not only by the latency of the adaptive filtering used for equalization and echo-suppression, however, but additionally by the latency associated with computation of the weighting coefficients from the decision-feedback error signals. The updates of weighting coefficients are not computed in parallel in the auto-regressive methods, but are computed seriatim based on minimizing the decision-feedback error signals over time. The updates of the weighting coefficients can be applied to the adaptive filter serially as they are computed, but most designs avoid undesirable reverse-time effects by periodically applying the updates of the weighting coefficients to the adaptive filter so as to update the weighting coefficients in the entire kernel simultaneously in a technique known as "block updating". The serial, rather than parallel, computation of updates for the weighting coefficients slows the adaptation of the filtering used for equalization and echo-suppression, particularly when block updating of the kernel weighting coefficients is done.

Furthermore, the auto-regressive methods employ open-form computation for continually adjusting the kernel weighting coefficients of the adaptive filtering using successive approximation techniques, rather than computing those weighting coefficients outright using closed-form computation. These open-form computations convolve the adaptive filter kernel with several blocks of signal samples, rather than a single block of samples. This tends to make initial computation of an (M+1)-tap kernel an operating method with steps some (3M+2) times N in number. This sort of operating method tends to take considerable time to perform, since these steps N(3M+2) in number have to be performed at the normal sampling rate through the adaptive filter The factor (3M+2) arises from (2M+1) sample epochs being required for convolving (M+1) samples of input signal to the adaptive filter with the (M+1)-tap kernel to generate the (M+1) samples of decision-feedback signal required for updating all the weighting coefficients in the kernel, and from (2M+1) sample epochs being required for convolving the (M+1) samples of the decision-feedback signal gradient with the (M+1)-tap kernel to generate the updates of all the weighting coefficients in the kernel. The latter convolution procedure is presumed to commence next sample epoch after the first sample of decision-feedback signal is generated by the former convolution procedure, so the latter convolution procedure overlaps the former convolution procedure over M sample epochs.

The factor N is reciprocally related to an attenuation factor that is introduced into each successive one of the computation to update the weighting coefficients applied to a respective one of the kernel taps. The factor N is introduced into these computations so that the optimum value of each weighting coefficient is approached or reached through successive approximation. That is, the weighting coefficients are generated in the auto-regressive adaptive-filtering methods by long-term accumulations of decision-feedback error signal energy supplied in small increments and small decrements. These procedures result in lowpass recursive filtering of each weighting coefficient in the adaptive filtering kernel, which suppresses the effects of noise on the computation of the weighting coefficients. The noise comprises quantization noise generated in the digital portion of the receiver, Johnson noise from the analog portion of the receiver, impulse noise in the reception channel and possibly co-channel interference from NTSC analog television signals or from other ATSC DTV signals. This form of lowpass filtering of each weighting coefficient in the adaptive filtering kernel to suppress the effects of noise on its computation, which lowpass filtering is an integral part of the accumulation procedure that implements the computation, has a severe shortcoming as compared to lowpass filtering of each weighting coefficient and its updates after their generation. That is, since the weighting coefficients are computed seriatim in the auto-regressive adaptive-filtering methods, the number N of computations of each weighting coefficient that are averaged to arrive at the final value of that weighting coefficient actually employed in the adaptive filtering kernel appears as a multiplicative factor in determining the number of sample epochs required for completing initialization of the kernel weighting coefficients. If lowpass filtering of each weighting coefficient and its updates after their generation were used instead, the number N of computations of each weighting coefficient that are averaged to arrive at the final value of that weighting coefficient actually employed in the adaptive filtering kernel would simply add N sample epochs to the number of sample epochs required for completing initialization of the kernel weighting coefficients.

This specification discloses a novel equalization method for adapting the kernel weighting coefficients of the filtering used for equalization and echo-suppression in DTV signal receivers. This novel equalization method uses closed-form computation to obtain directly a complete update of the value of each weighting coefficient in the filter kernel, without open-form computations for successively approximating that value with reduced error over time. Closed-form computations that perform convolution of (M+1)-sample terms using discrete-Fourier-transform (DFT) procedures and convert the results obtained in the frequency domain back to the time domain using inverse-discrete-Fourier-transform (I-DFT) procedures can be performed in as few as $2(M+1) \log_2(M+1)$ sample epochs. The computations to determine the complete update of each weighting coefficient in the filter kernel are performed in parallel. After the complete updates are computed in parallel, all the weighting coefficients in the kernel of the adaptive filtering used for equalization and echo-suppression are simultaneously updated in full.

While the novel equalization method includes steps of lowpass filtering each weighting coefficient included in the adaptive filtering kernel, in order to suppress the effects of noise on the computation of the weighting coefficients, the lowpass filtering is performed after full updates of coefficient values have been computed. So, lowpass filtering of N successive values of each of the parallelly computed weighting coefficients adds only N sample epochs to the number of sample epochs required for completing initialization of the kernel weighting coefficients. N does not appear as a multiplicative factor in determining the number of sample epochs required for completing initialization of the kernel weighting coefficients.

Complete updating of the kernel weighting coefficients by the novel equalization method can initially be done in $N+1(M+1) \log_2(M+1)$ sample epochs. During initialization or re-initialization N can be made to be zero, or to be otherwise smaller than it is during continuing operation thereafter.

N is usually an integral power of two, better to implement lowpass filtering that employs a tree of digital adders. Typical values are 32, 64, 128, or 256, with higher values of N being favored in auto-regressive adaptive filtering methods. U.S. patent application Ser. No. 60/193,301 indicates that (M+1) would preferably have a value at least 512 for representing a time period of 30–50 microseconds duration. That patent application further indicates that value of (M+1) =1024 would be preferred for a fractional equalizer using twice-baud-rate sampling and having its weighting coefficients adapted by the novel equalization method described in this specification. U.S. patent application Ser. No. 60/193, 301 indicates that assured initialization or re-initialization takes about two milliseconds with preferred forms of the novel equalization method described in its specification, as compared to the 25-millisecond fastest initialization or re-initialization time claimed for auto-regressive blind-equalization methods. The novel equalization method described in U.S. patent application Ser. No. 60/193,301 and in this specification is never subject to the stalling problems that can afflict auto-regressive blind-equalization methods.

In order for DTV receiver designs employing a synchronous equalizer to accommodate the 90-microsecond-duration echo range that was publicly disclosed in 2000, (M+1) preferably has a value $2^P$ where P is eleven or more. In order that a DTV receiver design employing a fractional equalizer using twice-baud-rate sampling can accommodate the 90-microsecond-duration echo range, (M+1) preferably has a value $2^{(P+1)}$. Presuming that the duration of the window for the DFT is increased from a 47.6 microsecond duration to 190.3 microseconds, assured initialization or re-initialization will take another millisecond or so longer.

SUMMARY OF THE INVENTION

The invention generally concerns novel equalization techniques for calculating the system characteristic of the adaptive filtering used for equalization and echo-suppression in a digital communications receiver, such as one used for receiving over-the-air broadcast digital television signals, and the receiver circuitry for implementing these novel equalization techniques. In these novel equalization techniques, the system characteristic of the adaptive filtering is calculated for the discrete Fourier transform of the input signal supplied to the adaptive filtering and from the discrete Fourier transform of the transmitted signal as estimated in the receiver.

A species of this novel equalization technique computes the weighting coefficients for adaptive transversal filtering used for equalization and echo-suppression of ATSC DTV signals in receivers constructed in accordance with the inventions described in this specification. In this technique the computation of the weighting coefficients of the filtering is based on channel characterization that is computed in the following manner, assuming the adaptive filter receives baseband ATSC DTV signal as input signal. The adaptive filtering response is supplied to a symbol decoder, such as a data slicer or a Viterbi trellis decoder, which estimates the symbols transmitted from the transmitter. The discrete Fourier transform (DFT) of a large plurality P in number of successive samples of the transmitted symbols as so estimated is computed. A corresponding large plurality P in number of successive samples of the signal supplied to the adaptive filtering for equalization and echo-suppression is delayed, to compensate for the latency of the adaptive filtering and the symbol decoder cascaded thereafter, and the DFT of the delayed plurality of successive samples is calculated. The DFT of the plurality P in number of successive samples of the transmitted symbols, as estimated, is multiplied term-by-corresponding term by a DFT characterizing the ideal reception channel with Nyquist roll-off for minimizing inter-symbol interference (ISI), which latter DFT is read from read-only memory in the receiver. The DFT defined by the products resulting from this term-by-corresponding term multiplication describes the DFT of the desired adaptive filter response to the adaptive filtering input signal. The DFT of the adaptive filtering response to a unit impulse input signal that is needed for equalization and echo-suppression of the actual reception channel response is computed by dividing each term of the DFT of the desired adaptive filter response to a plurality of successive samples of adaptive filtering input signal by the corresponding term of the DFT of the plurality of successive samples of adaptive filtering input signal, as delayed to compensate for the latent delay of the adaptive filter. The inverse discrete Fourier transform (IDFT) of the DFT of the adaptive filtering response specifies in the time domain the kernel of the adaptive transversal filtering for equalization and echo-suppression. Of course, owing to the commutative and associative properties of multiplication and division processes, at least one variation of this procedure exists and produces an equivalent result.

Another species of the novel equalization technique is implemented with adaptive filtering that uses a parallel-bank analysis filter for determining the DFT of the adaptive filtering input signal; combining circuitry for multiplying the DFT of that input signal term-by-corresponding-term with the DFT of the adaptive filtering response that is needed for equalization and echo-suppression of the actual reception channel response, thereby to generate the DFT of the adaptive filtering output signal; and a synthesis filter for generating the adaptive filtering output signal from its DFT, by inverse-DFT computation. The adaptive filtering output signal is supplied to the symbol decoder, which estimates the symbols transmitted from the transmitter. The DFT of these estimates is calculated and is then processed together with the DFT of the adaptive filtering input signal for generating the DFT of the adaptive filtering response that is needed for equalization and echo-suppression of the actual reception channel response.

Passband equalization is done in accordance with further aspects of the invention, using procedures similar to the procedures for baseband equalization described in the foregoing two paragraphs.

DETAILED DESCRIPTION

Figure 1:
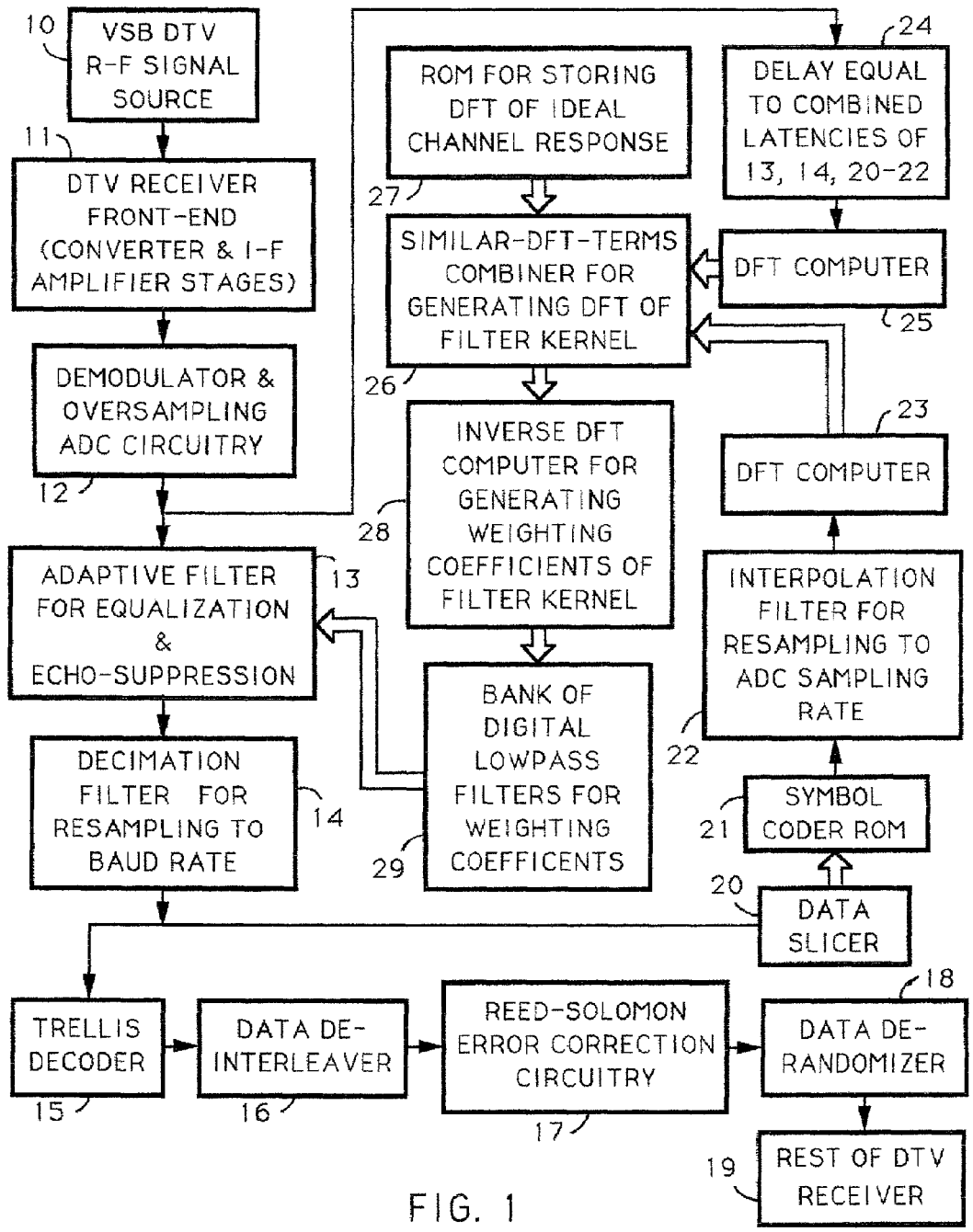
FIG. 1 is a schematic diagram of a novel digital television receiver, which uses adaptive filtering of real-only signal as sampled at higher than baud rate, and which uses data slicing of the adaptive filtering response to generate estimates of actually transmitted VSB DTV signal symbols.

In the FIG. 1 digital television receiver apparatus a source 10 of radio-frequency vestigial-sideband digital television signal, which typically is an antenna for receiving that R-F VSB DTV signal as broadcast over the air from a terrestrial transmitter, supplies that R-F VSB DTV signal to a DTV receiver front-end 11. The DTV receiver front-end 11 typically comprises a radio-frequency (R-F) amplifier, an up-converter for converting the amplified R-F VSB DTV signal from the R-F amplifier to an ultra-high-frequency (UHF) VSB DTV signal with a carrier frequency around 920 MHz, a UHF intermediate-frequency amplifier, a down-converter for converting the amplified UHF VSB DTV signal from the UHF I-F amplifier to a very-high-frequency (VHF) VSB DTV signal in a 41–47 MHz frequency range, and an automatic-gain-controlled VHF intermediate-frequency amplifier. Several alternative designs for the DTV receiver front-end 11 are known. In a plural-conversion receiver the final-intermediate-frequency VSB DTV signal may repose in a frequency range lower than the 41–47 MHz frequency range, such as 21–27 MHz, to facilitate digitization of the final-intermediate-frequency VSB DTV signal followed by demodulation in the digital regime. Triple-conversion receivers in which down-conversion to a VHF VSB DTV signal in the 41–47 MHz frequency range is followed by a further down conversion to a low-band intermediate-frequency band offset from zero-frequency by a megahertz or so are favored by some DTV receiver designers.

FIG. 1 shows the DTV receiver front-end 11 connected for supplying final-I-F VSB DTV signal to demodulator and over-sampling analog-to-digital conversion circuitry 12. The circuitry 12 can take any one of several known forms. The final-I-F VSB DTV signal can be digitized prior to demodulation in the digital regime, as noted in the previous paragraph. Alternatively, the final-I-F VSB DTV signal is not digitized and is instead demodulated in the analog regime, after which the baseband demodulation results are digitized. The order in which the demodulation and analog-to-digital conversion of the VSB DTV signal is done in the circuitry 12 is not of material consequence to the FIG. 1 embodiment of the invention, in which only the real component of demodulated signal is supplied to an adaptive filter 13 for equalization and echo-suppression. The digital samples of the real component of demodulated signal supplied to the adaptive filter 13 should be generated at a sampling rate higher than baud rate, or symbol rate, of the transmitted DTV signal. Otherwise, the VSB DTV signal as received with dynamic multipath distortion will be under-sampled, because of the angular modulation caused by dynamic multipath distortion. Generating the digital samples of the real component of demodulated signal supplied to the adaptive filter 13 at twice baud rate will assure that the Nyquist criterion for adequate sampling is met irrespective of the changes in the phasing of the received DTV signal owing to multipath distortion.

The I-F amplifiers of the FIG. 1 DTV receiver limit the amount of excess-bandwidth available for phase-modulation sidebands, so sampling at rates somewhat lower than twice baud rate is probably sufficient. The experience of others in digital communications receivers indicates that sampling at four-thirds baud rate to implement (¾)-symbol-epoch fractional equalization provides substantially as good performance as sampling at twice baud rate to implement (½)-symbol-epoch fractional equalization. See page 535 of *Data Communications Principles* by Gillin, Hayes & Weinstein, copyright 1992 to Plenum Press of New York and London.

FIG. 1 shows the response of the adaptive filter 13 used for equalization and echo-suppression being supplied to decimation filter circuitry 14 for resampling to baud rate. FIG. 1 shows the decimation filter circuitry 14 connected for supplying its response to a trellis decoder 15 of the twelve-phase type conventionally employed in an ATSC VSB DTV receiver. The trellis decoder 15 supplies data resulting from symbol decoding to a data de-interleaver 16, which undoes the convolutional interleaving done at the ATSC VSB DTV over-the-air (OTA) broadcast transmitter, so as to disperse extended-duration noise bursts that result from excitation of the I-F amplifiers by impulse noise. The data de-interleaver 16 is connected to supply de-interleaved data in bytes to circuitry 17 for correcting errors in response to Reed-Solomon forward error correction coding contained in the de-interleaved data. The circuitry 17 is connected to supply error-corrected data to a data de-randomizer 18, which regenerates the stream of data packets supplied to the ATSC VSB DTV broadcast transmitter for over-the-air broadcasting. This stream of data packets is supplied to the rest 19 of the FIG. 1 ATSC VSB DTV receiver, which selects data packets descriptive of compressed video to an MPEG-2 decoder, selects data packets descriptive of audio to an AC-3 decoder, and performs the other functions of processing the video and audio for presentation or for recording to be presented at a later time. In sum, elements 15–19 function similarly to the way such elements function in other ATSC VSB DTV receivers previously known.

Consider now how the weighting coefficients in the kernel of the adaptive filter 13 are determined in accordance with the invention. The decimation filter circuitry 14 response is supplied to a data slicer 20, which detects data slices by a "hard"-decision symbol decoding method. The data slicer 20 supplies its "hard"-decision symbol decoding results as input addressing to a read-only memory 21 that recodes these decoding results using ideal symbol code levels. The symbol coder ROM 21 output signal provides estimates of the symbols that were actually transmitted by the VSB DTV OTA broadcast transmitter. The boundaries of the data slicing by the data slicer 20 preferably take into account the pilot carrier accompanying the received symbols. That is, the boundaries of the data slicing by the data slicer 20 are asymmetrically disposed relative to the zero-energy axis for detecting normalized modulation levels of −5.75, −3.75, −1.75, +0.25, +2.25, +4.25, +6.25, +8.25 nominal values. Such data slicing facilitates arrangements for extracting automatic frequency and phase control (AFPC) information from the adaptive filter 13 response for controlling the local oscillations used to synchrodyne the VSB DTV signal to base band in synchronous demodulator portions of the circuitry 12.

However, in other embodiments of the invention the low-frequency portion of the adaptive filter 13 input signal near zero frequency may be removed in the demodulator and ADC circuitry 12. In such case the boundaries of the data slicing by the data slicer 20 take into account the received symbols not being accompanied by pilot carrier and are symmetrically disposed relative to the zero-energy axis for detecting normalized modulation levels of −7, −5, −3, −1, +1, +3, +5, +7 nominal values.

The estimates of actually transmitted symbols provided by the symbol coder ROM 21 are supplied to interpolation filter circuitry 22 for re-sampling back to the sampling rate used in the adaptive filter 13. DFT computation circuitry 23 computes the discrete Fourier transform (DFT) of the estimation of the signal that the VSB DTV OTA broadcast transmitter actually transmitted to the FIG. 1 VSB DTV receiver, as supplied by the interpolation filter circuitry 22.

The estimation of the signal that the VBS DTV OTA broadcast transmitter actually transmitted to the FIG. 1 VSB DTV receiver, as supplied by the interpolation filter circuitry 22, is delayed respective to the actually received signal supplied from the demodulator and over-sampling analog-to-digital conversion circuitry 12 to the adaptive filter 13 as input signal thereto. The input signal to the adaptive filter 13 is subjected to compensatory digital delay 24 equal to the combined latent delays of the adaptive filter 13, the decimation filter circuitry 14, the data slicer 20, the symbol coder ROM 21 and the interpolation filter circuitry 22. DFT computation circuitry 25 computes the discrete Fourier transform (DFT) of the delayed input signal to the adaptive filter 13 that the compensatory digital delay 24 provides.

Combining circuitry 26 combines the DFTs generated by the DFT computation circuitry 23 and the DFT computation circuitry 25 with the DFT of ideal channel response as supplied from read-only memory 27 to generate the DFT of the adaptive filter 13 kernel weighting coefficients. This ideal channel response is a lowpass filter response with Nyquist slope raised-cosine roll-off to minimize intersymbol interference (ISI). This lowpass filter response has flat low-frequency response near zero frequency in some embodiments of the invention.

In other embodiments of the invention this lowpass filter response has boosted low-frequency response near zero frequency. This latter arrangement boosts the low-frequency response of the adaptive filter 13 near zero frequency as well, which facilitates arrangements for extracting automatic frequency and phase control (AFPC) information from the adaptive filter 13 response for controlling the local oscillations used to synchrodyne the VSB DTV signal to base band in synchronous demodulator portions of the circuitry 12. The low-frequency boost of the adaptive filter 13 response near zero frequency is then removed by suitable finite-impulse-response (FIR) digital filtering to generate a response suitable for application as input signal to the trellis decoder 15 and to the data slicer 20. The latency of this FIR digital filter as well as the combined latent delays of the adaptive filter 13, the decimation filter circuitry 14, the data slicer 20, the symbol coder ROM 21 and the interpolation filter circuitry 22 is then compensated for by the compensatory digital delay 24.

The combining circuitry 26 supplies the DFT of the adaptive filter 13 kernel weighting coefficients that it generates to an inverse discrete Fourier transform computer 28. The I-DFT computer 28 generates the time-domain adaptive filter 13 kernel weighting coefficients corresponding to the DFT supplied by the combining circuitry 26. These adaptive filter 13 kernel weighting coefficients in the time domain are supplied to respective ones of a bank 29 of digital lowpass filters. In some designs the digital lowpass filters are of finite-impulse-response (FIR) type; in other designs the digital lowpass filters are infinite-impulse-response (IIR) type. This bank 29 of digital lowpass filters suppresses fluctuations in the values of the adaptive filter 13 kernel weighting coefficients caused by noise. The noise comprises quantization noise generated in the digital portion of the receiver, Johnson noise from the analog portion of the receiver, impulse noise in the reception channel and possibly co-channel interference from NTSC analog television signals or from other ATSC DTV signals. The bank 29 of digital lowpass filters supplies the lowpass-filtered adaptive filter 13 kernel weighting coefficients to coefficient registers in the adaptive filter 13 to be used as multiplier input signals by digital multipliers in the adaptive filter 13. The adaptive filter 13 is presumed to have the canonic transversal filter structure in which a tapped digital delay line supplies differently delayed tap responses to the adaptive filter 13 input signal for application to the digital multipliers as multiplicand input signals, and in which the products from the digital multipliers are summed to generate the adaptive filter 13 output signal.

Figure 2:
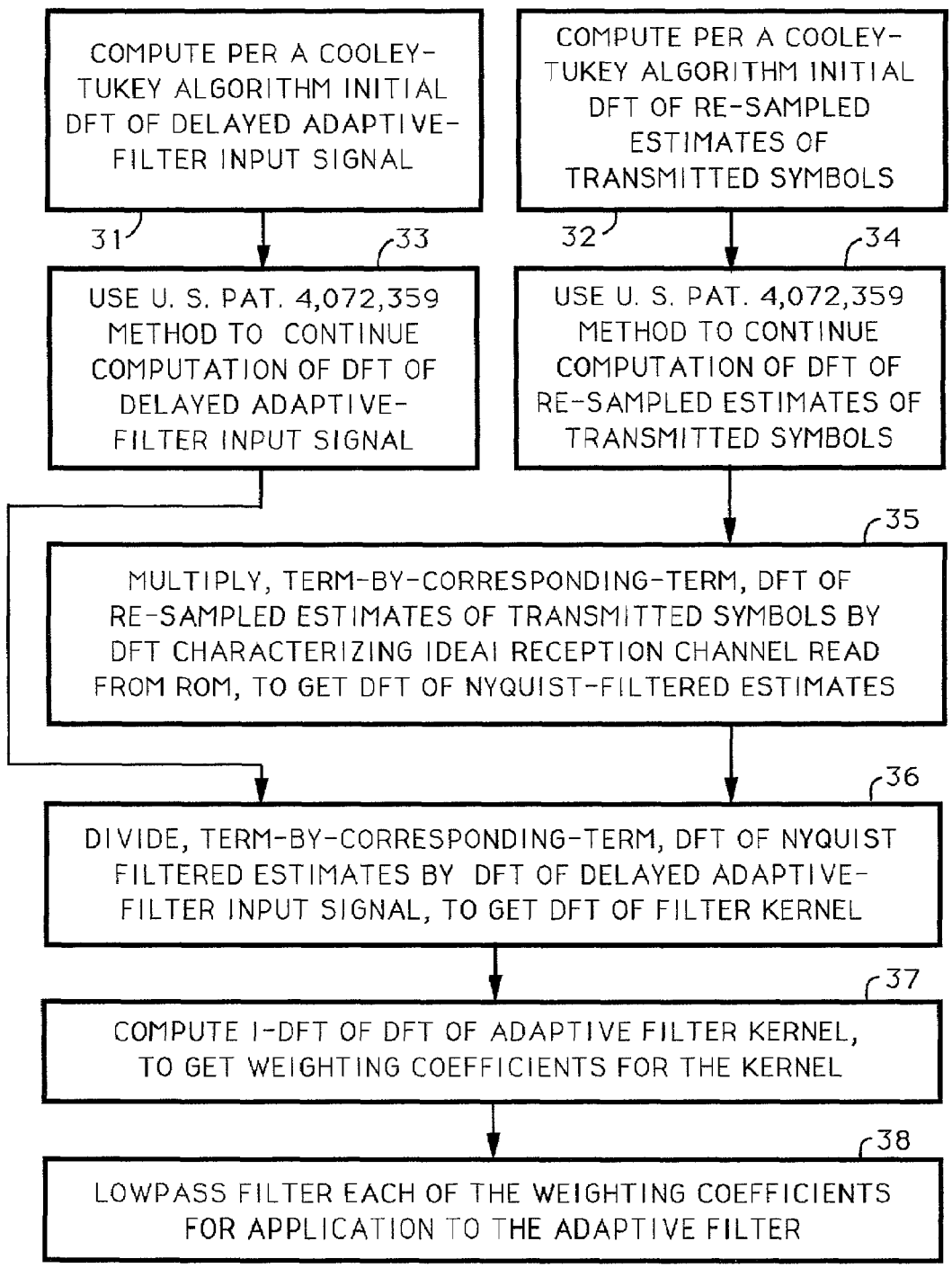
FIG. 2 is a flow chart of a novel method that can be used in the FIG. 1 or FIG. 3 DTV receiver for computing the kernel weighting coefficients of the adaptive filtering used for equalization and echo-suppression.

FIG. 2 is a flow chart showing in more detail a method 30 comprising steps 31–38 by which the adaptive filter 13 kernel weighting coefficients can be calculated in the FIG. 1 DTV receiver. Initially, the DFT of the delayed adaptive-filter 13 input signal supplied from the compensatory digital delay 24 is computed by the DFT computer 25 in the step 31 using a fast Fourier transform algorithm of the well-known Cooley-Tukey type, and the estimation of the actually transmitted signal as re-sampled by the interpolation filter 22 is computed by the DFT computer 23 in the step 32. Following the step 31, the DFT of the delayed adaptive-filter 13 input signal is continuously re-computed by the DFT computer 25 in a repeated updating step 33 using a Fourier-shift method such as disclosed by K. B. Welles II and R. I. Hartley in their U.S. Pat. No. 4,972,358. Following the step 32 using a fast Fourier transform algorithm of the well-known Cooley-Tukey type for initial computation of the DFT of the interpolation filter 22 response, the DFT of the interpolation filter 22 response is continuously re-computed in a repeated updating step 34 performed by the DFT computer 23 using the same Fourier-shift method that the DFT computer 25 uses in performing the repeated updating step 33.

The combiner 26 performs the steps 35 and 36 of the method 30. In the step 35, the DFT of the interpolation filter 22 response as computed by the steps 32 and 34 is multiplied term-by-corresponding-term by the DFT of the frequency spectrum of the system function for the ideal reception channel, which latter DFT is extracted from the ROM 27. The step 35 generates a DFT of Nyquist filtering response to the estimation of the baseband modulating signal sent from the transmitter. In the step 36, the DFT generated in the step 35 is divided term-by-corresponding-term by the DFT of the delayed adaptive-filter 13 input signal, as computed by the steps 31 and 33. The step 36 generates a DFT that defines in the frequency domain the ideal adaptive filter 13 kernel weighting coefficients in the time domain. Divisors that are so small they would cause out-of-range quotients should be augmented in the step 36 division procedures. The multiplications in step 35 and the divisions in step 36 can be performed logarithmically using tables stored in read-only memory, for example. In an alternative design approach the ROM 27 is dispensed with, and the steps 35 and 36 are merged into a single step implemented by read-only memory.

In step 37 the computer 28 computes the inverse-DFT of this DFT of the ideal adaptive filter 13 kernel weighting coefficients in the frequency domain to obtain the weighting coefficients for the adaptive filter 13 kernel. During initialization or re-initialization, these weighting coefficients can be directly applied to the weighting coefficients register(s) of the adaptive filter 13 to speed up initialization or re-initialization as much as possible. Generally, however, in the step 38 each of the weighting coefficients is lowpass filtered for reducing the effects of noise before being supplied to the weighting coefficients register(s) of the adaptive filter 13, this lowpass filtering being done by the bank 29 of digital lowpass filters.

The DFT computations using a Fourier-shift method are performed on a "sliding-window" in which the window for the DFT calculation advances one sample time each time DFTs are re-calculated. Since the Mar. 30, 2000, filing of provisional U.S. patent application serial No. 60/193,301, it was determined from simulations conducted by one of the inventors that the computation of DFTs on a sliding-window basis is not necessary, at least for reception with stationary receiving antennas. Instead, successive independent computations of DFTs can be done on a consecutive block-after-block basis. Excellent echo-suppression has been obtained using DFTs extracted from successive 2048-symbol-epoch blocks of baseband DTV signal and successive 2048-symbol-epoch blocks of estimated DTV modulating signal. The blocks of baseband DTV signal and the blocks of estimated DTV modulating signal had to contain substantially fewer symbol epochs for the equalization procedure to be started up from the data field synchronizing signal specified in ATSC Document A/53. If data fields are modified to include three data segments of a repetitive-PN1023 sequence with baud-rate symbols, the equalization procedure will start up using successive 2048-symbol-epoch blocks of baseband DTV signal and successive 2048-symbol-epoch blocks of estimated DTV modulating signal.

Figure 3:
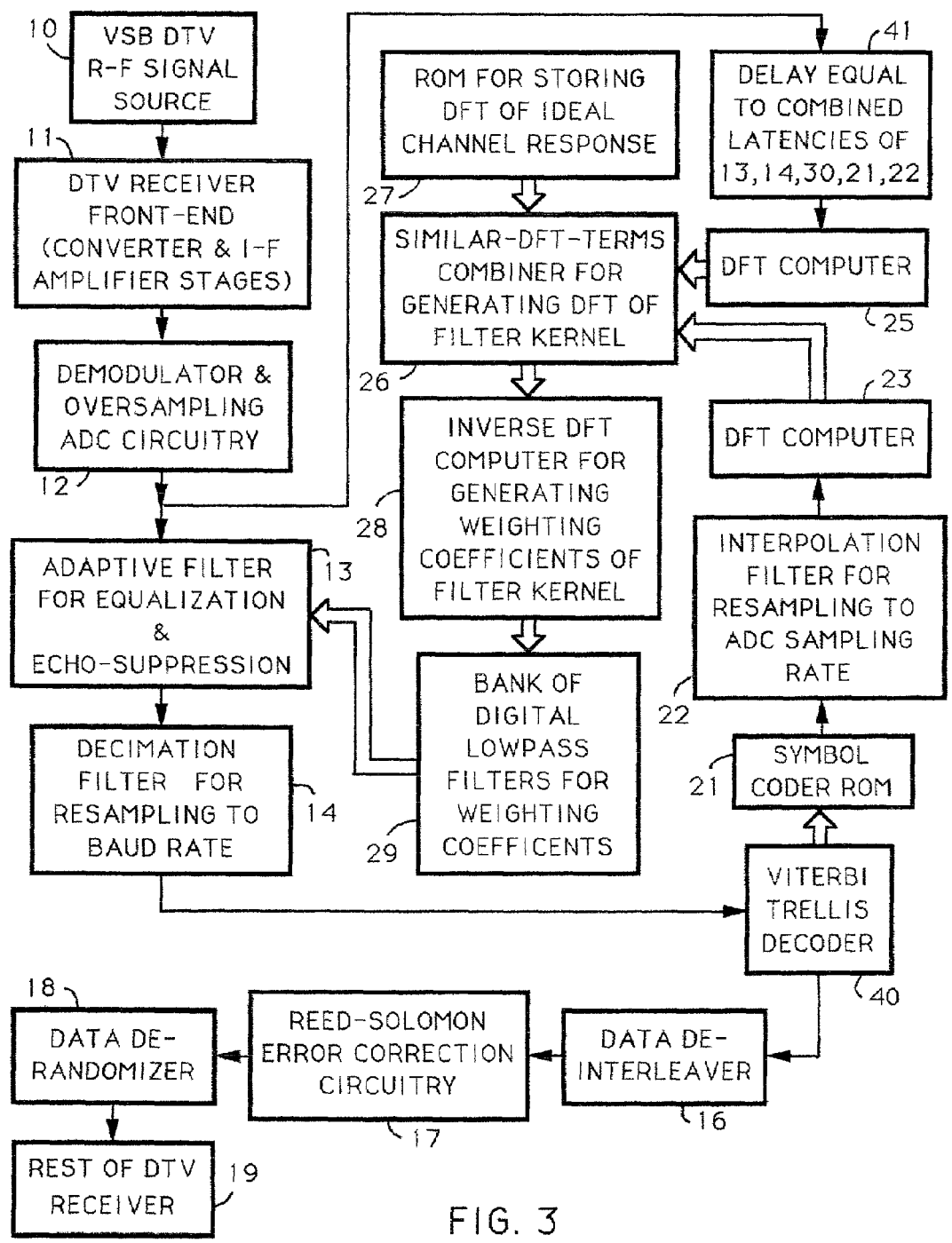
FIG. 3 is a schematic diagram of a novel digital television receiver, which uses adaptive filtering of real-only signal as sampled at higher than baud rate, and which uses Viterbi decoding of the adaptive filtering response to generate estimates of actually transmitted VSB DTV signal symbols.

FIG. 3 diagrams a DTV receiver that differs from the FIG. 1 DTV receiver in that it does not use data slicing of the adaptive filtering response to generate, in accordance with the so-called "hard"-decision technique, the input addressing of the symbol coder ROM 21 used for estimating actually transmitted VSB DTV signal symbols. Instead, the FIG. 2 DTV receiver employs Viterbi decoding of the adaptive filtering response response to generate, in accordance with the so-called "soft"-decision technique, the input addressing of the symbol coder ROM 21. The trellis decoder 15 shown generally in FIG. 1 is more particularly shown in FIG. 2 as a Viterbi-type trellis decoder 40.

Subsection 4.2.5 of ATSC Document A/53 Annex D I entitled "Trellis coding" and prescribes a trellis coder for use in a DTV transmitter. The FIG. 2 DTV receiver could be modified to use such a trellis coder for responding to the data that the Viterbi-type trellis decoder 40 generates for application to the data de-interleaver 16, the trellis coder generating a symbol stream for application to the interpolation filter 22 as its respective input signal. Rather than using a trellis coder to generate the symbol stream applied to the interpolation filter 22 as its respective input signal, however, FIG. 2 shows preliminary data-slicing results being extracted from the Viterbi-type trellis decoder 40 for application to the symbol coder ROM 21 as input addressing. The compensatory digital delay 24 is replaced by compensatory digital delay 41 providing delay compensating for the combined latent delays of the adaptive filter 13, the decimation filter circuitry 14, the Viterbi-type trellis decoder 40 up to its preliminary data-slicing results output port, the symbol coder ROM 21, and the interpolation filter circuitry 22.

Figure 4:
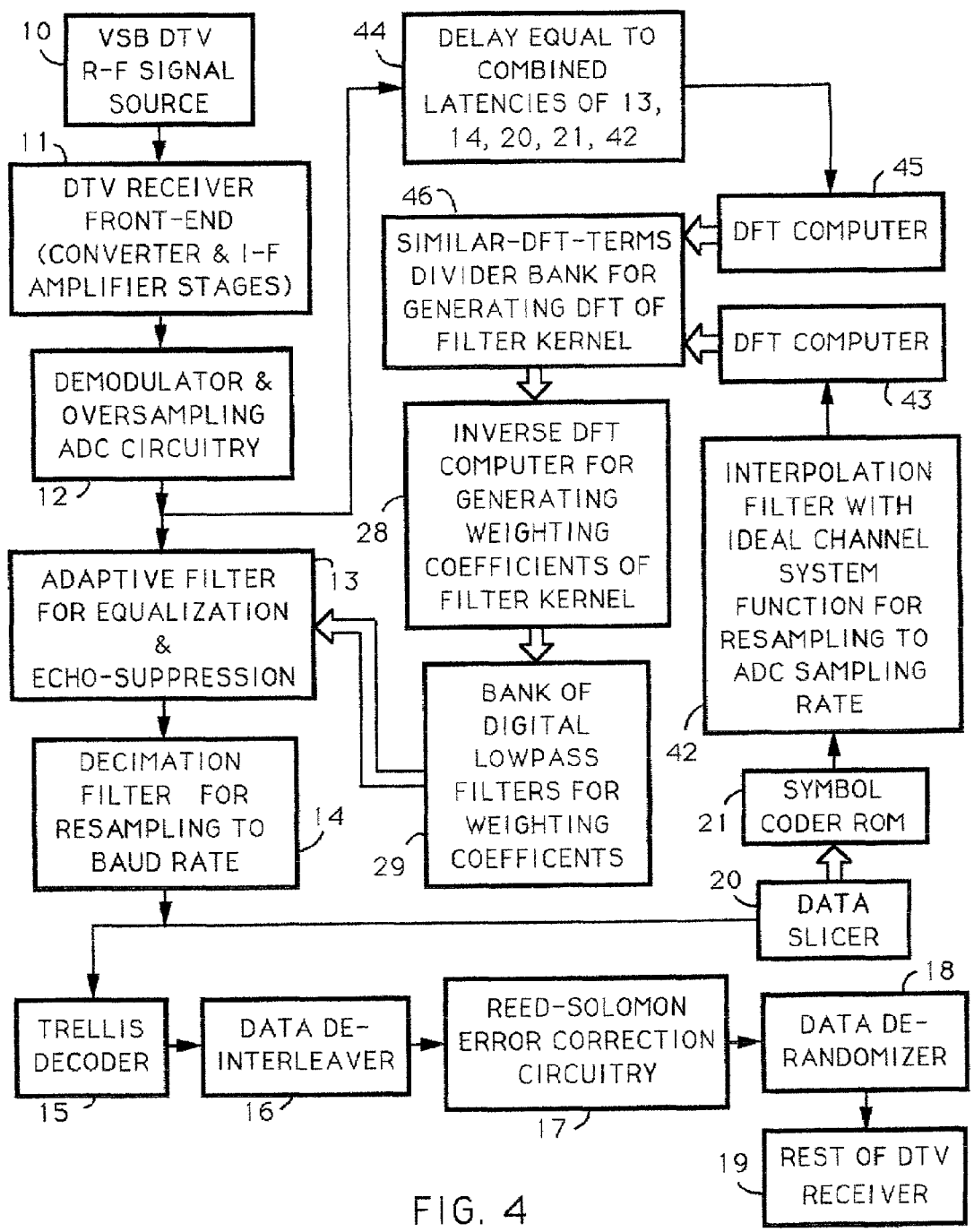
FIG. 4 is a schematic diagram of a novel digital television receiver that is a modification of the FIG. 1 DTV receiver.

FIG. 4 diagrams a DTV receiver that differs from the FIG. 1 DTV receiver in that an interpolation filter 42, which is an FIR digital filter with a system function that corresponds to the ideal channel system response, replaces the interpolation filter 22 with a system function that includes lowpass filtering for suppressing aliasing engendered by re-sampling to higher sample rate, but not otherwise affecting the data slicer 20 response. The DFT computer 23 used in the FIG. 1 DTV receiver to compute the DFT of the interpolation filter 22 response is replaced in the FIG. 4 DTV receiver by a DFT computer 43 of similar construction, used to compute the DFT of the interpolation filter 42 response. The digital delay 24 of the FIG. 1 DTV receiver is replaced in the FIG. 4 DTV receiver by a compensatory digital delay 44 for delaying the adaptive filter 13 input signal so as to be in temporal alignment with the interpolation filter 42 response. That is, the digital delay 44 compensates for the combined latent delays of the adaptive filter 13, the decimation filter circuitry 14, the data slicer 20, the symbol coder ROM 21 and the interpolation filter 42. The DFT computer 25 used in the FIG. 1 DTV receiver to compute the DFT of the adaptive filter 13 input signal as delayed by the digital delay 24 is replaced in the FIG. 4 DTV receiver by a DFT computer 45 of similar construction, used to compute the DFT of adaptive filter 13 input signal as delayed by the digital delay 44. The DFT combiner 26 of the FIG. 1 DTV receiver is replaced in the FIG. 4 DTV receiver by a similar-DFT-terms divider bank 46 for dividing the DFT of the interpolation filter 42 response, as computed by the DFT computer 43, term-by-corresponding-term from the DFT of the digital delay 44 response to the adaptive-filter 13 input signal, as computed by the DFT computer 45. These term-by-corresponding-term divisions by the similar-DFT-terms divider bank 46 generate a DFT that defines in the frequency domain the ideal adaptive filter 13 kernel weighting coefficients in the time domain.

The similar-DFT-terms divider bank 46 supplies the DFT of the adaptive filter 13 kernel weighting coefficients that it generates to the I-DFT computer 28. The I-DFT computer 28 generates the time-domain adaptive filter 13 kernel weighting coefficients corresponding to the DFT supplied by the similar-DFT-terms divider bank 46. In the FIG. 4 DTV receiver, as in the FIG. 1 DTV receiver, these adaptive filter 13 kernel weighting coefficients in the time domain are supplied to respective ones of a bank 29 of digital lowpass filters which suppress fluctuations in the values of the adaptive filter 13 kernel weighting coefficients caused by noise.

Figure 5:
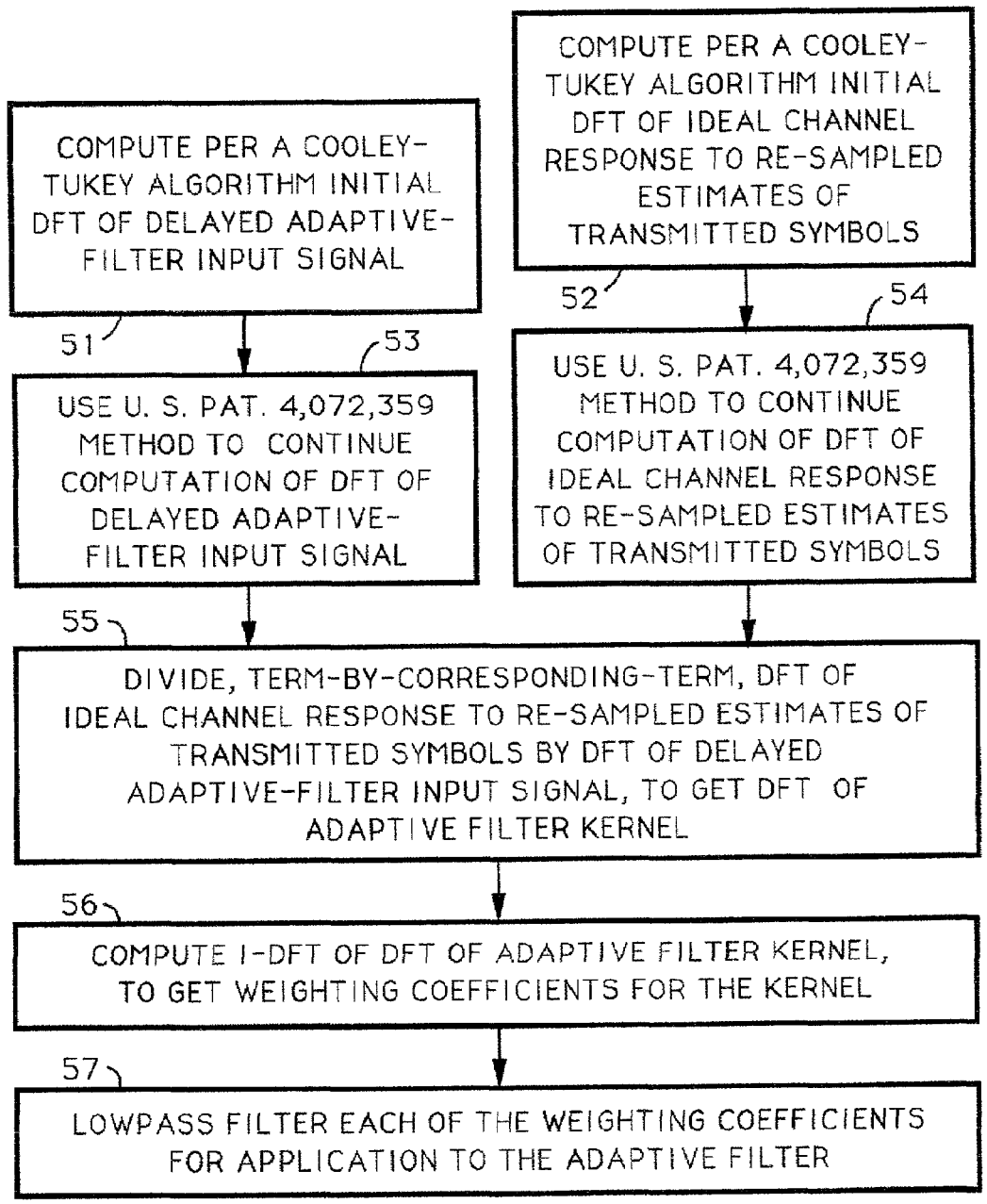
FIG. 5 is a flow chart of a novel method that can be used in the FIG. 4 or FIG. 6 DTV receiver for computing the kernel weighting coefficients of the adaptive filtering used for equalization and echo-suppression.

FIG. 5 is a flow chart showing in more detail a method 50 comprising steps 51–57 by which the adaptive filter 13 kernel weighting coefficients can be calculated in the FIG. 4 DTV receiver. Steps 51, 53, 56 and 57 of the method 50 respectively correspond to the steps 31, 33, 37 and 38 of the method 30. Initially in the method 50, the DFT of the delayed adaptive-filter 13 input signal supplied from the compensatory digital delay 44 is computed by the DFT computer 45 in the step 51 using a fast Fourier transform algorithm of the well-well Cooley-Tukey type, and the estimation of the actually transmitted signal as re-sampled and lowpass filtered with ideal channel system function by the interpolation filter 42 is computed by the DFT computer 43 in the step 52. Following the step 51, the DFT of the delayed adaptive-filter 13 input signal is continuously re-computed by the DFT computer 45 in a repeated updating step 53 using a Fourier-shift method such as described in U.S. Pat. No. 4,972,358. Following the step 52 using a fast Fourier transform algorithm of the well-known Cooley-Tukey type for initial computation of the DFT of the interpolation filter 42 response, the DFT of the interpolation filter 42 response is continuously re-computed in a repeated updating step 54 performed by the DFT computer 43 using the same Fourier-shift method that the DFT computer 45 uses in performing the repeated updating step 53.

The similar-DFT-terms divider bank 46 performs the step 55 of the method 50. In the step 55, the DFT of the interpolation filter 42 response as computed by the steps 52 and 54 is divided term-by-corresponding-term by the DFT of the delayed adaptive-filter 13 input signal as computed by the steps 51 and 53. These divisions in the step 55 generate a DFT that defines in the frequency domain the dieal adaptive filter 13 kernel weighting coefficients in the time domain. Divisors that are so small they would cause out-of-range quotients should be augmented in these division procedures. The divisions in step 55 can be performed logarithmically using tables stored in read-only memory, for example.

The computer 28 computes the inverse-DFT of this DFT in step 56 to obtain weighting coefficients for the adaptive filter 13 kernel. During initialization or re-initialization, these weighting coefficients can be directly applied to the weighting coefficients register(s) of the adaptive filter 13 to speed up initialization or re-initialization as much as possible. Generally, however, in the step 57 each of the weighting coefficients is averaged over some time for reducing the effects of noise before being supplied to the weighting coefficients register(s) of the adaptive filter 13, this averaging being done by the bank 29 of digital lowpass filters.

Figure 6:
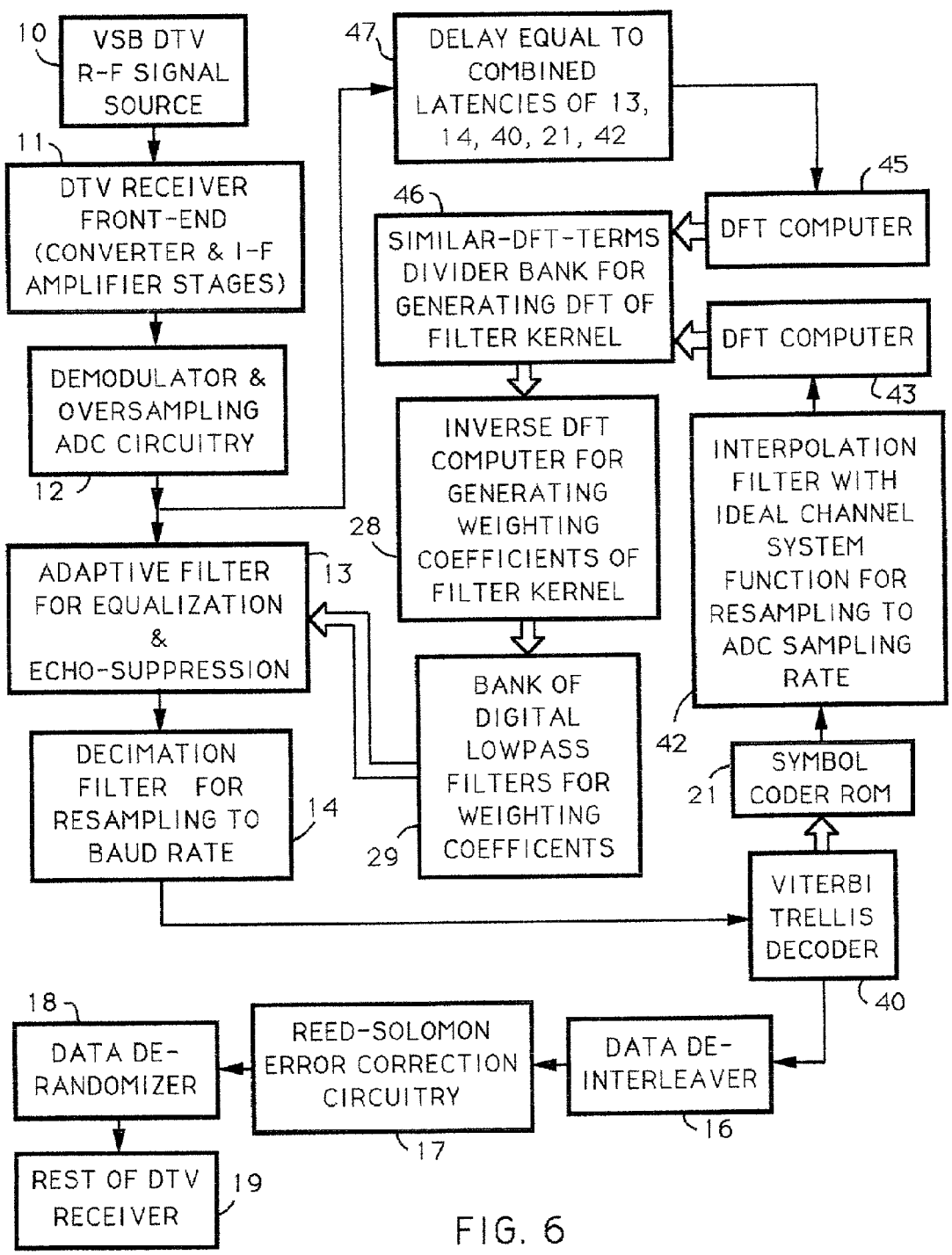
FIG. 6 is a schematic diagram of a novel digital television receiver that is a modification of the FIG. 3 DTV receiver.

FIG. 6 diagrams a DTV receiver that differs from the FIG. 4 DTV receiver in that it does not use data slicing of the adaptive filtering response to generate, in accordance with the so-called "hard"-decision technique, the input addressing of the symbol coder ROM 21 used for estimating actually transmitted VSB DTV signal symbols. Instead, the FIG. 6 DTV receiver employs Viterbi decoding of the adaptive filtering response response to generate, in accordance with the so-called "soft"-decision technique, the input addressing of the symbol coder ROM 21. The trellis decoder 15 shown generally in FIG. 4 is more particularly shown in FIG. 6 as a Viterbi-type trellis decoder 40. Rather than using a trellis coder to generate the symbol stream applied to the interpolation filter 42 as its respective input signal, FIG. 6 shows preliminary data-slicing results being extracted from the Viterbi-type trellis decoder 40 for application to the symbol coder ROM 21 as input addressing. The compensatory digital delay 44 is replaced by compensatory digital delay 47 providing delay compensating for the combined latent delays of the adaptive filter 13, the decimation filter circuitry 14, the Viterbi-type trellis decoder 40 up to its preliminary data-slicing results output port, the symbol coder ROM 21 and the interpolation filter circuitry 42.

The symbol coder ROM 21 used in the DTV signal receivers of FIGS. 1 and 4 includes circuitry for parsing data supplied from the data slicer 20 into input addressing for the read-only memory. Parsing can be done relying on hand-shake techniques with the data slicer 20, or by relying on a data count supplied from the receiver data synchronizing circuitry. The symbol coder ROM 21 used in the DTV signal receivers of FIGS. 3 and 6 includes circuitry for parsing data supplied from the Viterbi trellis decoder 40 into input addressing for the read-only memory. Parsing can be done relying on hand-shake techniques with the Viterbi trellis decoder 40, or by relying on a data count supplied from the receiver data synchronizing circuitry.

The data synchronizing circuitry is not particularly material to the invention and so is omitted from the drawing to avoid clutter therein. The data synchronizing circuitry usually comprises counters with counts reset responsive to pseudorandom noise sequences in the data field synchronizing signal and possibly to data segment synchronizing signal. These synchronizing signals are preferably drawn from the over-sampled adaptive filter 13 response, before its decimation. The synchronizing signal should be over-sampled to avoid the loss of important phase information.

As noted in the BACKGROUND OF INVENTION, the ultimate limit on how rapidly the weighting coefficients in the kernel of an auto-regressive type of adaptive filtering can be re-initialized after loss of tracking is determined by the desideratum that re-initialization of the weighting coefficients should be deferred until the data on which their computation is based exit the kernel storage register(s) of the adaptive filtering. A similar ultimate limit applies to the types of adaptive filtering shown in FIGS. 1, 3, 4 and 6, since the DFT of the adaptive filtering response is necessary to the computation of the weighting coefficients in the kernel of the adaptive filtering. The adaptation of the types of adaptive filtering shown in FIGS. 1, 3, 4 and 6 is faster than auto-regressive adaptive filtering response taking much less time. This is also noted in the BACKGROUND OF INVENTION.

Figure 7:
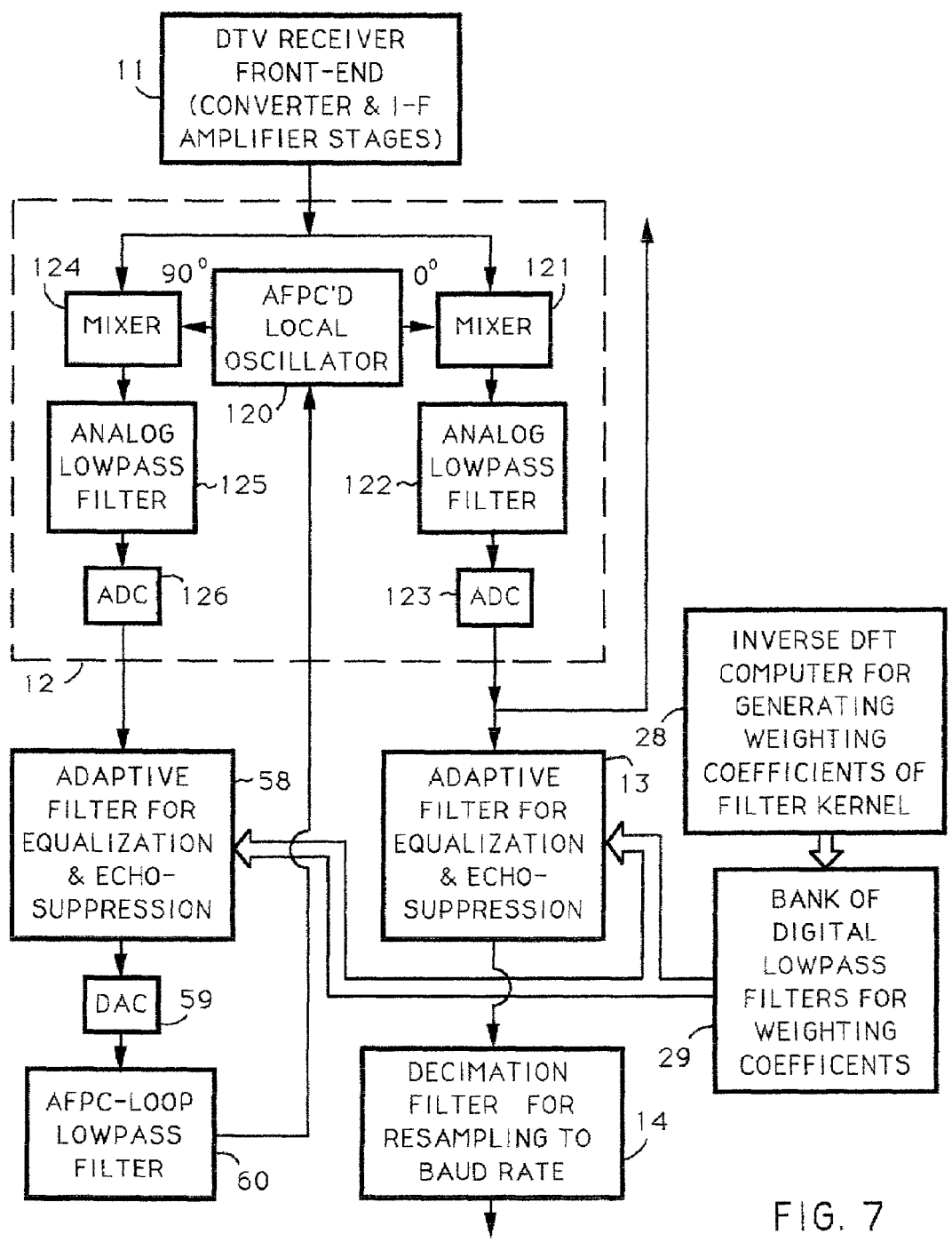
FIG. 7 is a schematic diagram showing in detail demodulator and over-sampling analog-to-digital conversion circuitry that can be incorporated in any of the digital television receivers of FIGS. 1, 3, 4 and 6.

FIG. 7 shows in detail one form of the demodulator and over-sampling analog-to-digital conversion circuitry 12 used in the DTV receiver of FIGS. 1, 3, 4 or 6. A local oscillator 120 is subject to automatic frequency and phase control (AFPC) of its local oscillations, which are used in down-converting to baseband the amplified intermediate-frequency signal supplied from the DTV receiver front-end 11. The local oscillator 120 supplies its oscillations in 0° phasing to a mixer 121 for mixing with the amplified I-F signal the DTV receiver front-end 11 supplies to the mixer 121. The mixer 121 output signal is applied as input signal to an analog lowpass filter 122. The lowpass filter 122 selectively responds to a baseband down-conversion component of the mixer 121 output signal, but does not respond to the image up-conversion component of the mixer 121 output signal. An over-sampling analog-to-digital converter 123 digitizes the lowpass filter 122 response to generate digitized in-phase baseband signal supplied as input signal to the adaptive filter 13 for equalization and echo-suppression.

The local oscillator 120 supplies its oscillations in 90° phasing to a mixer 124 for mixing with the amplified I-F signal the DTV receiver front-end 11 supplies to the mixer 124. The mixer 124 output signal is applied as input signal to an analog lowpass filter 125. The lowpass filter 125 selectively responds to a baseband down-conversion component of the mixer 124 output signal, but does not respond to the image up-conversion component of the mixer 124 output signal. An over-sampling analog-to-digital converter 126 digitizes the lowpass filter 125 response to generate digitized quadrature-phase baseband signal supplied as input signal to an adaptive filter 58 for equalization and echo-suppression. The adaptive filter 13 and the adaptive filter 58 have similar kernels, both receiving updated weighting coefficients from the bank 29 of digital lowpass filters in response to the time-domain kernel weighting coefficients that the I-DFT computer 28 generates. The response of the adaptive filter 58 is equalized, echo-free, imaginary-only baseband DTV signal. A digital-to-analog converter 59 converts this signal to analog form for analog lowpass filtering by an AFPC-loop lowpass filter 60. The lowpass filter 60 response is supplied to the local oscillator 120 as its automatic frequency and phase control (AFPC) signal. This closes the AFPC feedback loop.

While the FIG. 7 arrangement uses duplicate adaptive filters 13 and 58, the tracking control of local oscillator phase reduces the need for over-sampling in the equalization and echo-suppression filtering. Alternatively, rather than using separate adaptive filters 13 and 58 for the baseband signals generated by in-phase and quadrature-phase demodulation, these baseband signals can be time-division-multiplexed for reflexing through a single dual-phase adaptive filter, and then demultiplexed for respective application to the decimation filter circuitry 14 and to the DAC 59. This alternative halves the number of digital multipliers required in the adaptive filtering for equalization and echo-suppression, but doubles the clocking rate required in the adaptive filtering, of course. There are also techniques known that can extract AFPC information from the adaptive filter 13 real-only response if at least 100% oversampling is used.

The DTV receivers of FIGS. 1, 3, 4 and 6 each employ baseband equalization and, when the carrier phase tracking methods described above with reference to FIG. 7 are used, the adaptive filtering 13 is included in the carrier-phase-tracker AFPC loop. There is general knowledge in the equalizer art that it is preferable to exclude the equalization and echo-suppression filter from the AFPC loop used for phase tracking, particularly if the filter is designed for suppressing long-delayed echoes. There is also general knowledge that passband equalization is a good general approach to employ in order to be able to exclude the adaptive filter from the AFPC loop.

Figure 8:
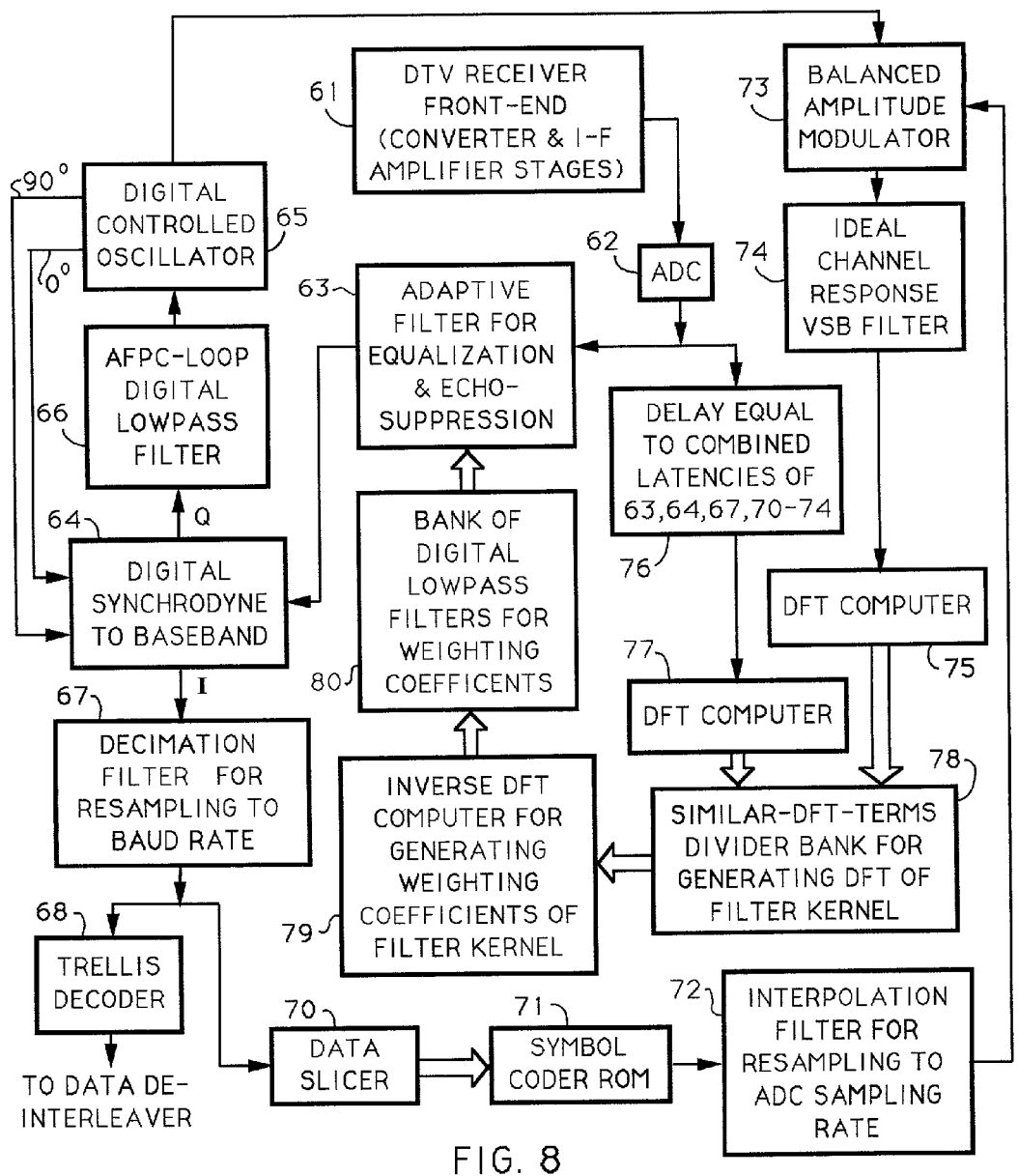
FIG. 8 is a schematic diagram of portions of a novel digital television receiver that employs an adaptive filter for passband equalization and echo-suppression, which adaptive filter has its kernel weighting coefficients computed in accordance with the invention.

FIG. 8 shows portions of a novel digital television receiver that employs an adaptive filter for passband equalization and echo-suppression, which adaptive filter has its kernel weighting coefficients computed in accordance with the invention. The DTV receiver front-end 61 amplifies received DTV signal and converts it in frequency to a low-band intermediate-frequency band offset from zero-frequency by a 500 kHz or so, in which low-band phase-splitting of the passband signal by digital filtering is feasible. The down-conversion is performed so the carrier is at the higher-frequency end of this low-band I-F band. However, because the DFT extends to zero frequency, the offset should not be too much more than 500 kHz or so, or a fairly large number of the lower-frequency spectral bins in the DFT will be empty of any information useful in DFT computations of kernel weighting coefficients of the adaptive filter. An over-sampling analog-to-digital converter 62 is connected for receiving the analog low-band intermediate-frequency signal supplied from the DTV receiver front-end 61 and digitizes that analog signal to generate digital input signal for an adaptive filter 63 for providing passband equalization and echo-suppression in its response to its digital input signal. This response is supplied to circuitry 64 for performing a complex digital synchrodyne to generate an in-phase baseband response I descriptive of real-only demodulated DTV signal and to generate an quadrature-phase baseband response Q descriptive of the imaginary-only Hilbert transform of the real-only demodulated DTV signal. This complex digital synchrodyne is supported by digital descriptions of local oscillations in 0° and 90° phasings supplied to the circuitry 64 from a digital controlled oscillator (DCO) 65. The quadrature-phase baseband response Q from the complex digital synchrodyne circuitry 64 is supplied to a digital lowpass filter 66, which supplies a response used by the DCO 65 for automatic frequency and phase control of the descriptions of local oscillations in 0° and 90° phasings the DCO 65 supplies to the circuitry 64. That is, the digital lowpass filter 66 is used as the principal filter in the AFPC loop for the complex digital synchrodyne. The in-phase baseband response I from the complex digital synchrodyne circuitry 64 is supplied to decimation filter circuitry 67 for resampling to baud rate.

FIG. 8 shows the decimation filter circuitry 67 connected for supplying its response to a trellis decoder 68, which is of the twelve-phase type conventionally employed in an ATSC VSB DTV receiver. The trellis coder 68 supplies symbol decoding results to further conventional portions of the ATSC VSB DTV receiver, which are of the sort previously described with regard to the FIG. 1 ATSC VSB DTV receiver. The decimation filter circuitry 67 is further connected for supplying its response to a data slicer 70 that detects data slices by a "hard"-decision symbol decoding method. The data slicer 70 supplies its "hard"-decision symbol decoding results as input addressing to a read-only memory 71 that recodes these decoding results using ideal symbol code levels. The symbol coder ROM 71 output signal provides estimates of the symbols that were actually transmitted by the VSB DTV OTA broadcast transmitter. The estimates of actually transmitted symbols provided by the symbol coder ROM 71 are supplied to interpolation filter circuitry 72 for re-sampling back to the sampling rate used in the adaptive filter 63. The response of the interpolation filter circuitry 72 is supplied as modulating input signal to a balanced amplitude modulator 73, which generates a double-sideband amplitude-modulation (DSB AM) signal for application to an ideal-channel-response vestigial-sideband filter 74. The VSB filter 74 not only suppresses the higher-frequency sideband of the DSB AM signal it receives as input signal, but also suppresses the lowest-frequency portions of the remaining sideband to establish the Nyquist slope for reducing inter-symbol interference (ISI). The VSB filter 74 response estimates the VSB signal actually transmitted by the transmitter. DFT computation circuitry 75 computes the DFT of the estimated VSB signal actually transmitted by the transmitter.

The balanced amplitude modulator 73 comprises a digital multiplier receiving, as its multiplicand and multiplier input signals, the symbol coder ROM 71 output signal and digitized carrier signal from the DCO 65. The phase of the digitized carrier signal is retarded from 0° to compensate for the combined latent delays of the adaptive filter 63, the digital synchrodyne circuitry 64, the decimation filter circuitry 67, the data slicer 70, the symbol coder ROM 71, the interpolation filter circuitry 72, the balanced amplitude modulator 73 and the VSB filter 74. The boundaries of the data slicing by the data slicer 70 preferably take into account the pilot carrier accompanying the received symbols. That is, the boundaries of the data slicing by the data slicer 70 are asymmetrically disposed relative to the zero-energy axis for detecting normalized modulation levels of −5.75, −3.75, −1.75, +0.25, +2.25, +4.25, +6.25, +8.25 nominal values. The symbol coder ROM 71 output signal augments the modulation level, as quantized to −5.75, −3.75, −1.75, +0.25, +2.25, +4.25, +6.25 and +8.25 values, with an offset designed to offset the roll-off of pilot carrier component that will occur in the VSB filter 74. The asymmetry of the modulation levels of the symbol coder ROM 71 output signal with regard to zero causes a direct component in the system response of this signal applied to the balanced amplitude modulator 73, which unbalances the modulator to insert a fixed-amplitude pilot carrier into its digitized DSB AM output signal. The symbol coder ROM 71 in the FIG. 8 DTV signal receiver includes circuitry for parsing data supplied from the data slicer 70 into input addressing for the read-only memory. Parsing can be done relying on handshake techniques with the data slicer 70, or by relying on a data count supplied from the receiver data synchronizing circuitry. The synchrodyne circuitry 64 supplies its in-phase output signal I to the receiver data synchronizing circuitry as input signal thereto.

The estimation of the signal that the VSB DTV OTA broadcast transmitter actually transmitted to the FIG. 8 VSB DTV receiver, as supplied by the VSB filter 74, is delayed respective to the actually received signal supplied from the over-sampling analog-to-digital conversion circuitry 62 to the adaptive filter 63 as input signal thereto. The input signal to the adaptive filter 63 is subjected to compensatory digital delay 76 equal to the combined latent delays of the adaptive filter 63, the digital synchrodyne circuitry 64, the decimation filter circuitry 67, the data slicer 70, the symbol coder ROM 71, the interpolation filter circuitry 72, the balanced amplitude modulator 73 and the VSB filter 74. DFT computation circuitry 77 computes the DFT of the delayed input signal to the adaptive filter 63 that the compensatory digital delay 76 provides.

A similar-DFT-terms divider bank 78 is connected for dividing the DFT of the VSB filter 74 response, as computed by the DFT computer 75, term-by-corresponding-term by the DFT of the digital delay 76 response to the adaptive-filter 63 input signal, as computed by the DFT computer 77. These term-by-corresponding-term divisions by the similar-DFT-terms divider bank 78 generate a DFT that defines in the frequency domain the ideal adaptive filter 63 kernel weighting coefficients in the time domain.

The similar-DFT-terms divider bank 78 supplies the DFT of the adaptive filter 63 kernel weighting coefficients that it generates to an inverse discrete Fourier transform computer 79. The I-DFT computer 79 generates the time-domain adaptive filter 63 kernel weighting coefficients corresponding to the DFT supplied by the similar-DFT-terms divider bank 78. These adaptive filter 63 kernel weighting coefficients in the time domain are supplied to respective ones of a bank 80 of digital lowpass filters that suppresses the effects of noise on the previous computation of the kernel weighting coefficients. The bank 80 of digital lowpass filters supplies the lowpass-filtered adaptive filter 13 kernel weighting coefficients to coefficient registers in the adaptive filter 63 to be used as multiplier input signals by digital multipliers in the adaptive filter 63. The adaptive filter 63 is presumed to have the canonic transversal filter structure in which a tapped digital delay line supplies differently delayed tap responses to the adaptive filter 63 input signal for application to the digital multipliers as multiplicand input signals, and in which the products from the digital multipliers are summed to generate the adaptive filter 63 output signal.

Figure 9:
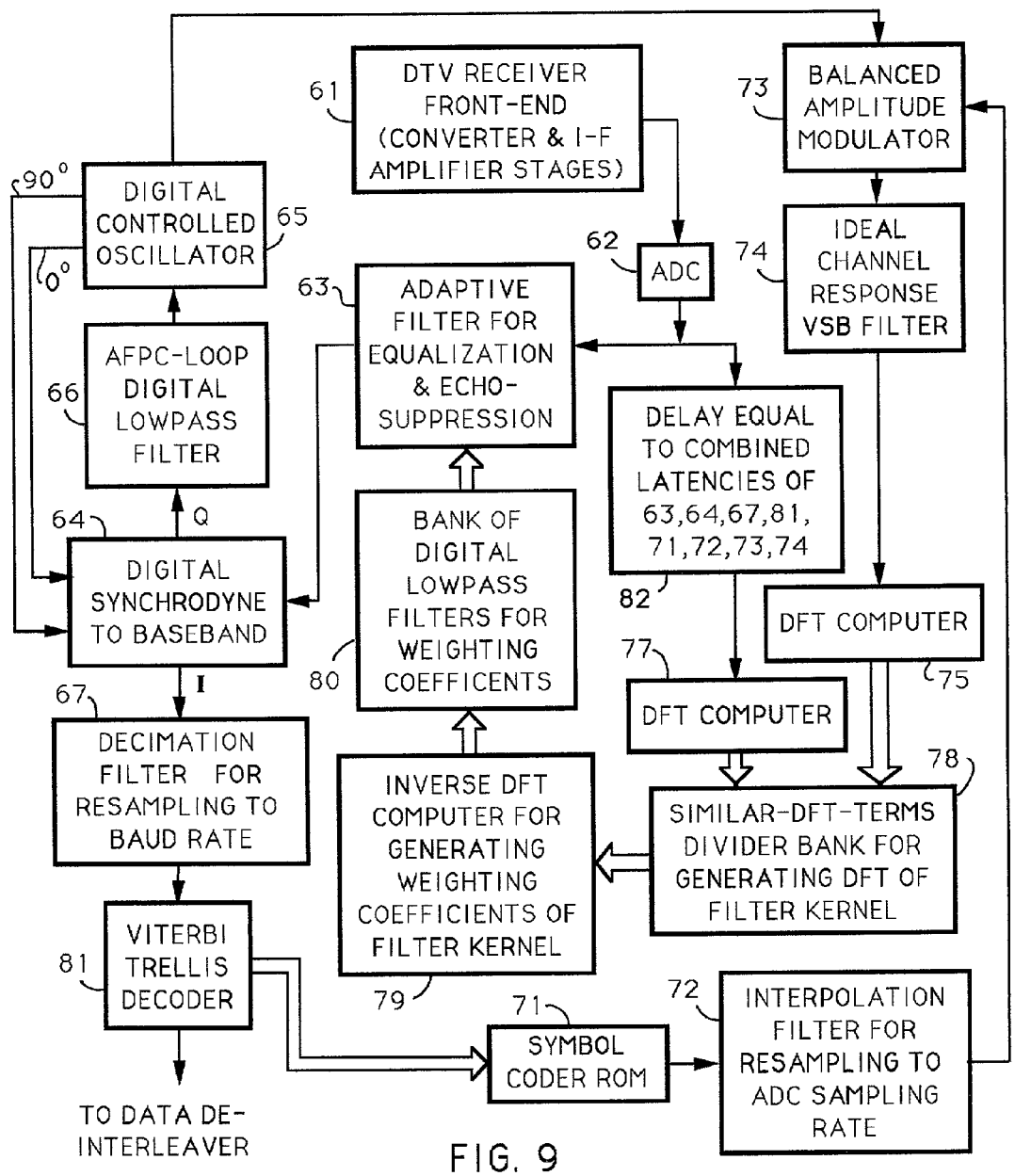
FIG. 9 is a schematic diagram of a novel digital television receiver that is a modification of the FIG. 8 DTV receiver.

FIG. 9 diagrams a DTV receiver that differs from the FIG. 8 DTV receiver in that it does not use data slicing of the adaptive filtering response to generate, in accordance with the so-called "hard"-decision technique, the input addressing of the symbol coder ROM 71 used for estimating actually transmitted VSB DTV signal symbols. Instead, the FIG. 9 DTV receiver employs Viterbi decoding of the adaptive filtering response response to generate, in accordance with the so-called "soft"-decision technique, the input addressing of the symbol coder ROM 71. The trellis decoder 68 shown generally in FIG. 8 is more particularly shown in FIG. 9 as a Viterbi-type trellis decoder 81. Rather than using a trellis coder to generate the symbol stream applied to the interpolation filter 72 as its respective input signal, FIG. 9 shows preliminary data-slicing results being extracted from the Viterbi-type trellis decoder 81 for application to the symbol coder ROM 71 as input addressing. The compensatory digital delay 76 is replaced by compensatory digital delay 82 providing delay compensating for the combined latent delays of the adaptive filter 63, the digital synchrodyne circuitry 64, the decimation filter circuitry 67, the Viterbi-type trellis decoder 81 up to its preliminary data-slicing results output port, the symbol coder ROM 71, the interpolation filter circuitry 72, the balanced amplitude modulator 73 and the VSB filter 74. The symbol coder ROM 71 used in the FIG. 9 DTV signal receiver includes circuitry for parsing data supplied from the Viterbi trellis decoder 81 into input addressing for the read-only memory. Parsing can be done relying on hand-shake techniques with the Viterbi trellis decoder 81, or by relying on a data count supplied from the receiver data synchronizing circuitry. The synchrodyne circuitry 64 supplies its in-phase output signal I to the receiver data synchronizing circuitry as input signal thereto.

Variants of the FIG. 8 and FIG. 9 DTV signal receivers are contemplated in which the VSB filter 74 is not used, being replaced by direct connection or a wider band filter, and in which the ideal-channel-response VSB filtering is instead performed in the DFT regime. These variants include read-only memory for storing the DFT of the ideal-channel-response VSB filtering, and the similar-DFT-terms divider bank 78 is replaced by other similar-DFT-terms combining circuitry for combining the DFT of the ideal-channel-response VSB filtering with the DFTs computed by the DFT computers 75 and 77. The combining procedures are in general the same as those used in the FIGS. 1 and 3 DTV signal receivers.

Thusfar in this specification, adaptation of the adaptive filtering used for equalization and echo-suppression has been based on real-only received signals. There are aspects of the invention that concern adaptive filtering used for equalization and echo-suppression of complex received signals, the adaptation of which adaptive filtering is based on discrete Fourier transforms of complex received signals. As an aid to understanding the DTV signal receiver apparatus described with reference to FIGS. 10, 11, 12 and 13 it is useful to think of the transmitted VSB signal as comprising two component VSB signals modulating carriers at $-45°$ and $+45°$ phasing respective to the $0°$ phasing of the actually transmitted VSB signal. Interestingly, this analysis results in two orthogonal channels with equal energies, rather than two orthogonal channels one with energy and the other without energy. The actually transmitted VSB signal is considered to be an in-phase carrier modulated by a real signal (Re) and to be accompanied by a zero-valued quadrature carrier modulated by an imaginary signal (Im). These two component VSB signals modulate the carriers at $-45°$ and $+45°$ phasing with modulating signals that have $[(Re)^{0.5}-j(Im)^{0.5}]$ value and $[(Re)^{0.5}+j(Im)^{0.5}]$ value, respectively. Filtering the modulating signal that has $[(Re)^{0.5}+j(Im)^{0.5}]$ value filters the real component (Re) component of complex received signal and the imaginary component (Im) of complex received signal similarly. Filtering the modulating signal that has $[(Re)^{0.5}-j(Im)^{0.5}]$ value filters the real component (Re) and the imaginary component (Im) differentially. If the two component filters implement equalization and echo-suppression correctly, the result of additively combining the responses of the two component filters generates a filter response for the real component (Re) of complex received signal. If the two component filters implement equalization and echo-suppression correctly, the result of subtractively combining the responses of the two component filters generates a zero-valued filter response for the imaginary component (Im) of complex received signal. If the two component filters implement equalization and echo-suppression correctly, the equalized signal as synchrodyned to baseband both at $-45°$ phasing and at $+45°$ phasing will in each case resemble the real-only signal (Re) as reduced in amplitude by square-root of two. This provides the basis for estimating the components of the actually transmitted signal at $-45°$ phasing and at $+45°$ phasing. This means that the two component filters can be adapted independently of each other.

Figure 10:
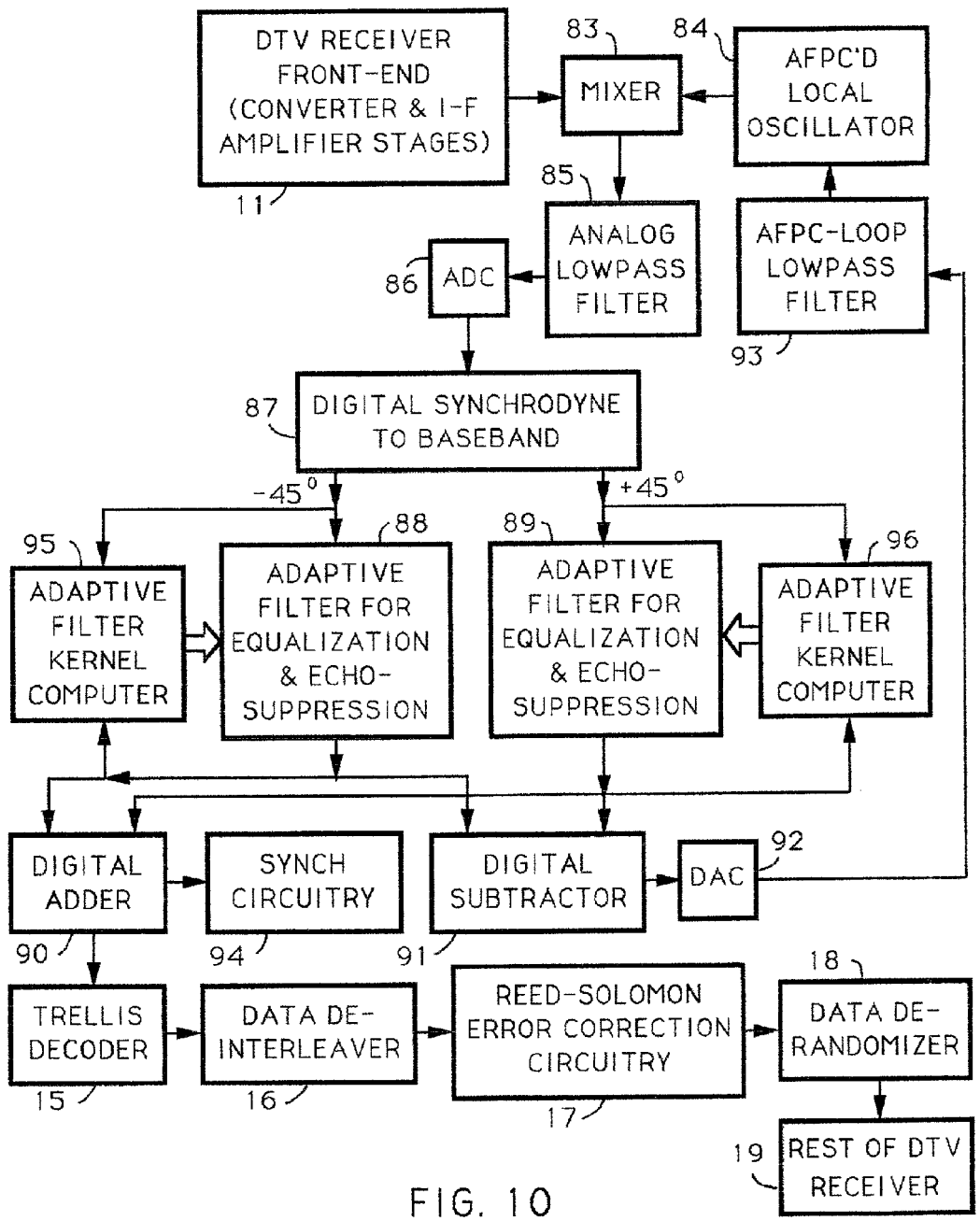
FIG. 10 is a schematic diagram of portions of a novel digital television receiver that employs an adaptive filter for complex baseband equalization and echo-suppression, which adaptive filter has its kernel weighting coefficients computed in accordance with the invention.

FIG. 10 shows a DTV signal receiver that employs an adaptive filter for complex baseband equalization and echo-suppression, which adaptive filter has its kernel weighting coefficients computed in accordance with the invention. In the FIG. 10 DTV signal receiver the DTV receiver front-end 11 supplies amplified I-F signal to a mixer 83 for heterodyning with oscillations from a local oscillator 84. These oscillations are subject to automatic frequency and phase control (AFPC), their frequency being such that the mixer 83 output signal includes a low-band I-F signal and not to its very-high-frequency image. (In a variant of the FIG. 10 DTV signal receiver an analog bandpass filter that selectively responds to the low-band I-F signal replaces the lowpass filter 85.) The response of the filter 85 is applied as input signal to analog-to-digital conversion circuitry 86 for digitization.

The ADC circuitry 86 is connected for supplying digitized low-band I-F signal to digital synchrodyne-to-baseband circuitry 87 arranged to synchronously detect the digitized low-band I-F signal at $-45°$ phasing and at $+45°$ phasing. The complete adaptive filtering used for equalization and echo suppression comprises: a component adaptive filter 88 connected to receive as its input signal the baseband signal the synchrodyne circuitry 87 supplies as the result of synchronously detecting at $-45°$ phasing with respect to VSB DTV signal carrier, a component adaptive filter 89 connected to receive as its input signal the baseband signal the synchrodyne circuitry 87 supplies as the result of synchronously detecting at $+45°$ phasing with respect to VSB DTV signal carrier, a digital adder 90 connected to sum the responses of the component adaptive filters 88 and 89 to generate a substantially-echo-free real equalized baseband DTV signal, and a digital subtractor 91 connected to differentially combine the responses of the component adaptive filters 88 and 89 to generate a substantially-echo-free imaginary equalized baseband DTV signal.

The substantially-echo-free imaginary equalized baseband DTV signal the digital subtractor 91 supplies as its digital difference output signal should zero-valued if the oscillations supplied by the local oscillator 84 are of correct frequency and phase, so that the digital synchrodyne-to-baseband circuitry 87 synchrodynes the digitized low-band I-F signal to baseband at −45° phasing and at +45° phasing. Otherwise, the substantially-echo-free imaginary equalized baseband DTV signal that the digital subtractor 91 supplies as difference output signal is a digital error signal for the AFPC loop that controls the frequency and phase of the oscillations the local oscillator 84 supplies. The digital difference output signal from the digital subtractor 91 is supplied to a digital-to-analog converter 92 for conversion to an analog error signal applied to an AFPC-loop analog lowpass filter 93 as input signal. The response of the AFPC-loop lowpass filter 93 is applied to the local oscillator 84 as AFPC signal, thereby closing the degenerative-feedback AFPC loop that adjusts the frequency and phase of the oscillations the local oscillator 84 supplies. This adjustment is made so that the digital synchrodyne-to-baseband circuitry 87 synchrodynes the digitized low-band I-F signal to baseband at −45° phasing and at +45° phasing. Customary variations of the AFPC loop design, such as performing part of the lowpass AFPC-loop filtering in the digital domain, are possible, of course.

The substantially-echo-free real equalized baseband DTV signal the digital adder 90 supplies as its digital sum output signal is supplied to data synchronizing circuitry 94 and to the trellis decoder 15. The elements 15–19 in the FIG. 10 DTV signal receiver correspond both in form and in function to the elements 15–19 in the FIG. 1 DTV signal receiver.

A computer 95 computes the kernel weighting coefficients for the component adaptive filter 88, proceeding from the input signal supplied to the component adaptive filter 88 and from the response of the component adaptive filter 88. A computer 96 computes the kernel weighting coefficients for the component adaptive filter 89, proceeding from the input signal supplied to the component adaptive filter 89 and from the response of the component adaptive filter 89. The computers 95 and 96 are alike in their construction, which is generally similar to that of computers used in the FIGS. 1, 3, 4, and 6 DTV signal receivers for computing the kernel weighting coefficients for adaptive filtering of real-only signals. The difference in construction arises from the sampling rate in the component adaptive filters 88 and 89 presumably being baud rate, with complex sampling providing the "over-sampling" necessary to characterize the received signal as phase-modulated as well as amplitude-modulated by multipath distortion. Accordingly, there is no decimation filter for re-sampling adaptive filter for re-sampling the baud-rate symbol decoder ROM response back to a higher rate of sampling used in the adaptive filter. Of course, complex adaptive filtering designs that use higher-than-baud-rate sampling can be constructed using the principles of the invention, in which case the computers 95 and 96 will incorporate decimation filters before symbol decoding and interpolation filters after re-coding symbols.

Figure 11:
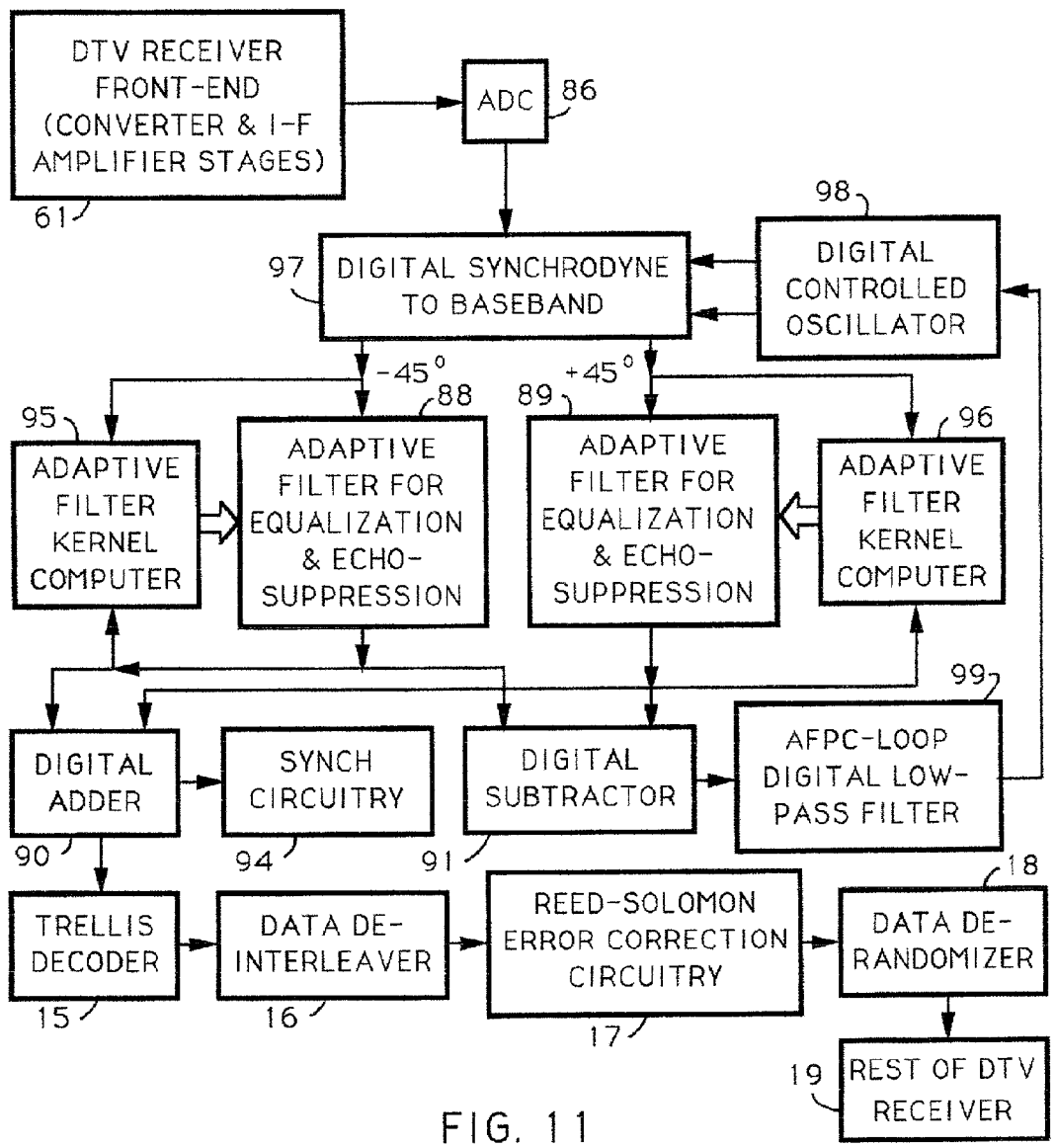
FIG. 11 is a schematic diagram of portions of another novel digital television receiver that employs an adaptive filter for complex baseband equalization and echo-suppression, which adaptive filter has its kernel weighting coefficients computed in accordance with the invention.

FIG. 11 shows a further DTV signal receiver that employs an adaptive filter for complex baseband equalization and echo-suppression, which adaptive filter has its kernel weighting coefficients computed in accordance with the invention. The FIG. 11 DTV signal receiver differs from the FIG. 10 DTV signal receiver in that the DTV receiver front-end 61 replaces the DTV receiver front-end 11, the mixer 83, the AFPC'd local oscillator 84, and the analog lowpass filter 85. The DTV receiver front-end 61 converts the DTV signal to a low-band intermediate-frequency band offset from zero-frequency by a 500 kHz or so. The FIG. 11 DTV signal receiver also differs from the FIG. 10 DTV signal receiver in that the FIG. 10 digital synchrodyne-to-baseband circuitry 87 that synchrodynes to baseband using orthogonal digital carriers with fixed-frequency-and-phase system characteristics is replaced by digital synchrodyne-to-baseband circuitry 97 that synchrodynes to baseband using orthogonal digital carriers with controlled-frequency-and-phase system characteristics as supplied from a digital controlled oscillator 98. The FIG. 11 DTV signal receiver dispenses with the DAC 92 and the AFPC-loop analog lowpass filter 93 used in the FIG. 10 DTV signal receiver to complete the AFPC loop for the controlled local oscillator 84. Instead, the AFPC loop of the FIG. 11 DTV signal receiver uses an AFPC-loop digital lowpass filter 99 to complete an AFPC loop for the DCO 98. More particularly, the digital difference output signal from the digital subtractor 91 is supplied to the digital lowpass filter 99 as input signal, and the response of the lowpass filter 99 is applied to the DCO 98 as AFPC signal. This closes the degenerative-feedback AFPC loop that adjusts the frequency and phase of the oscillations the DCO 98 supplies to the digital synchrodyne-to-baseband circuitry 97 so that circuitry 97 synchrodynes the digitized low-band I-F signal from the ADC 86 to baseband at −45° phasing and at +45° digitized low-band I-F signal from the ADC 86 to baseband at −45° phasing and at +45° phasing.

The DTV receivers of FIGS. 10 and 11 each employ baseband equalization and the complex adaptive filtering provided by the elements 88–91 is included in the carrier-phase-tracker AFPC loop. As remarked earlier in the specification, it is preferable to exclude the equalization and echo-suppression filter from the AFPC loop used for phase tracking, and passband equalization is a good general approach to employ in order to be able to exclude the adaptive filter from the AFPC loop.

Figure 12:
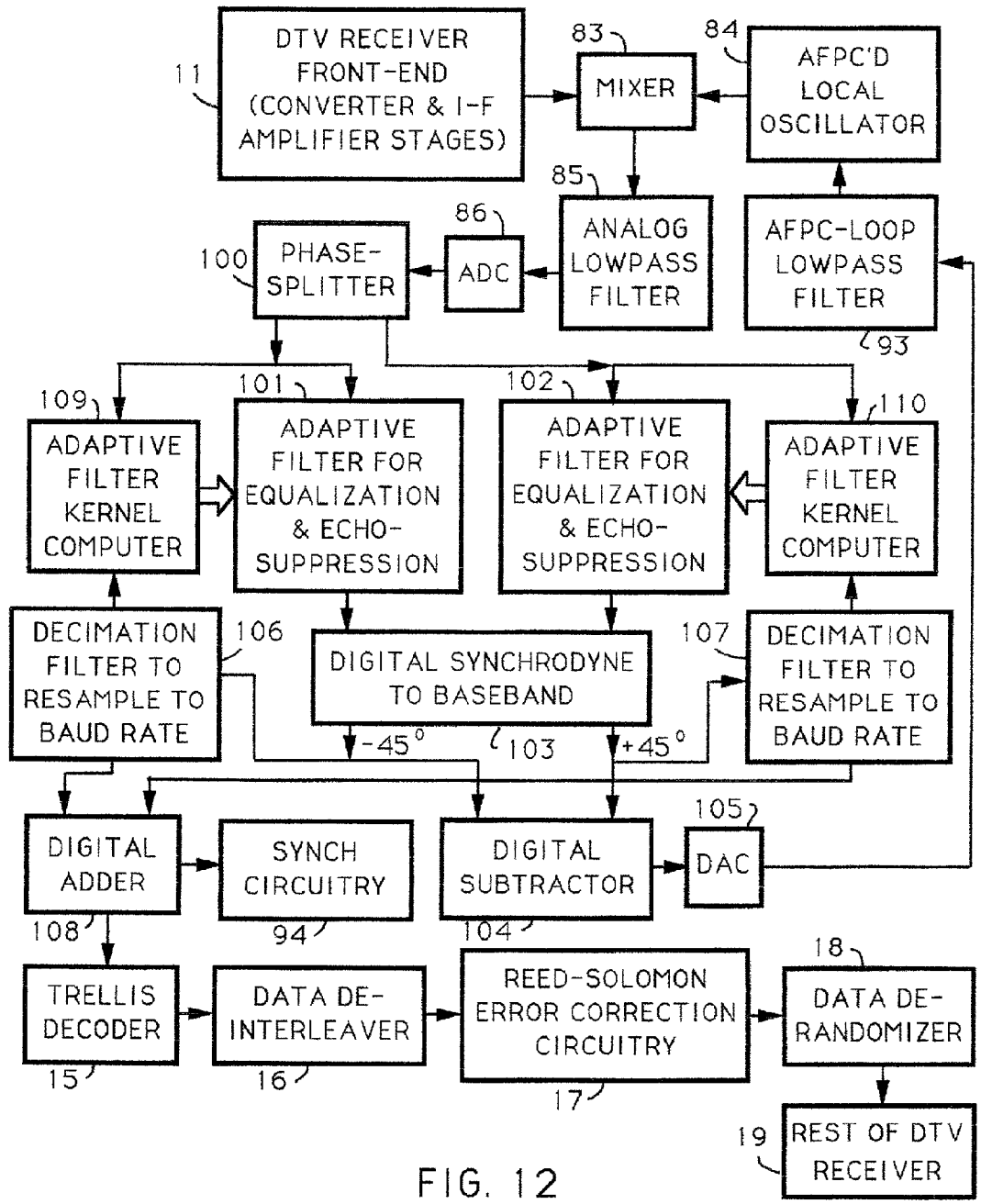
FIG. 12 is a schematic diagram of portions of a novel digital television receiver that employs an adaptive filter for complex passband equalization and echo-suppression, which adaptive filter has its kernel weighting coefficients computed in accordance with the invention.

FIG. 12 shows portions of a novel digital television receiver that employs a complex adaptive filter for passband equalization and echo-suppression, which adaptive filter has its kernel weighting coefficients computed in accordance with the invention. In the FIG. 12 DTV signal receiver, just as in the FIG. 10 DTV signal receiver, the DTV receiver front-end 11 supplies amplified I-F signal to a mixer 83 for heterodyning with oscillations from the controlled local oscillator 84. The analog lowpass filter 85 (or an analog bandpass filter) is connected for selecting the low-band I-F signal component of the mixture 83 output signal to the ADC circuitry 86 for digitization.

In the FIG. 12 DTV signal receiver the digitized low-band I-F signal is not directly supplied to the digital synchrodyne-to-baseband circuitry for demodulation before equalization and echo-suppression, in which digital synchrodyne-to-baseband circuitry the digitized low-band I-F signal is phase-split in preparation for the actual synchrodyning to baseband procedures. In the FIG. 12 DTV signal receiver the ADC circuitry 86 supplies the digitized low-band I-F signal as input signal to a phase-splitter 100. The phase-splitter 100 supplies orthogonal responses to the digitized low-band I-F signal as input signals to an adaptive filter 101 and to an adaptive filter 102. The responses of the adaptive filters 101 and 102 are supplied to digital synchrodyne-to-baseband circuitry 103 that synchrodynes these responses to baseband in orthogonal phasing to generate demodulation results from demodulating nominally at −45° phasing and at +45° phasing, respectively.

A digital subtractor 104 differentially combines these baseband responses to generate an imaginary response for the complete adaptive filter for equalization and echo-suppression. This imaginary response is used as a digital error signal indicative of the corrections that need to be made in the frequency and phase of the local oscillations that the controlled local oscillator 84 supplies. Digital-to-analog conversion circuitry 105 converts this digital error signal to an analog error signal applied as input signal to the AFPC-loop analog lowpass filter 93 as input signal. The response of the AFPC-loop lowpass filter 93 is applied to the local oscillator 84 as AFPC signal, thereby closing the degenerative-feedback AFPC loop that adjusts the frequency and phase of the oscillations the local oscillator 84 supplies. This adjustment is made so that the digital synchrodyne-to-baseband circuitry 103 synchrodynes the digitized low-band I-F signal to baseband by demodulating at −45° phasing and at +45° phasing. As in the FIG. 10 DTV signal receiver, variations of the AFPC loop design are possible, per custom.

The digital synchrodyne-to-baseband circuitry 103 supplies its baseband responses obtained by demodulating at −45° phasing and at +45° phasing as input signals for decimation filters 106 and 107, respectively, which re-sample these signals to baud rate. A digital adder 108 sums these re-sampled baseband responses to generate a real response for the complete adaptive filter for equalization and echo-suppression. The substantially-echo-free real equalized baseband DTV signal the digital adder 108 supplies as its digital sum output signal is supplied to data synchronizing circuitry 94 and to the trellis decoder 15. The elements 15–19 in the FIG. 12 DTV signal receiver correspond both in form and in function to the elements 15–19 in the FIG. 1 and FIG. 10 DTV signal receivers.

The kernel weighting coefficients for the component adaptive filter 101 are computed by a computer 109, responsive to component adaptive filter 101 input signal and to estimation of the actually transmitted signal giving rise to the component adaptive filter 101 input signal, which estimation is based on data-slicer response or Viterbi decoder response to the decimation filter 106 response. The kernel weighting coefficients for the component adaptive filter 102 input signal and to estimation of the actually transmitted signal giving rise to the component adaptive filter 102 input signal, which estimation is based on data-slicer response or Viterbi decoder response to the decimation filter 107 response. More particularly, the computation of the kernel weighting coefficients for each of the component adaptive filters 101 and 102 is generally similar to the computation of the kernel weighting coefficients of the adaptive filter 63 in the FIG. 8 and FIG. 9 DTV signal receivers.

Figure 13:
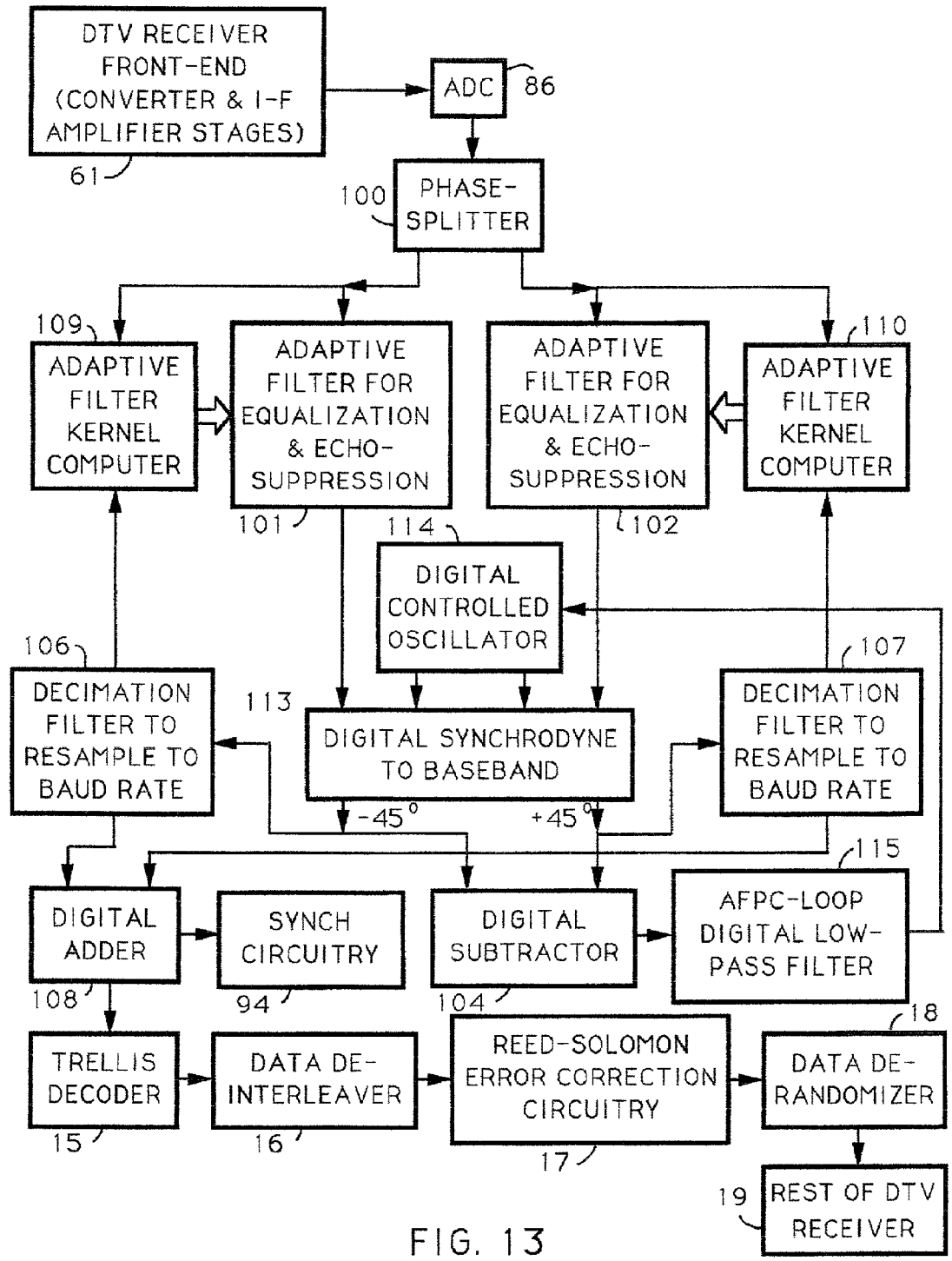
FIG. 13 is a schematic diagram of portions of another novel digital television receiver that employs an adaptive filter for complex passband equalization and echo-suppression, which adaptive filter has its kernel weighting coefficients computed in accordance with the invention.

FIG. 13 shows a further DTV signal receiver that employs an adaptive filter for complex passband equalization and echo-suppression, which adaptive filter has its kernel weighting coefficients computed in accordance with the invention. The FIG. 13 DTV signal receiver differs from the FIG. 12 DTV signal receiver in that the DTV receiver front-end 61 replaces the DTV receiver front-end 11, the mixer 83, the AFPC'd local oscillator 84, and the analog lowpass filter 85. The DTV receiver front-end 61 converts the DTV signal to a low-band intermediate-frequency band offset from zero-frequency by a 500 kHz or so. The FIG. 13 DTV signal receiver also differs from the FIG. 12 DTV signal receiver in that the FIG. 12 digital synchrodyne-to-baseband circuitry 103 that synchrodynes to baseband using orthogonal digital carriers with fixed-frequency-and-phase system characteristics is replaced by digital synchrodyne-to-baseband circuitry 113 that synchrodynes to baseband using orthogonal digital carriers with controlled-frequency-and-phase system characteristics as supplied from a digital controlled oscillator 114. The FIG. 13 DTV signal receiver dispenses with the DAC 106 and the AFPC-loop analog lowpass filter 93 used in the FIG. 12 DTV signal receiver to complete the AFPC loop for the controlled local oscillator 84. Instead, the AFPC loop of the FIG. 13 DTV signal receiver uses an AFPC-loop digital lowpass filter 115 to complete an AFPC loop for the DCO 114. More particularly, the digital difference output signal from the digital subtractor 104 is supplied to the digital lowpass filter 115 as input signal, and the response of the lowpass filter 115 is applied to the DCO 114 as AFPC signal. This closes the degenerative-feedback AFPC loop that adjusts the frequency and phase of the oscillations the DCO 114 supplies to the digital synchrodyne-to-baseband circuitry 113 so that circuitry 113 synchrodynes the response of the adaptive filter 101 to baseband at −45° phasing and synchrodynes the response of the adaptive filter 102 to baseband at +45° phasing.

Figure 14:
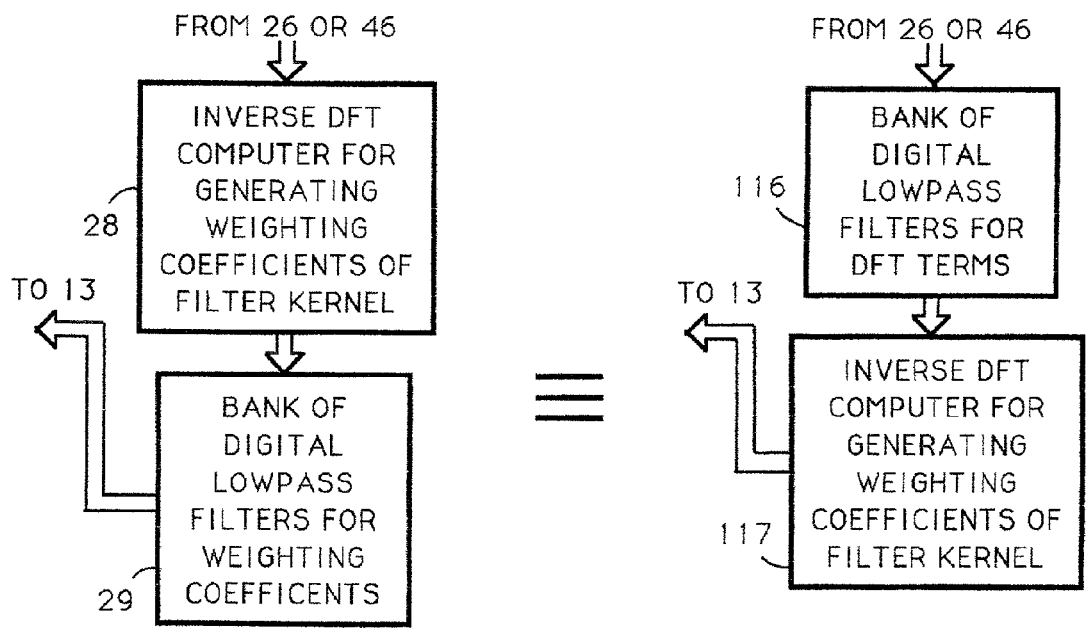
FIG. 14 is a schematic diagram of a modification that is made in the adaptive filtering in the FIGS. 1, 3, 4 and 6 DTV signal receivers in other embodiments of the invention.

FIG. 14 shows a modification that is made in the adaptive filtering in the FIGS. 1, 3, 4 and 6 DTV signal receivers in other embodiments of the invention. In the modified FIGS. 1 and 3 DTV signal receivers, the cascade arrangement of inverse-DFT computer 28 responsive to the DFT generated by the similar-DFT-terms combiner 26 and the bank 29 of respective digital lowpass filters for the weighting coefficients generated by the computer 28 are replaced by a bank 116 of respective digital lowpass filters for the terms of the DFT generated by the similar-DFT-terms combiner 26 and by an inverse-DFT computer 117 for generating the kernel weighting coefficients of the adaptive filter 13 from the responses of the bank 116 of respective digital lowpass filters. In the modified FIGS. 4 and 6 DTV signal receivers, the cascade arrangement of inverse-DFT computer 28 responsive to the DFT generated by the similar-DFT-terms divider bank 46 and the bank 29 of respective digital lowpass filters for the weighting coefficients generated by the computer 28 are replaced by a bank 118 of respective digital lowpass filters for the terms of the DFT generated by the similar-DFT-terms divider bank 46 and by an inverse-DFT computer 119 for generating the kernel weighting coefficients of the adaptive filter 13 from the responses of the bank 118 of respective digital lowpass filters.

Figure 15:
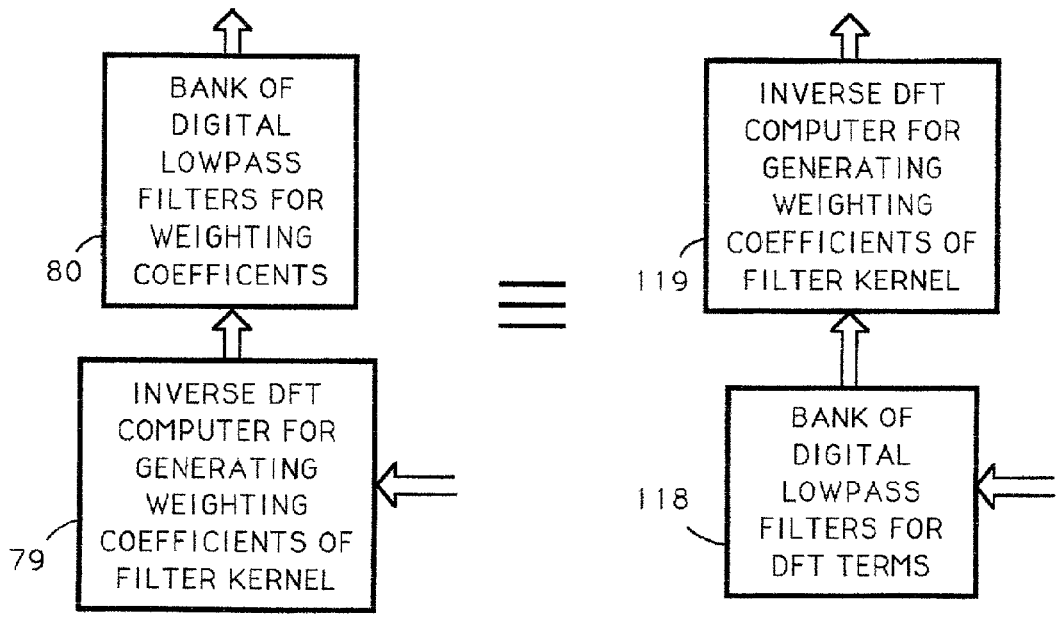
FIG. 15 is a schematic diagram of a modification that is made in the adaptive filtering in the FIGS. 8 and 9 DTV signal receivers in other embodiments of the invention.

FIG. 15 shows a modification that is made in the adaptive filtering in the FIGS. 8 and 9 DTV signal receivers in other embodiments of the invention. In the modified FIGS. 8 and 9 DTV signal receivers, the cascade arrangement of inverse-DFT computer 79 responsive to the DFT generated by the similar-DFT-terms divider bank 78 and the bank 80 of respective digital lowpass filters for the weighting coefficients generated by the computer 79 are replaced by a bank 118 of respective digital lowpass filters for the terms of the DFT generated by the similar-DFT-terms divider bank 78 and by an inverse-DFT computer 119 for generating the kernel weighting coefficients of the adaptive filter 63 from the responses of the bank 118 of respective digital lowpass filters.

In the foregoing description of the invention it was presumed that the adaptive digital filtering used for channel equalization and echo suppression was of FIR type. A problem that is encountered when using FIR filtering for echo suppression is that the signals with echoes from times previous or subsequent to the current time are weighted and combined with the current signal in order to suppress the echoes attending it. The desideratum for echo suppression is that echo-free signals from times previous or subsequent to the current time are weighted and combined with the current signal in order to suppress the echoes attending it. The unwanted weighted echo components in the combining procedure create repeats of the original echo. These repeats are an increasing problem as the echo components increase in amplitude vis-à-vis the principal signal. A procedure that can be done to reduce the errors in the kernel of the FIR filtering is as follows. The time-domain response of the actual reception channel to unit impulse is modified by nulling the principal signal term. This modified time-domain response is convolved with the zero-order set of originally determined weighting coefficients to develop a first-order set of correction weighting coefficients to be combined with the zero-order set of original weighting coefficients for canceling terms of that zero-order set. The modified time-domain response is convolved with the first-order set of correction weighting coefficients to develop a second-order set of correction weighting coefficients to be combined with the zero-order set of original weighting coefficients and the first-order set of correction weighting coefficients for canceling terms of that first-order set. This successive correction procedure continues until additional correction weighting coefficients fall below the quantizing noise of the weighting coefficients. These procedures are best implemented performing the convolution procedures in the DFT domain.

Some of the problem that is encountered when using FIR filtering for echo suppression is avoided in adaptive digital filtering of different structure that is more commonly used for channel equalization and echo suppression in DTV receivers. This alternative structure cascades a first FIR adaptive digital filter. The adder is connected to receive the IIR filter input signal as its first addend input signal and to supply the IIR filter output signal as its sum output signal. The second FIR digital filter is connected for feeding back the IIR filter output signal for combination with the IIR filter input signal. More particularly, the second FIR digital filter is connected to receive the IIR filter output signal as its input signal and to supply its response to the adder as a second addend input signal thereof. The IIR filter is used to suppress post-echoes, especially those with substantial delay. The first FIR filter is used to suppress pre-echoes and post-echoes with too short a delay to be conveniently suppressed by the IIR filter. The advantage in using the IIR filter to suppress post-echoes is that spectral repeats are automatically suppressed, so many fewer non-zero weighting coefficients are required for suppressing post-echoes than if completely FIR filtering were used instead.

The weighting coefficients for the first and second FIR adaptive digital filters in this type of adaptive filtering can be computed by modifying the methods described above. The weighting coefficients associated with the suppression of post-echoes determined in the final step of the FIG. 2 method or the FIG. 5 method are supplied to the coefficient register of the second FIR filter. The zero-order set of originally determined weighting coefficients in the kernel of the first FIR filter comprises the weighting coefficients associated with the suppression of pre-echoes and the weighting coefficient associated with the principal signal.

The procedure that can then be done to reduce the errors in the kernel of the first FIR filter is as follows. The time-domain response of the actual reception channel to unit impulse is modified by nulling the principal signal term and each post-echo term. The resulting time-domain pre-echo-only response is convolved with the zero-order set of originally determined weighting coefficients for the first FIR filter to develop a first-order set of correction weighting coefficients for the first FIR filter to develop a first-order zero-order set of original weighting coefficients for canceling terms of that zero-order set. The time-domain pre-echo-only response is convolved with the first-order set of correction weighting coefficients for the first FIR filter to develop a second-order set of correction weighting coefficients for the first FIR filter to be combined with its zero-order set of original weighting coefficients and its first-order set of correction weighting coefficients for canceling terms of that first-order set. This successive correction procedure continues until additional correction weighting coefficients fall below the quantizing noise of the weighting coefficients. These procedures are best implemented performing the convolution procedures in the DFT domain.

In still other embodiments of the invention, the DFT computers shown explicitly in FIGS. 1, 3, 4, 6, 8 and 9 (and implicitly in FIGS. 10–13) are constructed as parallel-bank analyzer filters; and the inverse DFT computers shown explicitly in FIGS. 1, 3, 4, 6, 7, 8, 9, 14 and 15 (and implicitly in FIGS. 10–13) are constructed as parallel-bank synthesizer filters. Methods for constructing the analyzer and synthesizer filters are described at length in the textbook *Multirate Digital Signal Processing*, published in 1983 by Prentice-Hall, Inc. of Englewood Cliffs, N.J., and authored by Ronald E. Crochiere and Lawrence R. Rabiner. See particularly Chapter 7 entitled "Multirate Techniques in Filter Banks and Spectrum Analyzers and Synthesizers" running from page 289 to page 404.

Each of the FIGS. 16–19 show an adaptive filter structure 130 using such analyzer and synthesizer filters. The transversal adaptive filter 13 is replaced by an analyzer filter 131 that converts the adaptive filer input signal to an analyzer filter response that is the DFT of the adaptive filter input signal, similar-DFT-terms multiplier bank 132 that multiplies the DFT of the adaptive filter input signal term-by-corresponding-term with the DFT of the desired system characteristic of the adaptive filter to generate the DFT of the adaptive filter response, and a synthesizer filter 133 receptive of the resulting DFT of the adaptive filter response to generate the adaptive filter response in the time domain.

Figure 16:
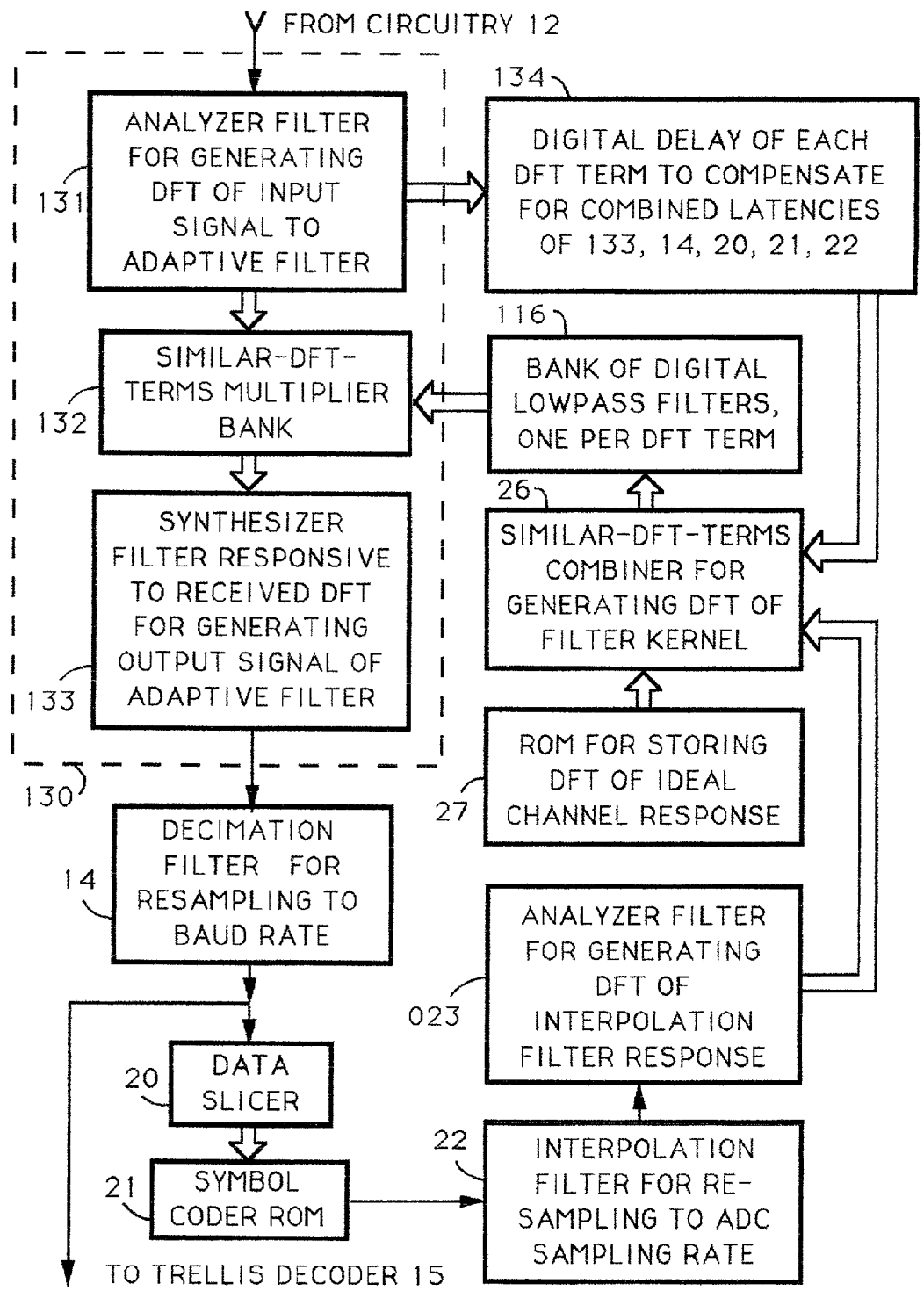
FIG. 16 is a schematic diagram showing how an alternative adaptive filter structure is employed in a modified FIG. 1 DTV signal receiver that embodies the invention.

FIG. 16 shows how the adaptive filter structure 130 replaces the transversal adaptive filter 13 in a modification of the FIG. 1 DTV signal receiver. The DFT of the desired system characteristic of the adaptive filter structure 130 is generated by method similar to those used to generate the DFT of the kernel of the transversal adaptive filter structure in FIG. 1. The DFT computer 23 of the FIG. 1 DTV signal receiver is replaced in the FIG. 16 DTV signal receiver by an analyzer filter 023 for generating the DFT of the interpolation filter 22 response to the estimates of transmitted symbols supplied by the symbol coder ROM 21. In the FIG. 16 DTV signal receiver, the analyzer filter 131 and a parallel digital-delay bank 134 providing equal digital delays for each DFT term from the analyzer filter 131 replaces the digital delay 24 and the DFT computer 25 of the FIG. 1 DTV signal receiver. The parallel digital-delay bank 134 compensates for the combined latencies of the synthesizer filter 133, the decimation filter 14, the data slicer 20, the symbol coder ROM 21 and the interpolation filter 22 (as well as any difference between the latencies of the analyzer filters 131 and 023, should such difference exist). The inverse-DFT computer 28 and the bank 29 of digital lowpass filters used in the FIG. 1 DTV signal receiver are dispensed with in the FIG. 16 DTV signal receiver. Instead, the DFT of the system response for the adaptive filter structure 130 is generated by the bank 116 of digital lowpass filters responding to the terms of the DFT generated by the similar-DFT-terms combiner 26. This DFT of the adaptive filter structure 130 system response is supplied to the similar-DFT-terms multiplier bank 132 to be multiplied term-by-corresponding term by the DFT of the adaptive filter structure 130 input signal supplied by the analyzer filter 131. The synthesizer filter 133 responds to the product output signal from the similar-DFT-terms multiplier bank 132 to generate the substantially-echo-free, equalized output signal of the adaptive filter structure 130, which is supplied to the trellis decoder 15 for symbol decoding and to the data slicer 20. The data slicer 20 supplies addressing to the symbol coder ROM 21, which ROM 21 generates estimates of the transmitted symbol code at baud rate. The interpolation filter 22 responds to these baud-rate estimates of the transmitted symbol code, re-sampling these estimates to the sample rate of the adaptive filter structure 130 input signal and supplying them to the analyzer filter 023 as input signal thereto.

Figure 17:
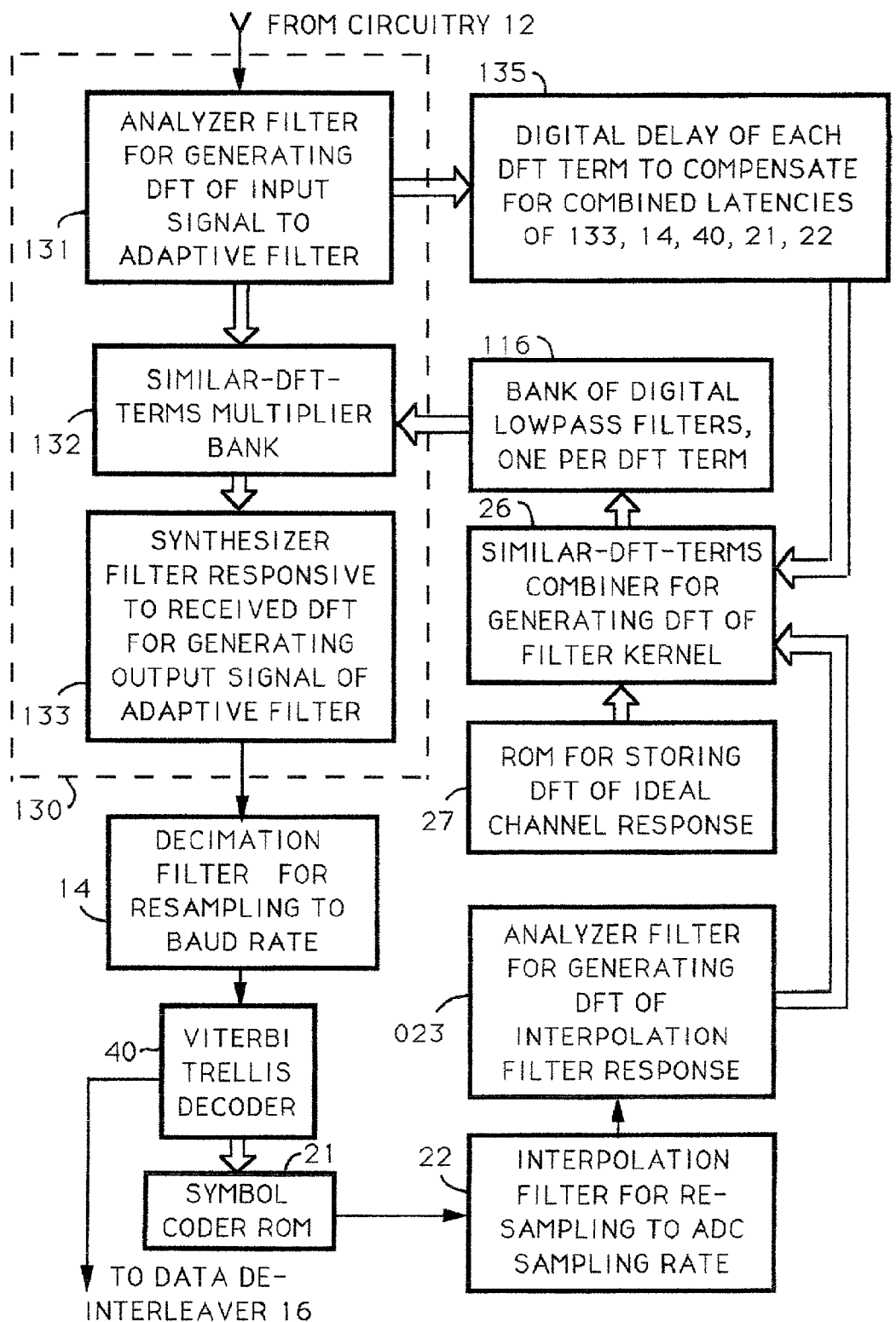
FIG. 17 is a schematic diagram showing how an alternative adaptive filter structure is employed in a modified FIG. 3 DTV signal receiver that embodies the invention.

FIG. 17 shows how the adaptive filter structure 130 replaces the transversal adaptive filter 13 in a modification of the FIG. 3 DTV signal receiver that is a still further embodiment of the invention. The DFT of the desired system characteristic of the adaptive filter structure 130 is generated by methods similar to those used to generate the DFT of the kernel of the transversal adaptive filter structure in FIG. 3. The DFT computer 23 of the FIG. 3 DTV signal receiver is replaced in the FIG. 16 DTV signal receiver by an analyzer filter 023 for generating the DFT of the interpolation filter 22 response to the estimates of transmitted symbols supplied by the symbol coder ROM 21. In the FIG. 17 DTV signal receiver, the analyzer filter 131 and a parallel digital-delay bank 135 providing equal digital delays for each DFT term from the analyzer filter 131 replaces the digital delay 41 and the DFT computer 25 of the FIG. 3 DTV signal receiver. The parallel digital-delay bank 135 compensates for the combined latencies of the synthesizer filter 133, the decimation filter 14, the Viterbi trellis decoder 40, the symbol coder ROM 21 and the interpolation filter 22 (as well as any difference between the latencies of the analyzer filters 131 and 023, should such difference exist). The inverse-DFT computer 28 and the bank 29 of digital lowpass filters used in the FIG. 3 DTV signal receiver are dispensed with in the FIG. 17 DTV signal receiver. Instead, the DFT of the system response for the adaptive filter structure 130 is generated by the bank 116 of digital lowpass filters responding to the terms of the DFT generated by the similar-DFT-terms combiner 26. This DFT of the adaptive filter structure 130 system response is supplied to the similar-DFT-terms multiplier bank 132 to be multiplied term-by-corresponding term by the DFT of the adaptive filter structure 130 input signal as supplied by the analyzer filter 131. The synthesizer filter 133 responds to the product output signal from the similar-DFT-terms multiplier bank 132 to generate the substantially-echo-free, equalized output signal of the adaptive filter structure 130, which is supplied to the Viterbi trellis decoder 40 for symbol decoding.

Figure 18:
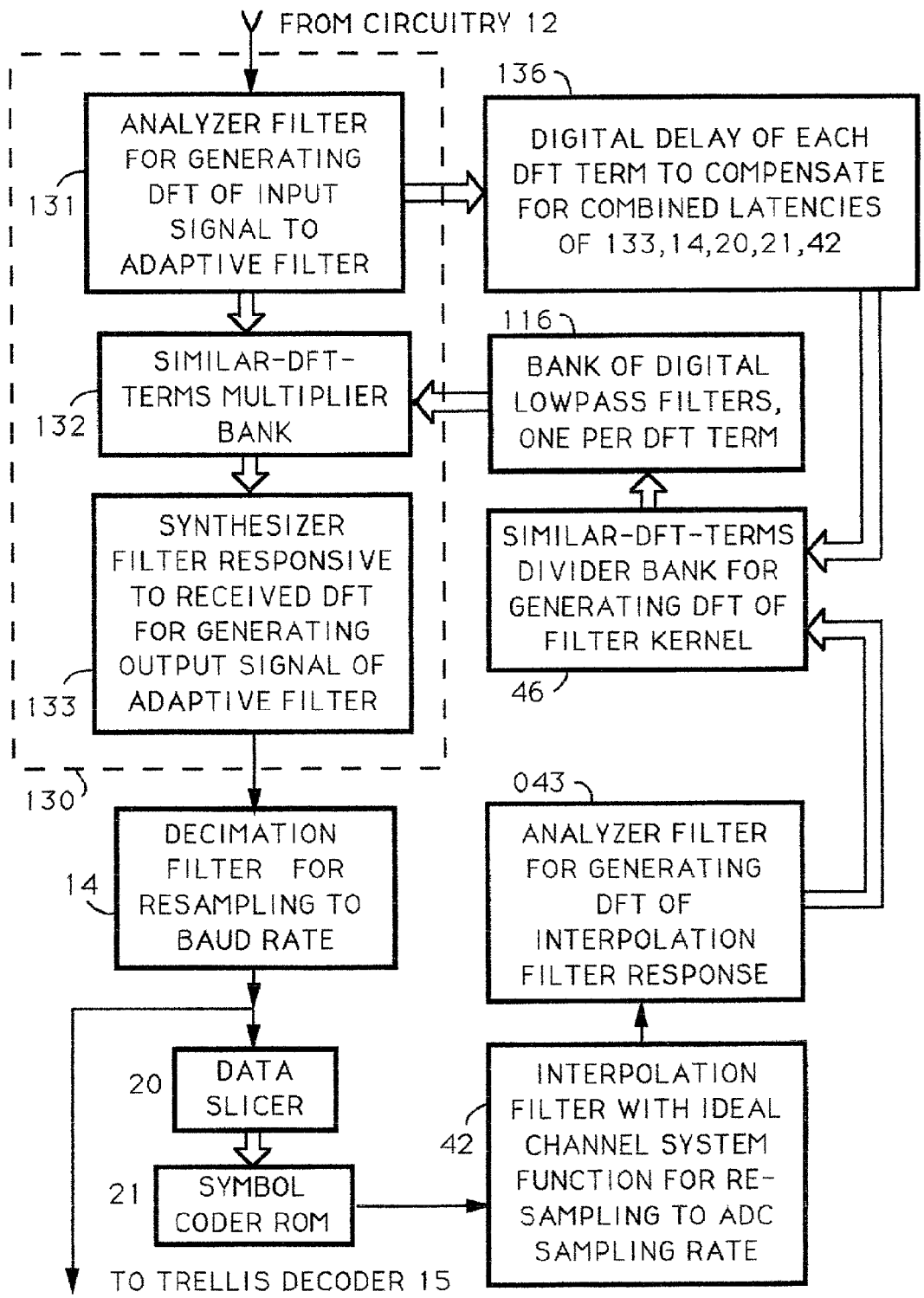
FIG. 18 is a schematic diagram showing how an alternative adaptive filter structure is employed in a modified FIG. 4 DTV signal receiver that embodies the invention.

FIG. 18 shows how the adaptive filter structure 130 replaces the transversal adaptive filter 13 in a modification of the FIG. 4 DTV signal receiver. The DFT of the desired system characteristic of the adaptive filter structure 130 is generated by methods similar to those used to generate the DFT of the kernel of the transversal adaptive filter structure in FIG. 4. The DFT computer 43 of the FIG. 4 DTV signal receiver is replaced in the FIG. 18 DTV signal receiver by an analyzer filter 043 for generating the DFT of the interpolation filter 42 ideal-channel-system-function response to the estimates of transmitted symbols supplied by the symbol coder ROM 21. In the FIG. 18 DTV signal receiver, the analyzer filter 131 and a parallel digital-delay bank 136 providing equal digital delays for each DFT term from the analyzer filter 131 replaces the digital delay 44 and the DFT computer 45 of the FIG. 4 DTV signal receiver. The parallel digital-delay bank 136 compensates for the combined latencies of the synthesizer filter 133, the decimation filter 14, the data slicer 20, the symbol coder ROM 21 and the interpolation filter 42 (as well as any difference between the latencies of the analyzer filters 131 and 023, should such difference exist). The inverse-DFT computer 28 and the bank 29 of digital lowpass filters used in the FIG. 4 DTV signal receiver are dispensed with in the FIG. 18 DTV signal receiver. Instead, the DFT of the system response for the adaptive filter structure 130 is generated by the bank 116 of digital lowpass filters responding to the terms of the DFT generated by the similar-DFT-terms divider bank 46. This DFT of the system response for the adaptive filter structure 130 is supplied to the similar-DFT-terms multiplier bank 132 to be multiplied term-by-corresponding term by the DFT of adaptive filter structure 130 input signal supplied by the analyzer filter 131. The synthesizer filter 133 responds to the product output signal from the similar-DFT-terms multiplier bank 132 to generate the substantially-echo-free, equalized output signal of the adaptive filter structure 130, which is supplied to the trellis decoder 15 for symbol decoding and to the data slicer 20. The data slicer 20 supplies addressing to the symbol coder ROM 21, which ROM 21 generates estimates of the transmitted symbol code at baud rate. The interpolation filter 42 responds to these baud-rate estimates of the transmitted symbol code, re-sampling these estimates to the sample rate of the adaptive filter structure 130 input signal and supplying them to the analyzer filter 043 as input signal thereto.

Figure 19:
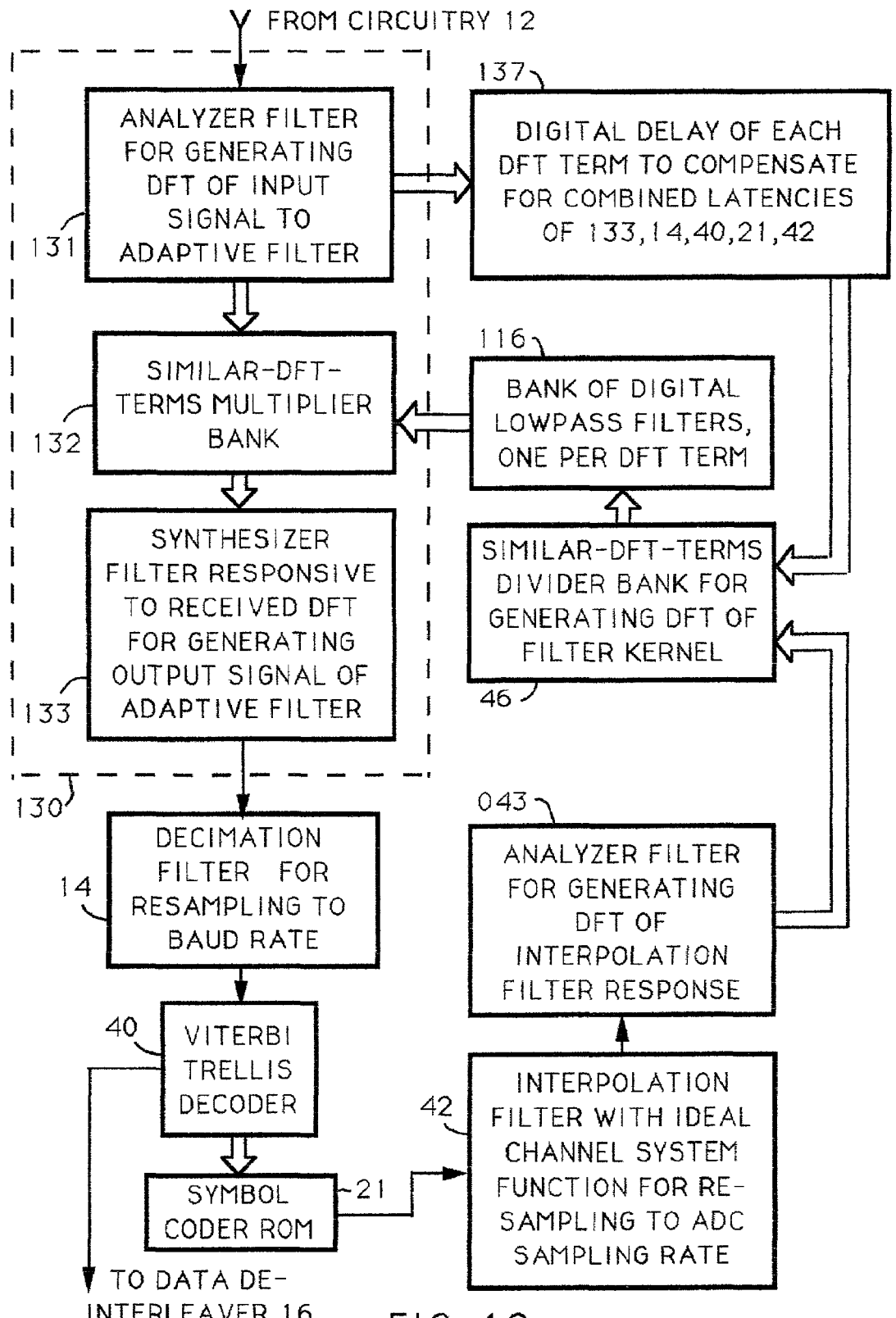
FIG. 19 is a schematic diagram showing how an alternative adaptive filter structure is employed in a modified FIG. 6 DTV signal receiver that embodies the invention.

FIG. 19 shows how the adaptive filter structure 130 replaces the transversal adaptive filter 13 in a modification of the FIG. 6 DTV signal receiver that is a still further embodiment of the invention. The DFT of the desired system characteristic of the adaptive filter structure 130 is generated by methods similar to those used to generate the DFT of the kernel of the transversal adaptive filter structure in FIG. 6. The DFT computer 43 of the FIG. 6 DTV signal receiver is replaced in the FIG. 16 DTV signal receiver by an analyzer filter 043 for generating the DFT of the interpolation filter 42 ideal-channel-system-function response to the estimates of transmitted symbols supplied by the symbol coder ROM 21. In the FIG. 19 DTV signal receiver, the analyzer filter 131 and a parallel digital-delay bank 137 providing equal digital delays for each DFT term from the analyzer filter 131 replaces the digital delay 47 and the DFT computer 45 of the FIG. 6 DTV signal receiver. The parallel digital-delay bank 137 compensates for the combined latencies of the synthesizer filter 133, the decimation filter 14, the Viterbi trellis decoder 40, the symbol coder ROM 21 and the interpolation filter 42 (as well as any difference between the latencies of the analyzer filters 131 and 023, should such difference exist). The inverse-DFT computer 28 and the bank 29 of digital lowpass filters used in the FIG. 6 DTV signal receiver are dispensed with in the FIG. 19 DTV signal receiver. Instead, the DFT of the system response for the adaptive filter structure 130 is generated by the bank 116 of digital lowpass filters responding to the terms of the DFT generated by the similar-DFT-terms divider bank 46. This DFT of the adaptive filter structure 130 system response is supplied to the similar-DFT-terms multiplier bank 132 to be multiplied term-by-corresponding term by the DFT of the adaptive filter structure 130 input signal supplied by the analyzer filter 131. The synthesizer filter 133 responds to the product output signal from the similar-DFT-terms multiplier bank 132 to generate the substantially-echo-free, equalized output signal of the adaptive filter structure 130, which is supplied to the Viterbi trellis decoder 40 for symbol decoding.

As noted above, when adaptive FIR filtering is used for echo suppression and channel equalization, a problem arises because signals with echoes from times previous or subsequent to the current time are weighted and combined with the current signal in order to suppress the echoes attending it, rather than echo-free signals being so weighted and combined. As noted above, further convolution procedures carried out in the DFT domain can be used to generate corrections in the weighting coefficients computed for the kernel of the adaptive FIR filtering, so performance is improved especially when miltipath distortion is severe. An analogous problem arises in regard to the weighting coefficients supplied to the bank 116 of digital lowpass filters in FIGS. 16, 17, 18 and 19. The solution to this analogous problem is provided by further convolution procedures carried out in the DFT domain, which further procedures are analogous to those used for correcting the weighting coefficients computed for the kernel of the adaptive FIR filtering.

Figure 20:
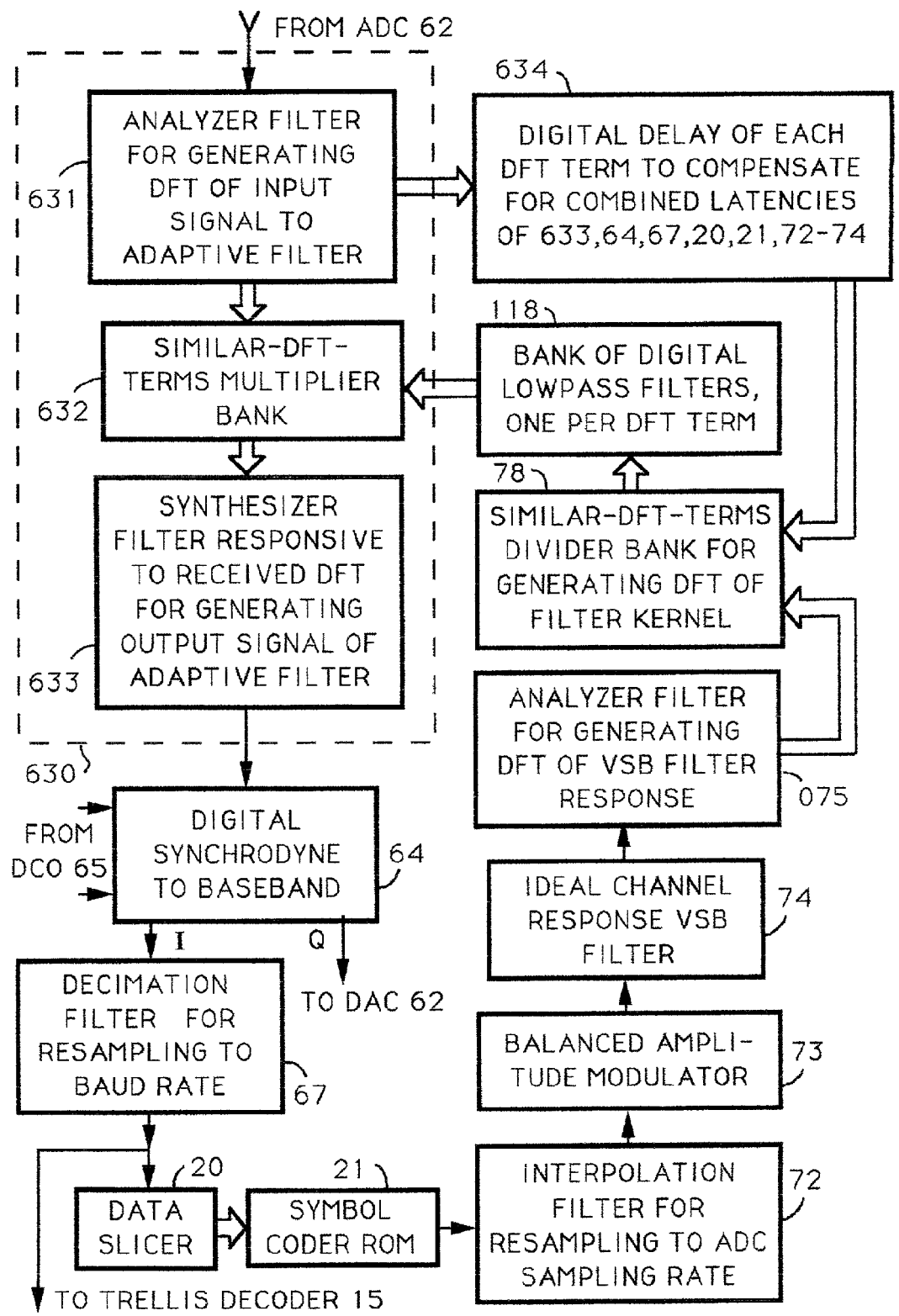
FIG. 20 is a schematic diagram showing how an alternative adaptive filter structure is employed in a modified FIG. 8 DTV signal receiver that embodies the invention.

FIG. 20 shows a modification of the FIG. 8 DTV signal receiver to replace the transversal adaptive filter 63 by an alternative adaptive filter structure 630. The adaptive filter structure 630 comprises an analyzer filter 631 that converts the adaptive filter input signal to an analyzer filter response that is the DFT of the adaptive filter input signal, similar-DFT-terms multiplier bank 632 that multiplies the DFT of the adaptive filter input signal term-by-corresponding-term with the DFT of the desired system characteristic of the adaptive filter to generate the DFT of the adaptive filter response, and a synthesizer filter 633 receptive of the resulting DFT of the adaptive filter response to generate the adaptive filter response in the time domain. The DFT of the desired system characteristic of the adaptive filter structure 630 is generated by methods similar to those used to generate the DFT of the kernel of the transversal adaptive filter structure in FIG. 8. The DFT computer 75 of the FIG. 8 DTV signal receiver is replaced in the FIG. 20 DTV signal receiver by an analyzer filter 075 for generating the DFT of the ideal-channel-response VSB filter 74 output signal. In the FIG. 20 DTV signal receiver, the analyzer filter 631 and a parallel digital-delay bank 634 providing equal digital delays for each DFT term from the analyzer filter 631 replaces the digital delay 76 and the DFT computer 77 of the FIG. 8 DTV signal receiver. The parallel digital-delay bank 634 compensates for the combined latencies of the synthesizer filter 633, the digital synchrodyne to baseband circuitry 64, the decimation filter 67, the data slicer 20, the symbol coder ROM 21, the interpolation filter 72, the balanced amplitude modulator 73, and the ideal-channel-response VSB filter 74 (as well as any difference between the latencies of the analyzer filters 631 and 075, should such difference exist). The inverse-DFT computer 79 and the bank 80 of digital lowpass filters used in the FIG. 8 DTV signal receiver are dispensed with in the FIG. 20 DTV signal receiver. Instead, the DFT of the system response for the adaptive filter structure 630 is generated by the bank 118 of digital lowpass filters responding to the terms of the DFT generated by the similar-DFT-terms divider bank 78. This DFT of the system response for the adaptive filter structure 630 is supplied to the similar-DFT-terms multiplier bank 632 to be multiplied term-by-corresponding term by the DFT of delayed adaptive filter structure 630 responds to the product output signal from the similar-DFT-terms multiplier bank 632 to generate the substantially-echo-free, equalized output signal of the adaptive filter structure 630, which is supplied to the circuitry 64 that performs the digital synchrodynes to generate an in-phase baseband signal I and a quadrature-phase baseband signal Q.

Figure 21:
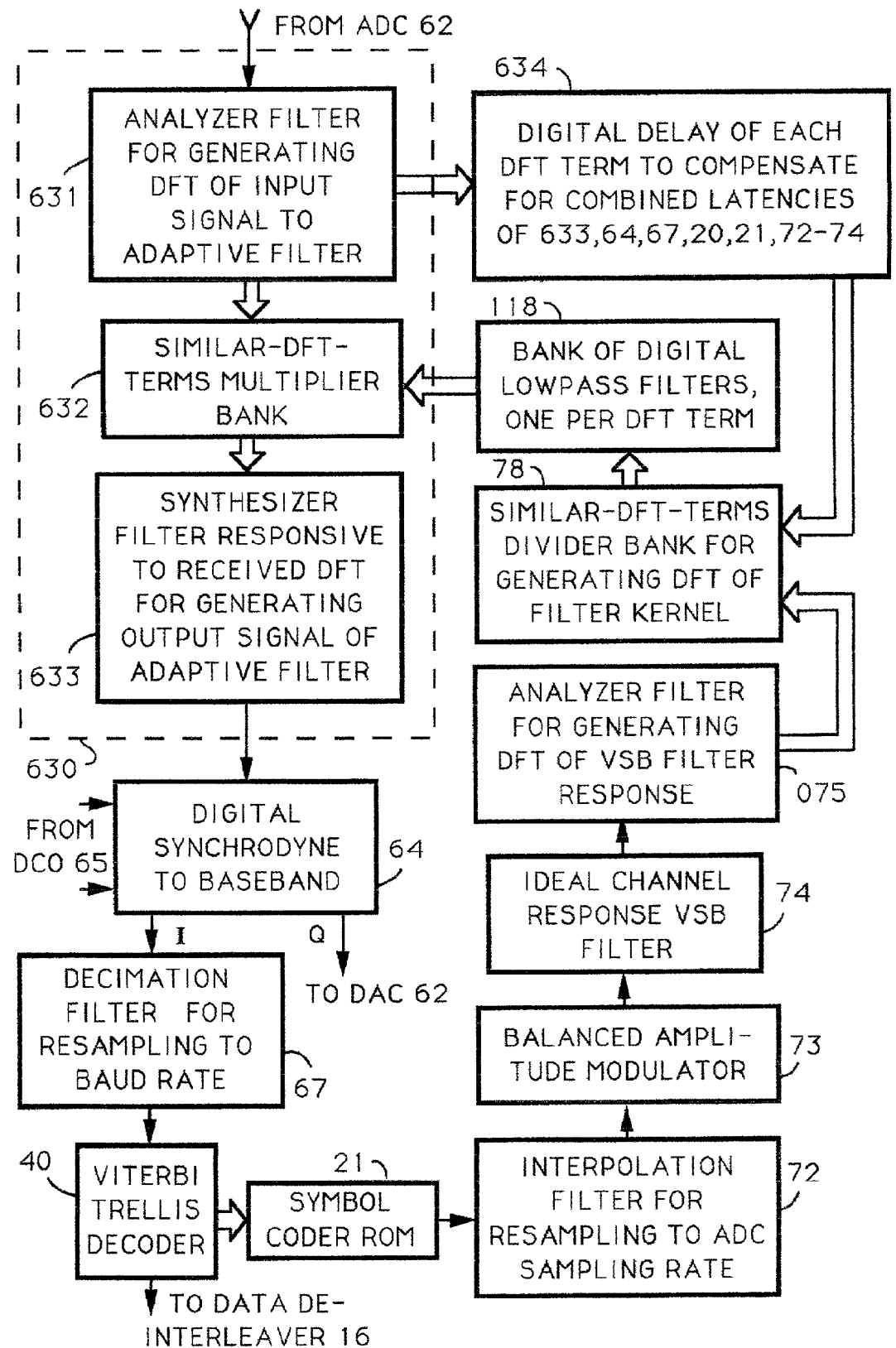
FIG. 21 is a schematic diagram showing how an alternative adaptive filter structure is employed in a modified FIG. 9 DTV signal receiver that embodies the invention.

FIG. 21 shows a modification of the FIG. 9 DTV signal receiver to replace the transversal adaptive filter 63 by an alternative adaptive filter structure 630. The modifications of the FIG. 9 DTV signal receiver in FIG. 21 are similar to the modifications of the FIG. 10 DTV signal receiver in FIG. 20.

As noted above, when adaptive FIR filtering is used for echo suppression and channel equalization, a problem arises because signals with echoes from times previous or subsequent to the current time are weighted and combined with the current signal in order to suppress the echoes attending it, rather than echo-free signals being so weighted and combined. As noted above, further convolution procedures carried out in the DFT domain can be used to generate corrections in the weighting coefficients computed for the kernel of the adaptive FIR filtering, so performance is improved especially when multipath distortion is severe. An analogous problem arises in regard to the weighting coefficients supplied to the bank 118 of digital lowpass filters in FIG. 20 and in FIG. 21. The solution to this analogous problem is provided by further convolution procedures carried out in the DFT domain, which further procedures are analogous to those used for correcting the weighting coefficients computed for the kernel of the adaptive FIR filtering.

The equalization methods described in this application can be assisted by monitoring the received signal to determine when known data patterns occur and then using better estimates of the transmitted signal based on those known data patterns when they occur, rather than using estimates of the transmitted signal derived from the response of the filtering used for equalization and echo-suppression. By way of example, known data patterns occur in the initial data segment of each data field in VSB DTV signals transmitted in accordance with the ATSC Digital Television Broadcasting Standard published in 1995.

The lowpass filtering of the weighting coefficients of the adaptive transversal filtering, which is done to suppress the effects of noise accompanying the received signal, can be adjusted dependent on how serious that noise is likely to be. If the adaptive filtering uses lowpass filtering of the DFT of its system response instead to suppress the effects of noise accompanying the received signal, this lowpass filtering can also be adjusted dependent on how serious that noise is likely to be. Measurement of the energy resulting from differential comparison of the output signal from the adaptive filtering with the response of a data slicer to that output signal can be used for reckoning the strength of noise accompanying a received VSB DTV signal. If there is very little energy resulting from the differential comparison, there is not very much noise in the received VSB DTV signal and the time constant of the lowpass filtering is preferably shorter in nature. If there is considerable energy resulting from the differential comparison, supposing that the reception channel has been tuned to for some time, there is probably substantial noise in the received VSB DTV signal and the time constant of the lowpass filtering is preferably longer in nature.

The DFT methods for adapting the filtering used for equalization and echo-suppression that are disclosed earlier in this specification all compare the received signal with estimates of the transmitted signal derived from the response of that filtering to the received signal. The estimates of the transmitted signal are accordingly delayed by the latent delay of the filter. An alternative way of estimating the transmitted signal is to assume that over a long time its frequency spectrum has the ideal channel response. In the short term this is not generally the case, but if the weighting coefficients are each lowpass filtered over a sufficiently long time they should approach desired value. A problem with this alternative approach is that the latency of the lowpass filtering of the weighting coefficients introduces lag in adapting the filter kernel, which lag is usually longer than the latency of the adaptive filter.

The structures described above are designed for synchronous operation at the sample rate used in the adaptive filter. At least insofar as the suppression of static multipath distortion is concerned, the procedures work better if the samples considered in the DFT procedures are in a reasonably large time window extending over 8192 symbol epochs, for example. Considering such a large time window, extending several times longer than the longest delay of echoes with significant energy, facilitates accuracy of the DFT calculations for characterizing the channel by reducing the significance of three sources of error. Considering such a large time window reduces the effects of the post-echoes of symbols preceding the window which post-echoes fall within the window; it reduces the effects of the pre-echoes of symbols succeeding the window which pre-echoes fall within the window; and it reduces the effects of the later symbols within the window having their post-echoes fall outside the window. Most of the echoes within the DFT time window are of samples also within the window. Considering such a large number of samples, however, slows the rate at which the adaptive filtering weighting coefficients can be initialized or can react to a sudden radical change in multipath reception. This is because of the latency of the adaptive filtering with regard to sweeping out old symbol values from a time before the reception of new signal symbols and because of the further time to supply adaptive filtering response to enough new signal symbols to fill the DFT time window. Generally, if the DFT window extends over a certain number of symbol epochs, initialization or a correction for changing multipath conditions will be delayed by at least twice the duration of the DFT time window. The delay will be even longer if lowpass filtering of adaptive filtering coefficients is done. A DFT time window extending over 8192 symbol epochs will take a little more than 1.5 milliseconds to acquire the information needed to begin initialization or correction for abrupt change in multipath conditions. This is only a fraction of the time auto-regressive adaptive filtering methods require, about 25 milliseconds being the fastest reported time for converging an auto-regressive adaptive filter used for equalization and echo-suppression of 8-VSB DTV signals. Reducing the duration of the DFT time window can reduce the time to acquire the information needed to begin initialization or correction for abrupt change in multipath conditions, but the accuracy of the DFT calculations for characterizing the channel suffers unless something is done for reducing the errors in those calculations.

The reduction of errors in the DFT calculations for characterizing the channel when the DFT time window is shortened is move easily implemented using a computer that permits asynchronous operation, lifting the constraint of synchronous operation at the sample rate used in the adaptive filter. Then, any of various improved methods can be pursued.

In one improved method of operation, a block of 512 symbols estimated to have been transmitted for reception immediately preceding the DFT window for actually received signal is zero-extended 512 symbol epochs thereafter and is convolved with the just previous adaptive filtering kernel to estimate the post-echoes of these symbols falling into the DFT window. These estimated post-echoes can be subtracted from the initial 512 symbols in the DFT window to reduce the effects of the post-echoes of symbols preceding the window on the ensuing DFT calculations. Since post-echoes are the principal problem in many multipath reception situations, this can achieve acceptable results despite shortening the DFT window to 4096 symbol epochs or so.

In another improved method of operation the DFT window for actually received signal, as shortened to 4096 symbol epochs, is partitioned into a 512-symbol-epoch initial section, a 3072-symbol-epoch middle section and a 512-symbol-epoch final section. The estimates of a number of the transmitted symbols up to the middle section, including all those in the initial section, are zero-extended 512 or so symbol epochs thereafter and are convolved with the just previous adaptive filtering kernel. The convolution results are subtracted from the 512 symbols in the initial section and the symbols at the beginning of the DFT window to suppress the symbols in the initial section of the window, together with their echoes in the initial section of the window, and to suppress their post-echoes in the middle section of the window. This leaves the initial section of the window occupied principally by the pre-echoes of the initial symbols in the middle section of the window.

The estimates of the transmitted symbols in the final section are preceded by a zero-extension of 128 or so symbol epochs and are convolved with the just previous adaptive filtering kernel. The convolution results are subtracted from the 512 symbols in the final section and the symbols at the conclusion of the DFT window to suppress the symbols in the final section of the window, together with their echoes in the final section of the window, and to suppress their pre-echoes in the middle section of the window. This leaves the final section of the window occupied principally by the post-echoes of the final symbols in the middle section of the window.

The DFT window for adaptive filtering input signal, as subjected to the corrections per the preceding two paragraphs is divided term-by-corresponding-term into the DFT of the convolution of the estimates of the transmitted symbols for the middle section of the input signal with the ideal channel response. The result of this procedure is the DFT of the adaptive filter kernel.

The adaptive filtering procedures thusfar described have multiplicatively applied weighting factors to differentially delayed input signal samples in order to determine the corrections that have to be added or subtracted to each signal sample. An alternative approach is to apply weighting factors, not to the differentially delayed input signal samples, but rather (insofar as possible) to corresponding samples that estimate the actually transmitted signal. This eliminates a source of noise in the adaptive filter response, which noise can interfere with symbol decoding. At the time that adaptive filtering is updated, there is the possibility that later-occurring ones of these corresponding samples that estimate the actually transmitted signal may not be available yet.

If the adaptive filter is updated every symbol epoch, only the samples that estimate the actually transmitted signal generating post-echoes are available for weighting. Supposing the adaptive filter to be configured as a transversal filter, applying weighting factors to the samples that estimate the actually transmitted signal to suppress post-echoes will convert a finite-impulse-response (FIR) filter to a cascade connection of a smaller FIR filter for suppressing pre-echoes and an infinite-impulse-response (IIR) filter. This is a configuration familiar in auto-regressive adaptive filtering.

Embodiments of the invention that use auto-regression for reducing error in the weighting coefficients, rather than simply lowpass filtering the weighting coefficients to suppress noise, have been simulated with considerable success. These simulations are described in the appendix titled "DESCRIPTION OF SIMULATION WORK". The characterization of the channel and calculation of initial weighting coefficients for the adaptive filter using DFT methods avoids the start-up problems of "blind equalization" auto-regressive filter adaptation methods. Thereafter, the incremental adjustment of the weighting coefficients using auto-regressive methods facilitates the tracking of dynamic multipath variations.

Thusfar, some very important phasing considerations have not been described in detail. In fact there are two phases that one needs worry about. A first concern is the "demodulator" phase of the synchrodyning or other synchronous detection procedure used for demodulating the VSB DTV signal to baseband. A second concern is the phase of the analog-to-digital conversion as referred to baud phase—that is, to the Nyquist rate with respect to the peak of the "desired" principal reception signal at baseband—which is sometimes referred to as "symbol clocking phase". If this is off, the data slicer phasing is incorrect and the sin(s)/x property of the ideal channel does not have its zeros at the right spots, even if there are no echoes. This undesirably generates pseudo-echoes in the real-only baseband signal.

If there is the possibility of large echoes being received, there is no assurance of accurate measurement of either type of phase until the adaptive filtering substantially completes its equalization and de-echoing process. The phase response of the adaptive filtering varies appreciably during equalization and de-echoing process; and, if there is appreciable multipath distortion in the actually received signal, the final phase response cannot be reckoned directly from the actually received signal as supplied to the adaptive filtering.

If the complex adaptive filtering is used, the accuracy of the demodulator phase is of little concern so long as its phase rotation with respect to the "desired" principal reception signal is not varying at a rate higher than the adaptive filtering can follow. The complex adaptive filtering simply corrects for these demodulator phase errors. The symbol clocking phase can be simply maintained by a bright-spectral-line method. For example, the real and imaginary components of the adaptive filtering response are squared and summed to detect the square of the envelope of the "desired" principal reception signal. The symbol frequency component of this squared envelope is extracted by a narrowband FIR filter and is used for generating an automatic frequency and phase control (AFPC) signal for the master oscillator determining the timing of sampling in the synchronously operated digital circuitry, including the clocking of analog-to-digital conversion.

Full complex discrete Fourier transforms and inverse discrete Fourier transforms are employed in complex adaptive filtering for equalization and echo suppression. If real-only adaptive filtering is used, real-only forward and assumed-Hermitian inverse transforms are used, as done in the simulations described in the appendix.

If real-only adaptive filtering is used, it can compensate for demodulator phase error ranging between $-30°$ and $+30°$, and it can compensate for errors in symbol clock phasing as large as ¼ to ⅓ of a symbol epoch, lag or lead. A well-designed tracker can keep demodulator phase error within the $-30°$ to $+30°$ range as long as dynamic multipath distortion changes at a reasonably slow rate, the limitation of the tracker in tracking dynamic multipath distortion probably not being as stringent as the limitation of the adaptive filtering in tracking such distortion. If real-only adaptive filtering is used that samples at baud rate, symbol clocking phase can be determined from the responses of variously phased matched filters for the PN511 training sequence in the initial data segment of each data field. This requires the master oscillator determining the timing of sampling in the synchronously operated digital circuitry to have a stability of better than one part per million, which can be obtained using a crystal-controlled oscillator.

If real-only adaptive filtering is used that samples at twice baud rate rather than baud rate, the tracker for reducing demodulator phase error can more closely track rapidly changing dynamic multipath distortion. Furthermore, symbol clocking phase can be adjusted responsive to AFPC signal generated from the data segment synchronizing signal or can be continuously adjusted by the Qureshi method. The stability requirement on the master oscillator determining the timing of sampling in the synchronously operated digital circuitry is much reduced from one part per million.

While adaptive filtering used for equalization and echo-suppression in DTV signal receivers has been specifically described in this specification and its accompanying drawing, the adaptive filtering technique has far-reaching application, as will be appreciated by one competent in the adaptive filtering art and acquainted with specification and its accompanying drawing. This application reaches beyond digital communication receivers and to adaptive filtering in general.

DESCRIPTION OF SIMULATION WORK

The simulations done before 30 Mar. 2000 used 4-VSB signal, rather than the 8-VSB signal used for DTV broadcasting. The use of 4-VSB signal avoided the simulations having to take into account the complication of trellis coding. The simulations particularly described herein used synchronous equalization with sample rate through the filter being baud rate or Nyquist rate, although higher-sample-rate simulations have also been performed. In the following description of the simulation work, M is the number of pre-echo terms being considered, and N is the number of post-echo terms being considered. The word "data" refers to digital baseband signal as recovered by demodulating 4-VSB (or 8-VSB) DTV signal, not to the results of symbol decoding the digital baseband signal.

Receivers that use FIR filters for suppression of pre-echoes must compute, iteratively or otherwise, special filter coefficients which differ from the measured echo ensemble. The DFT methods used in the simulations suppressed echoes using the echo ensemble itself, directly as measured, in filtering procedures more similar to the IIR filtering used in the prior art for canceling post-echoes. In these simulations, however, these filtering procedures were used to suppress pre-echoes as well as post-echoes. An echo-measurement register was provided for temporarily storing the measured echo ensemble, as initially determined during start up, and as subsequently updated by echo-tracking procedures. This echo-measurement register was separate from an echo-suppression register used for accumulating the results of echo-suppression procedures. This echo-measurement register contained enough actual storage locations to store the range of echos to be corrected and contained additional storage locations to store zero-extension information. These additional storage locations could be virtual storage locations, rather than actual ones.

The simulations done before 30 Mar. 2000 employed discrete Fourier transforms (DFTs) with 4096 terms for echo-suppression computations. DFTs of blocks of data points, which blocks were 3072=4096*(¾) symbol epochs long, provided the information used to remove pre-echoes. Post-echoes were removed using the previously sliced data. The echo-suppression register had 4086 storage locations, each associated with a respective one of successive symbol epochs of the signal to be equalized. As an initial step in the processing of each block of input data points, guard interval of 512 zeroes was inserted into the final section of an array of 4096 storage locations within the echo-suppression register corresponding to symbol epochs occurring after the block of data points that was being processed at the time. The block of incoming data 3072 symbol epochs long was loaded into corresponding ones of the 3072 storage locations in the middle section of the echo-suppression register. The 512 storage locations in the initial section of the echo-suppression register, containing storage locations corresponding to symbol epochs occurring before the block of data points that was being processed at the time, were initially filled with the sliced data of the corresponding elements from the previous block.

Then, using the measured echo ensemble read from the echo-measurement register, the echoes of the first point into the next 511 points were calculated; the echoes of the second point into the next 510 ones were calculated, the echoes of the third point into the next 509 points were calculated, etc. This broke up the propagation of echoes from previous data so that the short 512 zero pad at the end sufficed. This procedure required (M+N)*(M+N+1)/2 multiply-and-add steps, where was the number of pre-echo terms and N the number of post-echoes. However, these calculations had already been done and stored up during the processing of the previous block. The discrete Fourier transform of the input data points in the current block was then computed.

The echo-measurement register had 4096 apparent storage locations for temporarily storing the echo ensemble, as measured over a period of 512 symbol epochs or so, and zero-extended to fit into a 4096 symbol-epoch-long block. The discrete Fourier transform of this zero-extended echo measurement was calculated. Then, the DFT of the input data points was divided term-by-corresponding-term by the DFT of the echo measurement. The inverse transform of the resulting DFT was the directly de-convolved data, which could have been simply sliced and used as they were.

Instead, in order to reduce the effects of noise, an array 4096 symbol epochs long was generated, with the last 4096−512=3584 elements set to zero and with the first 512 elements set to the terms of the echo which represented the pre-echo only. The values for the "desired" term and all the post-echoes were set to zero. This array was then discrete Fourier transformed. The pre-echo-only transform was then multiplied, term-by-corresponding-term, by result of the division process described in the previous paragraph. The resulting DFT was then inverse-transformed. The final result was an array containing 3072 values presumed to be useful, which values provided an approximation (containing noise and errors due to mis-measurement of the echo ensemble) to a signal that solely consisted of the pre-echoes. There was no principal signal in this final result, nor any post-echoes.

The operation continued as follows. The value of each data point to be sliced was calculated by taking each incoming data point, first to last in the 3072 long block stored in the echo-suppression register, and subtracting from it the corresponding pre-echo sum created in the DFT process described above, thereby updating the corresponding locations in the echo-suppression register. Then, in a further updating of the corresponding locations in the echo-suppression register, each of the post-echo terms was removed by subtracting, one by one, the product of the echo for that distance in the past and the already sliced value of the data point for that time. This required N multiply-and-subtract operations, where N was the number of post-echo terms used. Each multiplicand, being supplied from the data slicer, was only three bits. The foregoing procedures generated the de-echoed data point stored at a receptive storage location in the echo-suppression register, which de-echoed data point was then sliced or actually run through the Viterbi decoder. This procedure was repeated until each and every one of the 3072 data points in corresponding storage locations of the echo-suppression register was used to update the echo-suppression register for removing any pre-echoes of that data point and then to further update the echo-suppression register for removing any post-echoes of that data point.

The foregoing procedures were used during initialization or after a radical change in multipath reception conditions. During normal multipath reception conditions, these procedures were augmented by a feedback mechanism that reduces error in the echo-suppression calculations. This feedback mechanism proceeded together with the process of removing the echoes from the data points and slicing them, but the operation of this feedback mechanism was delayed in regard to when each data point is sliced. A delay of M points provided time for the pre-echoes of any given "desired" point to be calculated, after which the feedback mechanism operated with respect to each data point as follows. The error term that was subtracted from this data point M points earlier to remove the pre-echoes was temporarily stored and then added back in to recover the data point with the original pre-echoes in it, updating the corresponding storage location in the echo-suppression register. Then, in M multiple-and-subtract operations using the corresponding echo points and the M sliced values generated since this data point was sliced, the pre-echo was subtracted using the sliced data point instead of the DFT estimate to update the corresponding storage location in the echo-suppression register. This produced less noise and instability in a new estimate of the de-echoed data point stored at that corresponding storage location in the echo-suppression register. The corresponding sliced (or quantized) data point was subtracted from this new estimate, generating the error in the calculation of the data point. Then, in the simplest form of the simulation, the product of this error times each of the M+N+1 sliced data points corresponding to N post-echoes, the M pre-echoes and the main signal was calculated. The resulting products were each multiplied by a constant attenuation factor $\mu$ and added, one by one, to the ensemble of echo points temporarily stored in the echo-measurement register. This procedure calculated the correlation function of the error and the sliced data, then applied it as the correction, described above. This procedure used the full available information to update the echo. This procedure entailed many multiply-and add operations, (M+N+1) of them, but note that they were not the full precision of the original data. Each sliced data point had only 3 bits; and the error had a maximum value of +1 or −1 (assuming sliced levels of −7, −5, . . . 7), because any value greater than that is likely to be an error. Note that in the process of removing the pre-echo using the sliced data points there was also generated, as an intermediate result, the exact terms needed in the process of generating the data described above for use as input to the second DFT for the next block.

This is the basic description of the simulations done before 30 Mar. 2000. Care was taken not to allow the quotient of the two DFTs to go out of range because of the divisor being too small. Note that nothing was done to the transforms while in the frequency domain, except operating on each element exactly the same way. This meant that there was no need to do the normal Cooley-Tukey "shuffle" of the elements to get them into frequency order for the forward transform and out of that order for the inverse transform. Normally, these DFTs would be computed in dedicated hardware hard-wired to take advantage of the symmetries and known zero elements involved.

The importance of the weighting coefficient $\mu$ was noticed when performing the simulations. The larger $\mu$ is, the more rapidly that dynamic multipath can be followed. The smaller $\mu$ is, the more stable the process of following the echo ensemble is. Preferably, the noise in the echo and the rate of speed of its change are monitored and the value of $\mu$ is adjusted accordingly. In general, values of $\mu$ from $1/800$ to $1/160,000$ are typical. The digital AGC is another coefficient in the system that should also be updated continuously.

There are two limitations on the tracking of dynamic multipath using this method. A first limitation is that the value of $\mu$ cannot be too large, or the errors in the echo measurement will cause a blowup. However, if $\mu$ is too small, the echoes cannot be followed fast enough. This can to some extent be helped by using a more complicated method for updating the echo than the simple addition described above. What is described produces a simple exponential weighting of previous values of the echo, falling to $1/e$ in $1/\mu$ samples. More complicated differential equation solvers instead of the simple addition will change the properties of this. A second limitation on the tracking of dynamic multipath is the fact that, if there are pre-echoes, then part of the de-echoing of them applied before slicing (but not to the feedback) is done stepwise every 285 microseconds. This of course results in these values being in error somewhat part of the time.

Provisional U.S. patent application serial No. 60/193,301 indicates that one can use smaller than 3072 long blocks for intermediate tradeoffs between hardware requirements and robust dynamic echo tracking. Simulations were performed using 3072 long blocks in order to emulate the dynamic multipath performance of 2K COFDM. COFDM for pre-echoes (and, of course, better performance for post-echoes.) Besides, when the simulations before 30 Mar. 2000 were done, processing 3072 data points at a time in the DFT procedures was viewed as being convenient. A block of 3072 data points was considered not to be too small, so the necessary padding to prevent wraparound did not become too large a fraction of the DFT. It was considered not to be too large, so that the echo tracking would be poor because the tracking of pre-echoes being harmed.

Since 30 Mar. 2000, further simulations have revealed that processing 2048 symbol epochs at a time is a more practical upper limit for echo tracking procedures using 4096-point DFTs. Processing blocks of more than 2048 symbol epochs results in loss of tracking capability when Rayleigh echo ensembles are received. Processing of fewer data points at a time permits better tracking of fast-changing dynamic echoes. Echo tracking procedures using 2048-point DFTs should not process more than 256 symbol epochs at a time, in order to avoid loss of tracking capability when Rayleigh echo ensembles are received.

The method used for starting up the foregoing simulation procedures depended on using the PN511 training sequence. The analog portion of the DTV receiver was presumed to have achieved lock. While waiting for training sequence to arrive, the DFT of the autocorrelation function of the incoming random data was computed using either the FIR described above or the block DFT hardware also used above. Using a total of perhaps 50,000 data points was considered to be optimal. The, the PN511 training sequence was searched for, by calculating correlation functions between the incoming data and a stored copy of the PN511 training sequence, using DFTs. Once the PN511 training sequence arrived, this cross-correlation was available as a measurement of the echo and could be used to start the simulation procedures described above. However, the measurement of the echo afforded by this cross-correlation was considerably corrupted by noise, part of which noise arose from post-echoes of the random data that preceded the PN 511 sequence. These post-echoes superposed themselves on the PN 511 sequence they overlapped in time.

A preferable procedure was to use the cross-correlation of the known PN511 training sequence and the data to align the known PN511 training sequence and the data, after which the known PN511 training sequence as properly scaled and filtered was subtracted from the data. The filtering of the PN511 training sequence included convolution with the ensemble of strongest echoes as determined from the cross-correlation. Presumably, this could be done using the hardware used in the running process described above. Subtracting echoes as small as 0.08 of the "principal" signal can be useful, but even doing only down to 0.2 was found to be very helpful. Then, using DFTs, the cross-correlation of the "reduced" data and the 511 point sequence was computed. This cross-correlation had the principal peak and the principal echoes previously subtracted missing, so they were added back in. However, the resulting sum had a much smaller error than the original cross-correlation of the known PN511 training sequence and the data. This is because a 511-element pseudorandom noise (PN) sequence is simply too short to be a truly complete "pseudorandom" sequence and the cross-correlation of the sequence with itself has a large residual. The DFT of that cross-correlation was then computed. At this point, the real part of the DFT of this cross-correlation was replaced by the real part of the much longer averaged autocorrelation of the random data calculated earlier, which had a smaller average error.

This was possible because of the fact that the autocorrelation of the data has the correct amplitude spectrum, but an incorrect phase spectrum. This modified DFT was then inverse-transformed to give the echo. This last step reduced the error typically by about the square root of two, while the iteration procedure on the cross-correlation had a much larger effect. This start-up procedure took some time, so the incoming data occurring during the time it took was stored up; and then, in order to catch up, the clock for the continuing de-multipath procedure was run faster than otherwise needed.

Finally, there were two empirical procedures that were used for startup and recovery from "bad channel" conditions that did not quite cause loss of lock. In the first of these empirical procedures, a running measure of a histogram of the error in each "eye" was calculated from data used in the feedback loop. Then, every hundred points or so, there are measurements made of the depths of the valleys between the peaks (eight peaks in 8-VSB, but only four peaks in the 4-VSB used in the simulations made before 30 Mar. 2000). If the valleys were larger than on-sixth the peaks, the feedback system was modified in the following way. If the error was more than one half the distance between two slice positions (i.e., one for 4-VSB with levels −3, −1, 1, 3), then it was not added into the feedback. This prevented wrong slices from causing feedback in the wrong direction. This was modified in later simulations using 8-VSB signals, where prediction based on the state of the Viterbi decoder was used to do a similar thing.

The second empirical procedure was only used in the start-up procedure. If one trial failed, on the next training sequence that came along the measured echo was truncated, so that terms with absolute value no larger than 0.04 of the biggest peak were set to zero. This procedure was unstable. So, as soon as the eyes opened appreciably, the procedure was discontinued.

The feedback mechanism used in the simulations required (M+N) multiply-and-add operations per data point. This can be reduced dramatically with a very substantial reduction in dynamic multipath performance by the following alternative method. The error signal, measured as described above, is collected up for all 3072 points until the end of the block. The result is zero-extended to 4096 samples and discrete Fourier transformed. The 3072 sliced data points are zero-extended to 4096 samples and discrete Fourier transformed. The former DFT is either divided by the latter DFT, or is multiplied by the complex conjugate of the latter DFT and inverse transformed to generate the correction to be applied to the echo. Note that there are two possible ways to perform this alternative method, one using a de-convolution step and the other using a correlation step, and they seem to have equal performance. This alternative method requires less hardware to perform than the one previously described, but has to be done after the block is finished, increasing the speed at which the processor must operate. It also has the disadvantage that it provides much less frequent updates of the echo ensemble measurement, which updates are applied in block form. This means it will not follow echoes as fast. As of 30 Mar. 2000, it appeared that the simple addition of a prescribed fraction of the measured correction does not perform adequately. Instead, a more complicated differential equation solver type system appeared to be required, perhaps one using non-linear error change prediction methods based on stored up previous echo ensembles.

The simulation methods thusfar described provided full tracking for post-echoes, but not for pre-echoes. Provisional U.S. patent application serial No. 60/193,301 proposed a simulation method that modifies the above-described echo-suppression method to treat pre-echoes much faster, which modified method should have identical results for echo ensembles consisting only of post-echoes. The proposed method uses a feedback mechanism identical to that in the first-described simulation method and works as follows. The proposed method nominally works on blocks of data that are the post-echo length, N symbol epochs, long. At the start of processing each block, as before, data points have been sliced (actually Viterbi decoded) up to the start of the block. The echo has also been tracked to this point. Discrete Fourier transforms at least 2N long are employed to avoid wraparound. The first N elements of an array are filled with the last N known sliced data points (array A). Then the end of the array is padded with zero with zeros as data points to avoid wraparound. The post-echo is placed into an equal-length array B padded with zeros at both ends (see later). The arrays A and B are Fourier transformed to generate arrays C and D, respectively. The arrays C and D are multiplied together, element-by-corresponding-element, and the result is discrete Fourier transformed to generate an array E. The array E comprises the echoes of the last N sliced points propagated into the future up to N. The next N incoming data points are placed into an array of the same length, starting at the position next in that array to where the last "old" sliced data point was in the array A and the forward-propagated post-echoes in array E are subtracted away to form an array F. This is then transformed to generate an array G. The pre-echoes are then placed into a same-size array H so that they occupy the correct relative position in the array H relative to where the post-echoes were before in the array B, which is the reason the post-echoes needed padding at the beginning of the array B. The array H is discrete Fourier transformed to generate an array J. The array G is divided, element-by-corresponding-element, by the sum of the arrays D and J. The resulting array K is the DFT of the completely de-convolved data of the N points. The array K is multiplied, element-by-corresponding-element, by the array J to generate an array L consisting of the DFT of the pre-echoes only. The array L is inverse-transformed to generate an array M.

Now, the method proceeds using the array E, the array M, and the original untreated data for this block. The array M is subtracted from the incoming data resulting in an array N with the pre-echoes removed. Array E is subtracted, element-by-corresponding-element, from the array N to generate an array O with the first element being completely de-echoed, the second needing to have the echo of the first removed, the third needing to have the echoes of the first and second removed, etc. This process of removal of these post-echoes is done an element at a time using recently sliced (actually Viterbi decoded) numbers and the current echo measurement and subtracting element by element. This last part requires N*(N+1)/2 additions and subtractions. After each point is in turn rid of its post-echoes, it is sliced and used as input to the next step. This is similar to the first method. The difference is that here a part of the removal of post-echoes from the current array is done by transform methods.

An important point about this method is that it used much smaller blocks, so that one can implement feedback to an analog phase-locked loop much more easily. One would presumably need blocks 1024 long. A second point is that it uses much more of the information from sliced data than the original method to remove pre-echoes and so should be more reliable. Blocks longer than N could be used, in order to waste less of the 1024 long transforms, but this would lose some of this advantage. The proposed method, in terms of quality of pre-echo removal, would look more and more like the method used in the original simulations, and would eventually be the same except for the few elements at the beginning of the block.

A careful examination of this proposed method reveals that it needs a total of six transforms based on a naive implementation. And the four forward transforms all have more than half of the input zeros. This appears to be inefficient, but this is not the case. There are techniques that allow doing both halves at once and then sorting out the results at the end. So, the arrays C and D are generated concurrently. So are the arrays G and J. See as a reference, for example, "Numerical Recipes in C" (or Fortran). One would not need, also, to do the "shuffle" normally done if one used a decimation in frequency algorithm. This is because there are no operations dependent on the actual frequency, just multiplication and divisions on like elements.

The simulations suggest that the strongest reception-path response is not always the best choice for the "desired" principal reception signal. The simulations indicate that it is better to have a 150% post-echo than a 67% pre-echo. If two of the strongest reception-path responses are reasonably close in time and within a factor of 1.5 in peak amplitude, it is simpler to chose the earlier reception-path response as the principal reception signal and the later reception-path response as a post-echo, then let the adaptive filtering proceed. It will work fine. If that is not true, since a tracker is used that can catch up at least a bit if it gets behind on occasion, this is one of those occasions. The control computer just decides anew which is the new "principal peak" and directs reloading of all the registers, backward in time if necessary, and directs that start-up procedures be employed again. This is a messy procedure, but is a problem that VSB has in common with COFDM.

In the claims which follow, the word "the" is not used to indicate antecedence; instead the word "said" is used to indicate antecedence in these claims. In the claims which follow, the word "apparatus" is used as a singular noun.

What is claimed is:

1. A receiver apparatus for digital signals of a prescribed baud rate transmitted by respective amplitude-modulated radio-frequency carriers through a medium subject to multipath distortion, said receiver apparatus comprising:
   a receiver front-end connected for responding to any selected one of said digital signals transmitted by respective amplitude-modulated radio-frequency carriers through said medium subject to multipath distortion, to generate an amplitude-modulated intermediate-frequency carrier that is amplitude modulated in accordance with said selected one of said digital signals and any multipath distortion thereof;
   demodulator and oversampling analog-to-digital conversion circuitry connected to receive said amplitude-modulated intermediate-frequency carrier from said receiver front-end and to supply a digital baseband signal at an oversampling rate higher than said prescribed baud rate;
   an analyzer filter for generating the discrete Fourier transforms of successive portions of said digital baseband signal, said analyzer filter connected to receive said digital baseband signal from said demodulator and oversampling analog-to-digital conversion circuitry;
   a bank of multipliers for multiplying the terms of each said discrete Fourier transform of said digital baseband signal, term by term, by respective ones of a set of adaptive weighting coefficients to generate a set of products describing the discrete Fourier transform of an equalizer response to said digital baseband signal;
   apparatus for generating, in response to the discrete Fourier transforms of successive portions of said digital baseband signal that provide a sampling window moving through a succession of different positions in each of successive data fields, said set of adaptive weighting coefficients for use by said bank of multipliers;
   a synthesizer filter connected for receiving said set of products from said bank of multipliers and for generating therefrom said equalizer response as the inverse discrete Fourier transform of said discrete Fourier transform of said equalizer response described by said set of products;
   a decimation filter connected for re-sampling said equalizer response supplied from said synthesizer filter to generate as a decimation filter response an equalized digital baseband signal re-sampled at said prescribed baud rate; and
   decoding apparatus connected for decoding said decimation filter response to recover a data stream.

2. The receiver apparatus of claim 1, wherein said apparatus for generating said set of adaptive weighting coefficients for use by said bank of multipliers comprises:
   estimation circuitry responsive to said decimation filter response for generating an oversampling-rate estimation of a baseband digital modulating signal in accordance with which said selected one of said digital signals was generated;
   apparatus for computing the discrete Fourier transforms of successive portions of said oversampling-rate estimation of the baseband digital modulating signal in accordance with which said selected one of said digital signals was generated, which successive portions of said oversampling-rate estimation of the baseband digital modulating signal correspond with respective ones of said successive portions of said digital baseband signal used for computing discrete Fourier transforms in said apparatus for computing the discrete Fourier transforms of successive portions of said digital baseband signal;
   read-only memory for storing a discrete Fourier transform characterization of ideal reception channel response;
   computer circuitry for generating discrete Fourier transform descriptions of said set of adaptive weighting coefficients, through term-by-corresponding-term multiplication of each of said discrete Fourier transforms of successive portions of said oversampling-rate estimation of the baseband digital modulating signal by said discrete Fourier transform characterization of ideal reception channel response as read from said read-only memory, followed by term-by-corresponding-term division of the resulting product terms by the discrete Fourier transform from the portion of said digital baseband signal corresponding with that said successive portion of said oversampling-rate estimation of the baseband digital modulating signal used for generating said discrete Fourier transform thereof used in said term-by-corresponding-term multiplication, thereby generating one of successive discrete Fourier transform descriptions of said set of adaptive weighting coefficients; and
   a bank of digital lowpass filters for smoothing respective resulting terms of said successive discrete Fourier transform descriptions of said set of adaptive weighting coefficients, to generate respective lowpass filter responses applied to said bank of multipliers as said set of adaptive weighting coefficients.

3. The receiver apparatus of claim 1, wherein said apparatus for generating said set of adaptive weighting coefficients for use by said bank of multipliers comprises:
   estimation circuitry responsive to said decimation filter response for generating a Nyquist-filtered oversampling-rate estimation of a baseband digital modulating signal in accordance with which said selected one of said digital signals was generated;
   apparatus for computing the discrete Fourier transforms of successive portions of said Nyquist-filtered oversampling-rate estimation of the baseband digital modulating signal in accordance with which said selected one of said digital signals was generated, which successive portions of said Nyquist-filtered oversampling-rate estimation of the baseband digital modulating signal correspond with respective ones of said successive portions of said digital baseband signal used for computing discrete Fourier transforms in said apparatus for computing the discrete Fourier transforms of successive portions of said digital baseband signal;

computer circuitry for generating discrete Fourier transform descriptions of said set of adaptive weighting coefficients, through term-by-corresponding-term division of each of the discrete Fourier transform of successive portions of said Nyquist-filtered oversampling-rate estimation of the baseband digital modulating signal by the discrete Fourier transform of the corresponding portion of said digital baseband signal thereby generating one of successive discrete Fourier transform descriptions of said set of adaptive weighting coefficients; and a bank of digital lowpass filters for smoothing respective resulting terms of said successive discrete Fourier transform descriptions of said set of adaptive weighting coefficients to generate respective lowpass filter responses applied to said bank of multipliers as said set of adaptive weighting coefficients.

4. A receiver apparatus for digital signals of a prescribed baud rate transmitted by respective amplitude-modulated radio-frequency carriers through a medium subject to multipath distortion, said receiver apparatus comprising:

a receiver front end connected for responding to any selected one of said digital signals transmitted by respective amplitude-modulated radio-frequency carriers through said medium subject to multipath distortion, to generate an amplitude-modulated intermediate-frequency carrier that is amplitude-modulated in accordance with said selected one of said digital signals and any multipath distortion thereof;

analog-to-digital conversion circuitry connected to receive as its respective input signal said amplitude-modulated intermediate-frequency carrier from said receiver front-end and to supply, at an oversampling rate higher than said prescribed baud rate, a digitized amplitude-modulated intermediate-frequency carrier;

an analyzer filter for generating the discrete Fourier transforms of successive portions of said digitized amplitude-modulated intermediate-frequency carrier, said analyzer filter connected to receive said amplitude-modulated intermediate-frequency carrier from said receiver front-end;

a bank of multipliers for multiplying the terms of each said discrete Fourier transform of said amplitude-modulated intermediate-frequency carrier, term by term, by respective ones of a set of adaptive weighting coefficients to generate a set of products describing the discrete Fourier transform of an equalizer response to said amplitude-modulated intermediate-frequency carrier;

apparatus for generating, in response to the discrete Fourier transforms of successive portions of said amplitude-modulated intermediate-frequency carrier that provide a sampling window moving through a succession of different positions in each of successive data fields, said successive sets of adaptive weighting coefficients for use by said bank of multipliers;

a synthesizer filter connected for receiving said set of products from said bank of multipliers and for generating therefrom said equalizer response as the inverse discrete Fourier transform of said discrete Fourier transform of said equalizer response described by said set of products;

digital synchrodyne circuitry connected to receive said equalizer response from said synthesizer filter and to supply a digital baseband signal at said oversampling rate higher than said prescribed baud rate;

a decimation filter connected for re-sampling said digital baseband signal supplied from said digital syncrodyne circuitry, to generate as a decimation filter response an equalized digital baseband signal re-sampled at said prescribed baud rate; and decoding apparatus connected for decoding said decimation filter response to recover a data stream.

5. The receiver apparatus of claim 4, wherein said apparatus for generating said successive sets of adaptive weighting coefficients for use by said bank of multipliers comprises:

estimation circuitry responsive to said decimation filter response for generating an oversampling-rate estimation of a baseband digital modulating signal in accordance with which said selected one of said digital signals was generated;

a balanced amplitude modulator for modulating an oversampling-rate digital signal descriptive of an unmodulated intermediate-frequency carrier by said oversampling-rate estimation of the baseband digital modulating signal in accordance with which said selected one of said digital signals was generated, thereby to generate an oversampling-rate digital signal descriptive of a suppressed-carrier double-sideband signal;

an ideal-channel-response vestigial-sideband filter for supplying a vestigial-sideband filter response to said oversampling-rate digital signal descriptive of the suppressed-carrier double-sideband signal supplied to said vestigial-sideband filter as its respective input signal by a connection from said balanced amplitude modulator;

a further analyzer filter for computing discrete Fourier transforms of successive portions of said vestigial-sideband filter response, which successive portions of said vestigial-sideband filter response correspond with respective ones of said successive portions of said amplitude-modulated intermediate-frequency carrier used for computing said discrete Fourier transforms thereof;

computer circuitry for generating discrete Fourier transform descriptions of said set of adaptive weighting coefficients, through term-by-corresponding-term division of each of the discrete Fourier transforms of successive portions of said vestigial-sideband filter response by the discrete Fourier transform of the corresponding portion of said digitized amplitude-modulated intermediate-frequency carrier, thereby generating one of successive discrete Fourier transform descriptions of said set of adaptive weighting coefficients; and a bank of digital lowpass filters for smoothing respective resulting terms of said successive discrete Fourier transform descriptions of said set of adaptive weighting coefficients to generate respective lowpass filter responses applied to said bank of multipliers as said set of adaptive weighting coefficients.

6. A receiver apparatus for digital signals of a prescribed baud rate transmitted by respective amplitude-modulated radio-frequency carriers through a medium subject to multipath distortion, said receiver apparatus comprising:

a receiver front-end connected for responding to any selected one of said digital signals transmitted by respective amplitude-modulated radio-frequency carriers through said medium subject to multipath distortion, to generate an amplitude-modulated intermediate-frequency carrier that is amplitude-modulated in accordance with said selected one of said digital signals and any multipath distortion thereof;

a first adaptive digital filter having a kernel composed of weighting coefficients that can be adjusted, said first adaptive digital filter connected for supplying a first adaptive digital filter response to said amplitude-modulated intermediate-frequency carrier generated by said receiver front-end;

apparatus for computing respective discrete Fourier transforms responsive to successive portions of said amplitude-modulated intermediate-frequency carrier that is amplitude-modulated in accordance with said selected one of said digital signals and any multipath distortion thereof, said successive portions of said amplitude-modulated intermediate-frequency carrier providing a sampling window moving through a succession of different positions in each of successive data fields; and apparatus for computing the weighting coefficients of said first adaptive digital filter so as to suppress an unwanted portion of said first adaptive digital filter response arising from the amplitude of said amplitude-modulated intermediate-frequency carrier being modulated in accordance with multipath distortion of said selected one of said digital signals, with the computation of said weighting coefficients being based on said discrete Fourier transforms of said successive portions of said amplitude-modulated intermediate-frequency carrier providing said sampling window moving through said succession of different positions in each of said successive data fields.

7. The receiver apparatus of claim 6, wherein said sampling window moving through the succession of different positions in each of said successive data fields generally advances a given number of samples at a time.

8. The receiver apparatus of claim 6, wherein said sampling window moving through the succession of different positions in each of said successive data fields generally moves block-by-block over contiguous successive portions of said amplitude-modulated intermediate-frequency carrier.

9. The receiver apparatus of claim 6, wherein said first adaptive digital filter is a baseband filter having a kernel of weighting coefficients and wherein said receiver apparatus further comprises, within said apparatus for computing discrete Fourier transforms responsive to successive portions of said amplitude-modulated intermediate-frequency carrier that is amplitude-modulated in accordance with said selected one of said digital signals and any multipath distortion:

demodulator and oversampling analog-to-digital conversion circuitry connected to receive said amplitude-modulated intermediate-frequency carrier from said receiver front-end and to supply a digital baseband signal sampled at an oversampling rate higher than said prescribed baud rate, which digital baseband signal is applied as a respective input signal to said first adaptive digital filter; and apparatus for computing said discrete Fourier transforms from successive portions of said digital baseband signal, which successive portions of said digital baseband signal respectively result from demodulation of said successive portions of said amplitude-modulated intermediate-frequency carrier, said demodulator and oversampling analog-to-digital conversion circuitry being connected to supply said digital baseband signal to said apparatus for computing said discrete Fourier transforms from successive portions of said digital baseband signal.

10. The receiver apparatus of claim 9, wherein the kernel of said first adaptive digital filter has weighting coefficients at intervals corresponding with integral numbers of half cycles of said oversampling rate, said receiver apparatus further comprising:

a decimation filter connected for re-sampling said first adaptive digital filter response to generate a decimation filter response that re-samples said digital baseband signal to said prescribed baud rate; and decoding apparatus connected for decoding said decimation filter response to recover a data stream.

11. The receiver apparatus of claim 10, as constructed for the reception of vestigial-sideband digital television broadcast signals, wherein said decoding apparatus comprises:

trellis decoding apparatus for decoding said decimation filter response to generate trellis-decoded data, said trellis decoding apparatus being connected to receive said decimation filter response from said decimation filter;

a data de-interleaver for de-interleaving convolutional interleaving in said trellis-decoded data to generate a data de-interleaver response, said data de-interleaver being connected to receive said trellis-decoded data from said trellis decoding apparatus;

Reed-Solomon error correlation circuitry for correcting errors in said de-interleaver response to recover randomized data, said Reed-Solomon error correction circuitry being connected to receive said data de-interleaver response from said data de-interleaver; and a data de-randomizer for de-randomizing said randomized data to recover a transport stream for application to a further portion of said receiver apparatus.

12. The receiver apparatus of claim 10, wherein said apparatus for computing the weighting coefficients of said first adaptive digital filter comprises:

estimation circuitry responsive to said decimation filter response for generating an oversampling-rate estimation of a baseband digital modulating signal in accordance with which said selected one of said digital signals was generated;

apparatus for computing the discrete Fourier transforms of successive portions of said oversampling-rate estimation of the baseband digital modulating signal in accordance with which said selected one of said digital signals was generated, which successive portions of said oversampling-rate estimation of the baseband digital modulating signal correspond with respective ones of said successive portions of said digital baseband signal used for computing discrete Fourier transforms in said apparatus for computing the discrete Fourier transforms of successive portions of said digital baseband signal;

read-only memory for storing a discrete Fourier transform characterization of ideal reception channel response;

computer circuitry for generating discrete Fourier transform characterizations of the actual reception channel, through term-by-corresponding-term multiplication of each of said discrete Fourier transforms of successive portions of said oversampling-rate estimation of the baseband digital modulating signal by said discrete Fourier transform characterization of ideal reception channel response as read from said read-only memory, followed by term-by-corresponding-term division of the resulting product terms by the discrete Fourier transform of the portion of said digital baseband signal corresponding with that said successive portion of said oversampling-rate estimation of the baseband digital modulating signal generating said discrete Fourier transform thereof used in said term-by-corresponding-term multiplication, followed by inverse discrete Fourier transformation of resulting quotient terms to generate one of a set of successive inverse discrete Fourier transforms; and a bank of digital lowpass filters for smoothing the terms of said successive inverse discrete Fourier transforms to specify the weighting coefficients in the kernel of said first adaptive digital filter.

13. The receiver apparatus of claim 12, wherein said estimation circuitry comprises:

a data slicer connected to receive said decimation filter response from said decimation filter and to supply a quantized decimation filter response;

a symbol coder for recoding said quantized decimation filter response into a baud-rate estimation of the baseband digital modulating signal; and an interpolation filter of a type that essentially preserves in its output signal the system function described in its input signal, said interpolation filter connected for receiving said baud rate estimation of the baseband digital modulating signal and for supplying said oversampling-rate estimation of the baseband digital modulating signal to said apparatus for computing the discrete Fourier transforms of successive portions of said oversampling-rate estimation of the baseband digital modulating signal in accordance with which said selected one of said digital signals was generated.

14. The receiver apparatus of claim 12, wherein said estimation circuitry comprises:

a trellis decoder also included within said decoding apparatus connected for decoding said decimation filter response to recover said data stream, said trellis decoder connected to receiver said decimation filter response from said decimation filter and to supply preliminary estimates of symbol values as well as trellis decoder response;

a symbol coder for recoding said preliminary estimates of symbol values supplied from said trellis decoder response, to generate a baud-rate estimation of the baseband digital modulating signal; and an interpolation filter of a type that essentially preserves in its output signal the system function described in its input signal connected for receiving said baud-rate estimation of the baseband digital modulating signal and for supplying said oversampling-rate estimation of the baseband digital modulating signal to said apparatus for computing the discrete Fourier transforms of successive portions of said oversampling-rate estimation of the baseband digital modulating signal in accordance with which said selected one of said digital signals was generated.

15. The receiver apparatus of claim 12, wherein said apparatus for computing the discrete Fourier transforms of successive portions of each data field of said digital baseband signal is of a type using a sliding window of said digital baseband signal for such computation, and wherein said apparatus for computing the discrete Fourier transforms of successive portions of said oversampling-rate estimation is of a type using a sliding window of said oversampling-rate estimation for such computation.

16. The receiver apparatus of claim 10, wherein said apparatus for computing the weighting coefficients of said first adaptive digital filter comprises:

estimation circuitry responsive to said decimation filter response for generating a Nyquist-filtered oversampling-rate estimation of a baseband digital modulating signal in accordance with which said selected one of said digital signals was generated;

apparatus for computing the discrete Fourier transforms of successive portions of said Nyquist-filtered oversampling-rate estimation of the baseband digital modulating signal in accordance with which said selected one said digital signals was generated, which successive portions of said Nyquist-filtered oversampling-rate estimation of the baseband digital modulating signal correspond with respective ones of said successive portions of said digital baseband signal used for computing discrete Fourier transforms in said apparatus for computing the discrete Fourier transforms of successive portions of said digital baseband signal;

computer circuitry for generating discrete Fourier transform descriptions of the kernel desired in said first adaptive digital filter through term-by-corresponding-term division of each of the discrete Fourier transforms of successive portions of said Nyquist-filtered oversampling-rate estimation of the baseband digital modulating signal by the discrete Fourier transform of the corresponding portion of said digital baseband signal, and thereafter generating inverse discrete Fourier transforms of said discrete Fourier transform descriptions of the kernel desired in said first adaptive digital filter; and a bank of digital lowpass filters for smoothing the terms of said inverse discrete Fourier transforms to specify the weighting coefficients in the kernel of said first adaptive digital filter.

17. The receiver apparatus of claim 16, wherein said estimation circuitry comprises:

a data slicer connected to receive said decimation filter response from said decimation filter and to supply a quantized decimation filter response;

a symbol coder for recoding said quantized decimation filter response into a baud-rate estimation of the baseband digital modulating signal; and an interpolation filter connected for receiving said baud-rate estimation of the baseband digital modulating signal and supplying said Nyquist-filtered oversampling-rate estimation of the baseband digital modulating signal to said apparatus for computing the discrete Fourier transforms of successive portions of said Nyquist-filtered oversampling-rate estimation of the baseband digital modulating signal in accordance with which said selected one of said digital signals was generated.

18. The receiver apparatus of claim 16, wherein said estimation circuitry comprises:

a trellis decoder also included within said decoding apparatus connected for decoding said decimation filter response to recover said data stream, said trellis decoder connected to receive said decimation filter response from said decimation filter and to supply preliminary estimates of symbol values as well as a trellis decoder response;

a symbol coder for recoding said preliminary estimates of symbol values supplied from said trellis decoder response, to generate a baud-rate estimation of the baseband digital modulating signal; and an interpolation filter connected for receiving said baud-rate estimation of the baseband digital modulating signal and supplying said Nyquist-filtered oversampling-rate estimation of the baseband digital modulating signal to said apparatus for computing the discrete Fourier transforms of successive portions of said Nyquist-filtered oversampling-rate estimation of the baseband digital modulating signal in accordance with which said selected one of said digital signals was generated.

19. The receiver apparatus of claim 6, wherein said first adaptive digital filter is a baseband filter connected for responding to a real component of a digital baseband signal; and wherein said receiver apparatus further comprises, within said apparatus for computing discrete Fourier transforms responsive to successive portions of said amplitude-modulated intermediate-frequency carrier that is amplitude-modulated in accordance with said selected one of said digital signals and any multipath distortion:

a controlled oscillator for generating in-phase oscillations and quadrature-phase oscillations as components of complex oscillations; the frequency and phase of which said complex oscillations are controlled by an automatic frequency and phase control signal;

a first mixer connected for mixing said amplitude-modulated intermediate-frequency carrier supplied from said receiver front-end with said in-phase oscillations to generate a first mixer response;

a first analog lowpass filter connected to receive said first mixer response as a respective input signal and to supply an analog in-phase baseband signal in response thereto;

a first analog-to-digital converter connected for digitizing said analog in-phase baseband signal to generate a digital in-phase baseband signal sampled at an oversampling rate higher than said prescribed baud rate and applied to said first adaptive digital filter as its respective input signal; and apparatus for computing said discrete Fourier transforms from successive portions of said digital in-phase baseband signal, which successive portions of said digital in-phase baseband signal respectively result from demodulation of said successive portions of said amplitude-modulated intermediate-frequency carrier, said first analog-to-digital converter being connected to supply said digital in-phase baseband signal to said apparatus for computing said discrete Fourier transforms from successive portions of said digital in-phase baseband signal.

20. The receiver apparatus of claim 19, wherein said apparatus for computing said discrete Fourier transforms of successive portions of said digital in-phase baseband signal is of a type using a sliding window of said digital baseband signal for such computation, and wherein said apparatus for computing said discrete Fourier transforms of successive portions of said oversampling-rate estimation is of a type using a sliding window of said oversampling-rate estimation for such computation.

21. The receiver apparatus of claim 19, further comprising:

a second mixer connected for mixing said amplitude-modulated intermediate-frequency carrier supplied from said receiver front-end with said quadrature-phase oscillations to generate a second mixer response;

a second analog lowpass filter connected to receive said second mixer response as a respective input signal and to supply an analog quadrature-phase baseband signal in response thereto;

a second analog-to-digital converter connected for digitizing said analog quadrature-phase baseband signal to generate a digital quadrature-phase baseband signal sampled at said oversampling rate higher than said prescribed baud rate;

a second adaptive digital filter having a kernel composed of weighting coefficients that can be adjusted to be similar to said kernel of said first adaptive digital filter, said second analog-to-digital converter being connected to said second adaptive digital filter for applying said digital quadrature-phase baseband signal to said second adaptive digital filter as its respective input signal, said second adaptive digital filter supplying a second adaptive digital filter response to its input signal as convolved with said kernel of said second adaptive digital filter;

a digital-to-analog converter connected to receive as its respective input signal said second adaptive digital filter response from said second adaptive digital filter and connected to supply an analog response therefrom;

a third analog lowpass filter connected to receive as its respective input signal said analog response from said digital-to-analog converter and to supply a third analog lowpass filter response therefrom to said controlled oscillator as said automatic frequency and phase control signal;

a decimation filter connected for re-sampling said first adaptive digital filter response to generate, as a decimation filter response, an in-phase digital baseband signal re-sampled at said prescribed baud rate;

decoding apparatus connected for decoding said decimation filter response to recover a data stream;

estimation circuitry responsive to said decimation filter response for generating an oversampling-rate estimation of a baseband digital modulating signal in accordance with which said selected one of said digital signals was generated;

apparatus for computing the discrete Fourier transforms of successive portions of said oversampling-rate estimation of the baseband digital modulating signal in accordance with which said selected one of said digital signals was generated, which successive portions of said oversampling-rate estimation of the baseband digital modulating signal correspond with respective ones of said successive portions of said digital baseband signal used for computing discrete Fourier transforms in said apparatus for computing the discrete Fourier transforms of successive portions of said digital baseband signal;

computer circuitry for generating discrete Fourier transform characterizations of an actual reception channel through term-by-corresponding-term division of each of the discrete Fourier transforms of successive portions of said oversampling-rate estimation of the baseband digital modulating signal by the discrete Fourier transform of the corresponding portion of said digital baseband signal, thereafter generating discrete Fourier transform descriptions of the kernel desired in each of said first and said second adaptive digital filters through term-by-corresponding-term division of each of the discrete Fourier transform characterizations of the actual reception channel by a discrete Fourier transform characterization of an ideal reception channel, and thereafter generating inverse discrete Fourier transforms of said discrete Fourier transform descriptions of the kernel desired in each of said first and said second adaptive digital filters; and
a bank of digital lowpass filters for smoothing the terms of said inverse discrete Fourier transforms to specify the weighting coefficients in the kernel of each of said first and said second adaptive digital filters.

22. The receiver apparatus of claim 6, further comprising:
analog-to-digital conversion circuitry connected to receive as its respective input signal said amplitude-modulated intermediate-frequency carrier from said receiver front-end and to supply, at an oversampling rate higher than said prescribed baud rate, a digitized amplitude-modulated intermediate-frequency carrier applied as respective input signals to said first adaptive digital filter and to said apparatus for computing discrete Fourier transforms responsive to successive portions of said amplitude-modulated intermediate-frequency carrier that is amplitude-modulated in accordance with said selected one of said digital signals and any multipath distortion thereof;
a digital controlled oscillator for supplying at said oversampling rate digital descriptions of in-phase oscillations and quadrature-phase oscillations as components of complex oscillations, the frequency and phase of which said complex oscillations are controlled by an automatic frequency and phase control signal;
digital synchrodyne circuitry for supplying a digital baseband signal in response to said first adaptive digital filter response, said first adaptive digital filter connected to apply said first adaptive digital filter response to said digital synchrodyne circuitry as a respective input signal thereof, said digital controlled oscillator connected for supplying said descriptions of said in-phase oscillations to said digital synchrodyne circuitry for synchrodyning with said first adaptive digital filter response to generate a real component of said digital baseband signal at said oversampling rate, said controlled oscillator connected for supplying said descriptions of said quadrature-phase oscillations to said digital synchrodyne circuitry for synchrodyning with said first adaptive digital filter response to generate an imaginary component of said digital baseband signal at said oversampling rate;
a digital lowpass filter connected to receive said imaginary component of said digital baseband signal from said digital synchrodyne circuitry and connected to supply its lowpass filter response to said controlled oscillator as said automatic frequency and phase control signal;
a decimation filter connected for re-sampling said real component of said digital baseband signal supplied from said digital synchrodyne circuitry to generate, as a decimation filter response, a real component of digital baseband signal re-sampled at said prescribed baud rate;
decoding apparatus connected for decoding said decimation filter response to recover a data stream;
estimation circuitry responsive to said decimation filter response for generating an oversampling-rate estimation of a baseband digital modulating signal in accordance with which said selected one of said digital signals was generated;
a balanced amplitude modulator for modulating an oversampling-rate digital signal descriptive of an unmodulated intermediate-frequency carrier by said oversampling-rate estimation of the baseband digital modulating signal in accordance with which said selected one of said digital signals was generated, thereby to generate an oversampling-rate-digital signal descriptive of a suppressed-carrier double-sideband signal, said balanced amplitude modulator connected to receive digital descriptions of oscillations from said digital controlled oscillator as said oversampling-rate digital signal descriptive of the unmodulated intermediate-frequency carrier;
an ideal-channel-response vestigial-sideband filter for supplying a vestigial-sideband filter response to said oversampling-rate digital signal descriptive of the suppressed-carrier double-sideband signal supplied to said vestigial-sideband filter as its respective input signal by a connection from said balanced amplitude modulator;
apparatus for computing discrete Fourier transforms of successive portions of said vestigial-sideband filter response, which successive portions of said vestigial-sideband filter response correspond with respective ones of said successive portions of said amplitude-modulated intermediate-frequency carrier used for computing said discrete Fourier transforms thereof;
computer circuitry for generating discrete Fourier transform descriptions of a kernel desired in said first adaptive digital filter through term-by-corresponding-term division of each of the discrete Fourier transforms of successive portions of said vestigial-sideband filter response by the discrete Fourier transform of the corresponding portion of said amplitude-modulated intermediate-frequency carrier, and thereafter generating inverse discrete Fourier transforms of said discrete Fourier transform descriptions of the kernel desired in said first adaptive digital filter; and
a bank of digital lowpass filters for smoothing the terms of said inverse discrete Fourier transforms to specify the weighting coefficients in the kernel of said first adaptive digital filter.

23. A receiver apparatus for single-carrier digital modulation signals of a prescribed baud rate transmitted by respective amplitude-modulated radio-frequency carriers through a medium subject to multipath distortion, said receiver apparatus comprising:
a receiver front-end connected for responding to any selected one of said single-carrier digital modulation signals transmitted at radio frequencies, thereby to supply a converted digital modulation signal at intermediate frequencies;
synchrodyning circuitry connected for responding to said converted digital modulation signal to supply a first digital baseband signal and a second digital baseband signal, said first digital baseband signal resulting from synchrodyning said converted digital modulation signal with an intermediate-frequency carrier of a leading first phasing, said second digital baseband signal resulting from synchrodyning said converted digital modulation signal with an intermediate-frequency carrier of a lagging second phasing in quadrature with said leading first phasing, the relative lead of said first phasing of said intermediate-frequency carrier and the relative lag of said second phasing of said intermediate-frequency carrier being adjustable in response to an automatic frequency and phase control signal;
first and second adaptive digital filters, each having a respective kernel composed of weighting coefficients that can be adjusted, said first adaptive digital filter connected to receive as its respective input signal said first digital baseband signal supplied by said synchrodyning circuitry, said first adaptive digital filter connected to supply a first adaptive digital filter response to its respective input signal, said second adaptive digital filter connected to receive as its said respective input signal said second digital baseband signal supplied by said synchrodyning circuitry, and said second adaptive digital filter connected to supply a second adaptive digital filter response to its respective input signal;

a first adaptive-filter-kernel computer for computing the weighting coefficients in the kernel of said first adaptive digital filter, said first adaptive-filter-kernel computer connected to receive said first adaptive digital filter response and to receive said first digital baseband signal supplied by said synchrodyning circuitry;

a second adaptive-filter-kernel computer for computing the weighting coefficients in the kernel of said second adaptive digital filter, said second adaptive-filter-kernel computer connected to receive said second adaptive digital filter response and to receive said second digital baseband signal supplied by said synchrodyning circuitry;

apparatus for recovering a data stream from an equalized in-phase digital modulation signal that is formed by combining said first adaptive digital filter response and said second adaptive digital filter response in a first way; and apparatus for recovering said automatic frequency and phase control signal from an equalized quadrature-phase digital modulation signal that is formed by combining said first adaptive digital filter response and said second adaptive digital filter response in a second way, one of said first and second ways of combining said first adaptive digital filter response and said second adaptive digital filter response being additive in nature and the other being subtractive in nature.

24. The receiver apparatus of claim 23, wherein said first adaptive-filter-kernel computer and said second adaptive-filter-kernel computer are each of a type using discrete Fourier transform procedures in its computations.

25. The receiver apparatus of claim 23, wherein said first adaptive-filter-kernel computer is operable to compute the discrete Fourier transforms of successive portions of said first digital baseband signal that provide a sampling window moving through a succession of different positions in each of successive data fields, to quantize said first adaptive digital filter response and generate therefrom a first estimation of a baseband digital modulating signal in accordance with which said selected one of said single-carrier digital modulation signals was generated, to compute the discrete Fourier transforms of portions of said first estimation corresponding to said successive portions of said second digital baseband signal, to process the discrete Fourier transform of each portion of said first digital baseband signal with the discrete Fourier transform of the corresponding portion of said first adaptive digital filter response for generating a discrete Fourier transform descriptive of a kernel desired in said first adaptive digital filter, to generate the inverse discrete Fourier transform of said discrete Fourier transform descriptive of the kernel desired in said first adaptive digital filter, and to generate the weighting coefficients for the kernel of said first adaptive digital filter by lowpass filtering each of the terms of the inverse discrete Fourier transform of said discrete Fourier transform descriptive of the kernel desired in said first adaptive digital filter, and wherein said second adaptive-filter-kernel computer is operable to compute the discrete Fourier transforms of successive portions of said second digital baseband signal that generally are contiguous in time, to quantize said second adaptive digital filter response and generate therefrom a second estimation of the baseband digital modulating signal in accordance with which said selected one of said single-carrier digital modulation signals was generated, to compute the discrete Fourier transforms of portions of said second estimation corresponding to said successive portions of said second digital baseband signal, to process the discrete Fourier transform of each portion of said second digital baseband signal with the discrete Fourier transform of the corresponding portion of said second adaptive digital filter response for generating a discrete Fourier transform descriptive of the kernel desired in said second adaptive digital filter, to generate the inverse discrete Fourier transform of said discrete Fourier transform descriptive of a kernel desired in said second adaptive digital filter, and to generate the weighting coefficients for the kernel of said second adaptive digital filter by lowpass filtering each of the terms of the inverse discrete Fourier transform of said discrete Fourier transform descriptive of the kernel desired in said second adaptive digital filter.

26. A receiver apparatus for single-carrier digital modulation signals of a prescribed baud rate transmitted by respective amplitude-modulated radio-frequency carriers through a medium subject to multipath distortion, said receiver apparatus comprising:

apparatus for converting a selected one of said single-carrier digital modulation signals transmitted at radio frequencies to an amplitude-modulated intermediate-frequency carrier, an analog-to-digital converter connected to receive as its respective input signal said amplitude-modulated intermediate-frequency carrier from said apparatus for converting said selected one of said single-carrier digital modulation signals and to supply, at an oversampling rate higher than said prescribed baud rate, a digitized amplitude-modulated intermediate-frequency carrier, a phase-splitter connected to receive as its respective input signal said digitized amplitude-modulated intermediate-frequency carrier supplied from said analog-to-digital converter, said phase-splitter operable to supply orthogonal first and second phase-splitter responses;

first and second adaptive digital filter, each having a respective kernel composed of weighting coefficients that can be adjusted, said first adaptive digital filter connected to receive as its respective input signal said first phase-splitter response supplied by said phase-splitter, said first adaptive digital filter connected to supply a first adaptive digital filter response to its respective input signal, said second adaptive digital filter connected to receive as its said respective input signal said second phase-splitter response supplied by said phase-splitter, and said second adaptive digital filter connected to supply a second adaptive digital filter response to its respective input signal;

digital synchrodyne circuitry connected for generating at said oversampling rate a first digital baseband signal by synchrodyning said first adaptive digital filter response with an intermediate-frequency carrier of a leading first phasing and for generating at said oversampling rate a second digital baseband signal by synchrodyning said second adaptive digital filter response with an intermediate-frequency carrier of a lagging second phasing, the relative lead of said first phasing of said intermediate-frequency carrier and the relative lag of said second phasing of said intermediate-frequency carrier being adjustable in response to an automatic frequency and phase control signal;

a first decimation filter connected for supplying a first decimation filter response generated by re-sampling to said prescribed baud rate said first digital baseband signal generated by said digital synchrodyne circuitry;

a second decimation filter connected for supplying a second decimation filter response generated by re-sampling to said prescribed baud rate said second digital baseband signal generated by said digital synchrodyne circuitry;

a first adaptive-filter-kernel computer for computing the weighting coefficients in the kernel of said first adaptive digital filter, said first adaptive-filter-kernel computer connected to receive said first decimation filter response and to receive said first phase-splitter response supplied by said phase-splitter;

a second adaptive-filter-kernel computer for computing the weighting coefficients in the kernel of said second adaptive digital filter, said second adaptive-filter-kernel computer connected to receive said second decimation filter response and to receive said second phase-splitter response supplied by said phase-splitter;

apparatus for recovering a data stream from an equalized in-phase digital modulation signal that is formed by combining said first decimation filter response and said second decimation filter response in a first way; and apparatus for recovering said automatic frequency and phase control signal from an equalized quadrature-phase digital modulation signal that is formed by combining said first decimation filter response and said second decimation filter response in a second way, one of said first and second ways of combining said first decimation filter response and said second decimation filter response being additive in nature and the other being subtractive in nature.

27. The receiver apparatus of claim 26, wherein said first adaptive-filter-kernel computer and said second adaptive-filter-kernel computer are each of a type using discrete Fourier transform procedures in its computations.

28. The receiver apparatus of claim 26, wherein said first adaptive-filter-kernel computer is operable to compute the discrete Fourier transforms of successive portions of said first phase-splitter response that provide a sampling window moving through a succession of different positions in each of successive data fields, to quantize said first decimation filter response and generate therefrom a first estimation of a baseband digital modulating signal in accordance with which said selected one of said single-carrier digital modulation signals was generated, to generate a first re-modulation signal by modulating said intermediate-frequency carrier of said leading first phasing with said first estimation of the baseband digital modulating signal in accordance with which said selected one of said single-carrier digital modulation signals was generated, to compute the discrete Fourier transforms of portions of said first re-modulation signal corresponding to said successive portions of said first phase-splitter response, to process the discrete Fourier transform of each portion of said first phase-splitter response with the discrete Fourier transform of the corresponding portion of said first re-modulation signal for generating a discrete Fourier transform descriptive of a kernel desired in said first adaptive digital filter, to generate the inverse discrete Fourier transform of said discrete Fourier transform descriptive of the kernel desired in said first adaptive digital filter, and to generate the weighting coefficients for the kernel of said first adaptive digital filter by lowpass filtering each of the terms of the inverse discrete Fourier transform of said discrete Fourier transform descriptive of the kernel desired in said first adaptive digital filter, and wherein said second adaptive-filter-kernel computer is operable to compute the discrete Fourier transforms of successive portions of said second phase-splitter response that generally are contiguous in time, to quantize said second decimation filter response and generate therefrom a second estimation of the baseband digital modulating signal in accordance with which said selected one of said single-carrier digital modulation signals was generated, to generate a second re-modulation signal by modulating said intermediate-frequency carrier of said lagging second phasing with said second estimation of the baseband digital modulating signal in accordance with which said selected one of said single-carrier digital modulation signals was generated, to compute the discrete Fourier transforms of portions of said second re-modulation signal corresponding to said successive portions of said second phase-splitter response with the discrete Fourier transform of the corresponding portion of said second re-modulation signal for generating a discrete Fourier transform descriptive of a kernel desired in said second adaptive digital filter, to generate the inverse discrete Fourier transform of said discrete Fourier transform descriptive of the kernel desired in said second adaptive digital filter, and to generate the weighting coefficients for the kernel of said second adaptive digital filter by lowpass filtering each of the terms of the inverse discrete Fourier transform of said discrete Fourier transform descriptive of the kernel desired in said second adaptive digital filter.

29. A method for adapting weighting coefficients for channel equalization filtering in a receiver for a digital signal of a prescribed baud rate transmitted by respective amplitude-modulated radio-frequency carriers through a channel apt to include more than transmission path for said digital signal, which digital signal is in substantial part randomized and is disposed in successive data fields, said method comprising the steps of:

estimating from an actual input signal with accompanying multipath distortion thereof that is supplied to said channel equalization filtering what an ideal input signal supplied to said channel equalization filtering would be in the absence of said accompanying multipath distortion thereof;

computing respective discrete Fourier transforms for successive portions of said actual input signal supplied to said channel equalization filtering and corresponding successive portions of said ideal input signal estimated from said actual input signal, said successive portions of said actual input signal providing a sampling window moving through a succession of different positions in each of said successive data fields including said substantial parts that are randomized;

generating discrete Fourier transform specifications of said channel equalization filtering, through term-by-corresponding-term division of each of the discrete Fourier transforms of successive portions of said ideal input signal by the discrete Fourier transform of the corresponding portion of said actual input signal supplied to said channel equalization filtering;

computing tentative sets of weighting coefficients for said channel equalization filtering from said discrete Fourier transform specifications of said channel equalization filtering;

low-pass filtering successive said tentative sets of weighting coefficients for said channel equalization filtering to generate discrete Fourier transform descriptions of final sets of weighting coefficients for said channel equalization filtering; and utilizing said final sets of weighting coefficients for said channel equalization filtering.

30. The method of claim 29, wherein said channel equalization filtering is performed in the time domain, and wherein said step of computing tentative sets of weighting coefficients for said channel equalization filtering from said discrete Fourier transform specifications of said channel equalization filtering essentially consists of computing the inverse discrete Fourier transforms of said discrete Fourier transform specifications of said channel equalization filtering.

31. The method of claim 29, wherein said channel equalization filtering is performed in the frequency domain, said method further comprising the steps of:

multiplying said respective discrete Fourier transforms for successive portions of said actual input signal supplied to said channel equalization filtering, term-by-term, by said discrete Fourier transform specifications of said channel equalization filtering to generate discrete Fourier transforms for successive portions of a response from said channel equalization filtering; and computing the inverse discrete Fourier transforms of said discrete Fourier transforms for successive portions of said response from said channel equalization filtering, thereby to generate said successive portions of said response from said channel equalization filtering.

* * * * *